US010104903B2

(12) United States Patent
Sunvold et al.

(10) Patent No.: US 10,104,903 B2
(45) Date of Patent: Oct. 23, 2018

(54) ANIMAL FOOD AND ITS APPEARANCE

(75) Inventors: Gregory Dean Sunvold, Lewisburg, OH (US); Rebecca Massie Grey, West Alexandria, OH (US); Patrick Joseph Corrigan, Glendale, OH (US); Michelle Marie Houston, West Chester, OH (US)

(73) Assignee: Mars, Incorporated, McLean, VA (US)

( * ) Notice: Subject to any disclaimer, the term of this patent is extended or adjusted under 35 U.S.C. 154(b) by 0 days.

(21) Appl. No.: 12/533,045

(22) Filed: Jul. 31, 2009

(65) Prior Publication Data

US 2011/0027419 A1 Feb. 3, 2011

(51) Int. Cl.
| | | |
|---|---|---|
| *A23C 9/12* | (2006.01) | |
| *A23B 7/148* | (2006.01) | |
| *A23L 1/00* | (2006.01) | |
| *A23K 40/30* | (2016.01) | |
| *A23K 10/18* | (2016.01) | |
| *A23K 20/179* | (2016.01) | |
| *A23K 50/42* | (2016.01) | |

(52) U.S. Cl.
CPC .............. *A23K 40/30* (2016.05); *A23K 10/18* (2016.05); *A23K 20/179* (2016.05); *A23K 50/42* (2016.05)

(58) Field of Classification Search
CPC .... A23K 1/004; A23K 1/1853; A23K 1/1606; A23K 1/009
USPC ....................................... 426/61, 87, 89, 106
See application file for complete search history.

(56) References Cited

U.S. PATENT DOCUMENTS

| | | |
|---|---|---|
| 571,521 A | 11/1896 | Heberline et al. |
| 1,086,936 A | 2/1914 | Pounder et al. |
| 1,503,094 A | 7/1924 | Cramer |
| 2,473,773 A | 6/1949 | West |
| 2,504,233 A | 4/1950 | Staunt |
| 2,540,979 A | 2/1951 | Clymer et al. |
| 2,641,548 A | 6/1953 | Heinrich |
| 2,827,452 A | 3/1958 | Schlenk et al. |
| 3,119,691 A | 1/1964 | Ludington et al. |
| 3,168,796 A | 2/1965 | Scott et al. |
| 3,320,130 A | 5/1967 | Henry |
| 3,398,001 A | 8/1968 | Benson |
| 3,429,426 A | 2/1969 | Wolf et al. |

(Continued)

FOREIGN PATENT DOCUMENTS

| | | |
|---|---|---|
| AU | 199642145 | 8/1996 |
| AU | 199928098 | 7/1999 |

(Continued)

OTHER PUBLICATIONS http://www.usnews.com/usnews/biztech/articles/060515/15best_print. htm How cereal giant Kellogg's keeps its product pipeline fresh— US News and World Report; posted on May 7, 2006; accessed on May 2, 2011; printout from the internet.*

(Continued)

*Primary Examiner* — Subbalakshmi Prakash
(74) *Attorney, Agent, or Firm* — Mars, Incorporated

(57) ABSTRACT

Animal feeds comprising at least one kibble comprising a colored appearance. The colored appearance can communicate to a purchaser of the animal feed that the kibble provides a health benefit. The kibble can further comprise an active, such as a Probiotic, that provides a health benefit. The active kibbles can be mixed with non-active kibbles.

15 Claims, 4 Drawing Sheets

(56) References Cited

U.S. PATENT DOCUMENTS

| | | |
|---|---|---|
| 3,431,338 A | 3/1969 | Munzel |
| 3,467,525 A | 9/1969 | Hale et al. |
| 3,677,898 A | 7/1972 | Mitsugi et al. |
| 3,679,429 A | 7/1972 | Mohrman et al. |
| 3,808,340 A | 4/1974 | Palmer |
| 3,808,341 A | 4/1974 | Rongey et al. |
| 3,883,672 A | 5/1975 | Bone et al. |
| 3,890,320 A | 6/1975 | Wolt |
| 3,897,572 A | 7/1975 | Riggs et al. |
| 3,898,132 A | 8/1975 | Heltrick |
| 3,908,025 A | 9/1975 | Miller et al. |
| 3,930,031 A | 12/1975 | Kealy |
| 3,931,885 A | 1/1976 | Nahill et al. |
| 3,957,974 A | 5/1976 | Hata |
| 3,959,511 A | 5/1976 | Balaz et al. |
| 3,989,822 A | 11/1976 | Whistler |
| 3,997,675 A * | 12/1976 | Eichelburg ............... 426/92 |
| 4,011,346 A | 3/1977 | Ernst |
| 4,015,026 A | 3/1977 | Burkwall et al. |
| 4,029,823 A | 6/1977 | Bone et al. |
| 4,039,168 A | 8/1977 | Caris et al. |
| 4,039,689 A | 8/1977 | Bone |
| 4,053,650 A | 10/1977 | Chino et al. |
| 4,055,618 A | 10/1977 | Balaz et al. |
| 4,055,681 A | 10/1977 | Balaz et al. |
| 4,070,490 A | 1/1978 | Lugay et al. |
| 4,088,796 A | 5/1978 | Persson |
| 4,089,978 A | 5/1978 | Lugay et al. |
| 4,092,333 A | 5/1978 | Mookherjee et al. |
| 4,104,406 A | 8/1978 | Stringer et al. |
| 4,104,407 A | 8/1978 | Stringer et al. |
| 4,190,679 A | 2/1980 | Coffee et al. |
| 4,211,797 A | 7/1980 | Cante et al. |
| 4,215,149 A | 7/1980 | Majlinger |
| 4,225,630 A | 9/1980 | Pitchon |
| 4,229,485 A | 10/1980 | Brown et al. |
| 4,248,857 A | 2/1981 | Deneale et al. |
| 4,273,788 A | 6/1981 | Bone et al. |
| 4,284,652 A | 8/1981 | Christensen |
| 4,295,567 A | 10/1981 | Knudsen et al. |
| 4,310,558 A | 1/1982 | Nahm et al. |
| 4,314,995 A | 2/1982 | Hata et al. |
| 4,332,790 A | 6/1982 | Sozzi et al. |
| 4,338,346 A | 7/1982 | Brand |
| 4,366,175 A | 12/1982 | Brown et al. |
| 4,371,556 A | 2/1983 | Pitchon et al. |
| 4,371,557 A | 2/1983 | Oppy et al. |
| 4,399,163 A | 8/1983 | Brennan et al. |
| 4,403,623 A | 9/1983 | Mark |
| 4,410,551 A | 10/1983 | Comer et al. |
| 4,411,924 A | 10/1983 | Sevenants |
| 4,411,925 A | 10/1983 | Brennan et al. |
| 4,418,086 A | 11/1983 | Marino et al. |
| 4,419,372 A | 12/1983 | Green et al. |
| 4,423,029 A | 12/1983 | Rizzi |
| 4,434,231 A | 2/1984 | Jung |
| 4,454,163 A | 6/1984 | Gellman et al. |
| 4,454,164 A | 6/1984 | Gellman et al. |
| 4,454,804 A | 6/1984 | McCulloch et al. |
| 4,508,741 A | 4/1985 | Corbett et al. |
| 4,518,696 A | 5/1985 | Gerhmann et al. |
| 4,534,989 A | 8/1985 | Gellman et al. |
| 4,534,990 A | 8/1985 | Gellman et al. |
| 4,581,238 A | 4/1986 | White et al. |
| 4,592,748 A | 6/1986 | Jost |
| 4,647,453 A | 3/1987 | Meisner |
| 4,702,924 A | 10/1987 | Owens et al. |
| 4,702,994 A | 10/1987 | Owens |
| 4,713,250 A | 12/1987 | Tonyes et al. |
| 4,736,849 A | 4/1988 | Leonard et al. |
| 4,743,458 A | 5/1988 | Brotz |
| 4,743,460 A | 5/1988 | Gellman et al. |
| 4,764,389 A | 8/1988 | Labarge |
| 4,767,623 A | 8/1988 | Conway et al. |
| 4,777,058 A | 10/1988 | Chandler et al. |
| 4,781,939 A | 11/1988 | Martin et al. |
| 4,784,860 A | 11/1988 | Gellman et al. |
| 4,786,507 A | 11/1988 | Schmidt |
| 4,797,289 A | 1/1989 | Reddy |
| 4,804,549 A | 2/1989 | Howley et al. |
| 4,806,368 A | 2/1989 | Reddy |
| 4,808,626 A | 2/1989 | Friedman et al. |
| 4,814,193 A | 3/1989 | Shenouda et al. |
| 4,816,259 A | 3/1989 | Matthews et al. |
| 4,822,626 A | 4/1989 | Spanier et al. |
| 4,844,936 A | 7/1989 | Cox et al. |
| 4,859,377 A | 8/1989 | Sasha et al. |
| 4,870,059 A | 9/1989 | Mitsuhashi et al. |
| 4,873,096 A | 10/1989 | Spiel et al. |
| 4,888,171 A | 12/1989 | Okonogi et al. |
| 4,889,238 A | 12/1989 | Batchelor |
| 4,900,572 A | 2/1990 | Repholz et al. |
| 4,904,494 A | 2/1990 | Spanier |
| 4,904,495 A | 2/1990 | Spanier et al. |
| 4,910,038 A | 3/1990 | Ducharme |
| 4,927,763 A | 5/1990 | Sudoma et al. |
| 4,935,247 A | 6/1990 | Martila et al. |
| 4,937,077 A | 6/1990 | Deetz, III |
| 4,956,295 A | 9/1990 | Sudoma |
| 4,966,733 A | 10/1990 | Fernando et al. |
| 5,000,940 A | 3/1991 | Staples et al. |
| 5,011,679 A | 4/1991 | Spanier et al. |
| 5,015,485 A | 5/1991 | Scaglione et al. |
| 5,032,399 A | 7/1991 | Gorbach et al. |
| 5,045,339 A | 9/1991 | Ducharme |
| 5,085,874 A | 2/1992 | Jungvid |
| 5,096,717 A | 3/1992 | Wirth et al. |
| 5,132,137 A | 7/1992 | Reimann |
| 5,147,668 A | 9/1992 | Munk |
| 5,160,745 A | 11/1992 | Deluca et al. |
| 5,171,580 A | 12/1992 | Imartino et al. |
| 5,176,911 A | 1/1993 | Tosi et al. |
| 5,186,964 A | 2/1993 | Gierhart et al. |
| 5,204,102 A | 4/1993 | Coles et al. |
| 5,281,431 A | 1/1994 | Dunckel |
| 5,283,059 A | 2/1994 | Suzuki et al. |
| 5,286,495 A | 2/1994 | Batich et al. |
| 5,292,657 A | 3/1994 | Rutherford |
| 5,296,217 A | 3/1994 | Stookey et al. |
| 5,296,233 A | 3/1994 | Batista et al. |
| 5,322,686 A | 6/1994 | Grahn et al. |
| 5,344,824 A | 9/1994 | Ohkuma et al. |
| 5,362,511 A | 11/1994 | Villagran et al. |
| 5,389,389 A | 2/1995 | Beck |
| 5,405,836 A | 4/1995 | Richar et al. |
| 5,413,960 A | 5/1995 | Dobrogosz et al. |
| 5,445,828 A | 8/1995 | Pozzi et al. |
| 5,451,400 A | 9/1995 | Stern et al. |
| 5,456,933 A | 10/1995 | Lee |
| 5,456,934 A | 10/1995 | Lee et al. |
| 5,474,932 A | 12/1995 | Bengmark et al. |
| 5,478,570 A | 12/1995 | Sunohara et al. |
| 5,480,641 A | 1/1996 | Casas Perez |
| 5,484,721 A | 1/1996 | Ors et al. |
| 5,487,910 A | 1/1996 | Zabel et al. |
| 5,501,857 A | 3/1996 | Zimmer |
| 5,501,868 A | 3/1996 | Collings et al. |
| 5,505,969 A | 4/1996 | Wood et al. |
| 5,516,684 A | 5/1996 | Saito et al. |
| 5,518,733 A | 5/1996 | Lamothe et al. |
| 5,531,988 A | 7/1996 | Paul |
| 5,532,010 A | 7/1996 | Spanier et al. |
| 5,538,743 A | 7/1996 | Heinemann et al. |
| 5,540,945 A | 7/1996 | Ikushima |
| 5,543,157 A | 8/1996 | Trinh et al. |
| 5,552,176 A | 9/1996 | Marino |
| 5,569,634 A | 10/1996 | Miller et al. |
| 5,578,302 A | 11/1996 | Brassart et al. |
| 5,582,643 A | 12/1996 | Takei et al. |
| 5,592,748 A | 1/1997 | Mitzkat et al. |
| 5,603,930 A | 2/1997 | Brassart |
| 5,603,974 A | 2/1997 | Wood et al. |
| 5,603,976 A | 2/1997 | Share et al. |
| 5,629,017 A | 5/1997 | Pozzi et al. |

(56) References Cited

U.S. PATENT DOCUMENTS

| | | |
|---|---|---|
| 5,633,012 A | 5/1997 | Ford |
| 5,645,830 A | 7/1997 | Reid |
| 5,645,878 A | 7/1997 | Breslin et al. |
| 5,650,184 A | 7/1997 | Humphry et al. |
| 5,690,988 A | 11/1997 | Lin et al. |
| 5,698,246 A | 12/1997 | Villamar |
| 5,698,437 A | 12/1997 | Matsuda et al. |
| 5,726,161 A | 3/1998 | Whistler |
| 5,728,380 A | 3/1998 | Allen et al. |
| 5,733,540 A | 3/1998 | Lee |
| 5,756,088 A | 5/1998 | Matsuura et al. |
| 5,766,520 A | 6/1998 | Brohnshtein |
| 5,785,990 A | 7/1998 | Langreher |
| 5,786,008 A | 7/1998 | Humphry et al. |
| 5,814,338 A | 9/1998 | Veronesi |
| 5,824,779 A | 10/1998 | Koegel et al. |
| 5,849,327 A | 12/1998 | Berliner et al. |
| 5,853,697 A | 12/1998 | Strober et al. |
| 5,854,067 A | 12/1998 | Newgard et al. |
| 5,858,356 A | 1/1999 | Wolf et al. |
| 5,869,121 A | 2/1999 | Brescia et al. |
| 5,871,794 A | 2/1999 | Brito |
| 5,871,802 A | 2/1999 | Gao |
| 5,883,161 A | 3/1999 | Wood et al. |
| 5,894,029 A * | 4/1999 | Brown .................. A23K 40/20 426/302 |
| 5,910,447 A | 6/1999 | Lawrence et al. |
| 5,932,258 A | 8/1999 | Sunvold |
| 5,939,117 A | 8/1999 | Chen et al. |
| 5,952,021 A | 9/1999 | Santus |
| 5,952,033 A | 9/1999 | Anantharaman et al. |
| 5,962,043 A | 10/1999 | Jones |
| 5,968,569 A * | 10/1999 | Cavadini et al. ................ 426/61 |
| 5,976,579 A | 11/1999 | McLean |
| 6,007,808 A | 12/1999 | Dehaen et al. |
| 6,010,725 A | 1/2000 | Cavadini et al. |
| 6,033,888 A | 3/2000 | Batich et al. |
| 6,042,857 A | 3/2000 | Jones et al. |
| 6,056,822 A | 5/2000 | Jefferson et al. |
| 6,063,414 A | 5/2000 | Jones et al. |
| 6,077,530 A | 6/2000 | Weinstein et al. |
| 6,080,401 A | 6/2000 | Reddy et al. |
| 6,080,419 A | 6/2000 | Stookey |
| 6,083,520 A | 7/2000 | Toneby |
| 6,113,970 A | 9/2000 | Rainey et al. |
| 6,117,477 A | 9/2000 | Paluch |
| 6,132,786 A | 10/2000 | Poulos et al. |
| 6,133,323 A | 10/2000 | Hayek |
| 6,150,004 A | 11/2000 | Oikawa et al. |
| 6,156,355 A | 12/2000 | Shields et al. |
| 6,159,508 A | 12/2000 | Wolf |
| 6,190,591 B1 | 2/2001 | Van Lengerich |
| 6,200,609 B1 | 3/2001 | Meister et al. |
| 6,214,336 B1 | 4/2001 | Bukowska et al. |
| 6,218,013 B1 | 4/2001 | Wood et al. |
| 6,228,418 B1 | 5/2001 | Gluck et al. |
| 6,254,886 B1 | 7/2001 | Fusca et al. |
| 6,254,910 B1 | 7/2001 | Paluch |
| 6,270,820 B1 | 8/2001 | Fritz-Jung et al. |
| 6,274,190 B1 | 8/2001 | Long et al. |
| 6,277,370 B1 | 8/2001 | Vavaliere Ved Vesely et al. |
| 6,309,666 B1 | 10/2001 | Hatano et al. |
| 6,309,676 B1 | 10/2001 | Lewandowski |
| 6,310,090 B1 | 10/2001 | Hayek |
| 6,312,746 B2 | 11/2001 | Paluch |
| 6,350,485 B2 | 2/2002 | Brunner |
| 6,355,242 B1 | 3/2002 | Allison et al. |
| 6,358,555 B1 | 3/2002 | Takahashi |
| 6,365,148 B1 | 4/2002 | Kim et al. |
| 6,375,956 B1 | 4/2002 | Hermelin et al. |
| 6,394,803 B1 | 5/2002 | Salz et al. |
| 6,406,853 B1 | 6/2002 | Spindler |
| 6,451,341 B1 | 9/2002 | Slaga et al. |
| 6,479,051 B1 | 11/2002 | Bruce et al. |
| 6,482,794 B1 | 11/2002 | Farbood et al. |
| 6,495,176 B1 | 12/2002 | McGenity et al. |
| 6,500,463 B1 | 12/2002 | Van Lengerich |
| 6,506,389 B2 | 1/2003 | Leer et al. |
| 6,509,007 B2 | 1/2003 | Rajaiah et al. |
| 6,517,877 B2 | 2/2003 | Gannon |
| 6,537,544 B1 | 3/2003 | Johansson et al. |
| 6,544,568 B2 | 4/2003 | La Droitte et al. |
| 6,562,336 B2 | 5/2003 | De Simone |
| 6,572,854 B1 | 6/2003 | De Simone |
| 6,582,746 B2 | 6/2003 | Altemueller et al. |
| 6,586,027 B2 | 7/2003 | Axelrod et al. |
| 6,588,180 B2 | 7/2003 | Heath |
| 6,592,863 B2 | 7/2003 | Fuchs et al. |
| 6,592,924 B2 | 7/2003 | Blank et al. |
| 6,596,946 B2 | 7/2003 | Chapnick et al. |
| 6,607,905 B1 | 8/2003 | Luquet |
| 6,620,440 B1 | 9/2003 | Hsia |
| 6,624,162 B2 | 9/2003 | Uchida et al. |
| 6,652,892 B2 | 11/2003 | McGenity et al. |
| 6,660,319 B1 | 12/2003 | Shi et al. |
| 6,681,935 B1 | 1/2004 | Lewis |
| 6,699,701 B1 | 3/2004 | Sulakvelidze et al. |
| 6,703,040 B2 | 3/2004 | Katsarava et al. |
| 6,713,083 B1 | 3/2004 | McGregor et al. |
| 6,723,358 B1 | 4/2004 | Van Lengerich |
| 6,733,795 B2 | 5/2004 | Piccirilli et al. |
| 6,737,089 B2 | 5/2004 | Wadsworth et al. |
| 6,746,672 B2 | 6/2004 | O'Sullivan |
| 6,767,573 B1 | 7/2004 | Dixon et al. |
| 6,780,433 B2 | 8/2004 | Cochran et al. |
| 6,797,266 B2 | 9/2004 | Naidu |
| 6,802,422 B2 | 10/2004 | Kalvelage et al. |
| 6,827,957 B2 | 12/2004 | Paluch et al. |
| 6,835,376 B1 | 12/2004 | Neeser et al. |
| 6,835,397 B2 | 12/2004 | Lee et al. |
| 6,841,178 B2 | 1/2005 | Cupp et al. |
| 6,841,179 B2 | 1/2005 | Lin et al. |
| 6,884,443 B2 | 4/2005 | Domingues et al. |
| 6,893,662 B2 | 5/2005 | Dittmar et al. |
| 6,896,914 B2 | 5/2005 | Chapnick et al. |
| 6,905,679 B1 | 6/2005 | Schiffrin et al. |
| 6,911,217 B1 | 6/2005 | Gren et al. |
| 6,926,917 B2 | 8/2005 | Parthasarathy |
| 6,932,990 B2 | 8/2005 | Konishi et al. |
| 6,939,560 B2 | 9/2005 | Shen et al. |
| 6,974,594 B2 | 12/2005 | Ko et al. |
| 6,979,675 B2 | 12/2005 | Tidmarsh |
| 6,991,819 B2 | 1/2006 | Pannevis et al. |
| 7,008,648 B2 | 3/2006 | Corley et al. |
| 7,029,669 B1 | 4/2006 | Reniero et al. |
| 7,037,708 B1 | 5/2006 | Runge et al. |
| 7,052,688 B2 | 5/2006 | De Simone |
| 7,067,150 B2 | 6/2006 | Farber et al. |
| 7,081,478 B2 | 7/2006 | Hauptmann et al. |
| 7,097,831 B1 | 8/2006 | Bengs et al. |
| 7,115,297 B2 | 10/2006 | Stillman et al. |
| RE39,436 E | 12/2006 | Spindler et al. |
| 7,150,986 B2 | 12/2006 | Kato et al. |
| 7,163,708 B2 | 1/2007 | Dalziel et al. |
| 7,179,460 B2 | 2/2007 | Dennin et al. |
| 7,186,437 B2 | 3/2007 | Guiller et al. |
| 7,186,545 B2 | 3/2007 | Collins et al. |
| 7,189,390 B2 | 3/2007 | Zink et al. |
| 7,195,906 B2 | 3/2007 | Collins et al. |
| 7,201,923 B1 | 4/2007 | Van Lengerich et al. |
| 7,211,280 B1 | 5/2007 | Young et al. |
| 7,211,426 B2 | 5/2007 | Bruessow et al. |
| 7,229,818 B2 | 6/2007 | Porubcan |
| 7,235,276 B2 | 6/2007 | Allen et al. |
| 7,235,395 B2 | 6/2007 | Stadler et al. |
| 7,244,460 B2 | 7/2007 | Lee et al. |
| 7,258,879 B1 | 8/2007 | Hodge et al. |
| 7,288,275 B2 | 10/2007 | Axelrod et al. |
| 7,303,778 B2 | 12/2007 | McMindes et al. |
| 7,318,920 B2 | 1/2008 | Christensen |
| 7,365,584 B2 | 4/2008 | Bennett et al. |
| 7,381,406 B2 | 6/2008 | Zink et al. |
| 7,390,519 B2 | 6/2008 | Collins et al. |
| 7,390,520 B2 | 6/2008 | Dempsey et al. |

(56) References Cited

U.S. PATENT DOCUMENTS

| | | |
|---|---|---|
| 7,427,398 B2 | 9/2008 | Baillon et al. |
| 7,459,272 B2 | 12/2008 | Morris et al. |
| 7,479,286 B2 | 1/2009 | Couzy et al. |
| 7,479,294 B2 | 1/2009 | Sokhey et al. |
| 7,494,677 B2 | 2/2009 | Merrill et al. |
| 7,498,162 B2 | 3/2009 | Germond et al. |
| 7,507,571 B2 | 3/2009 | Paternack et al. |
| 7,544,497 B2 | 6/2009 | Sinclair et al. |
| 7,547,527 B2 | 6/2009 | Baur et al. |
| 7,550,279 B2 | 6/2009 | Nickel |
| 7,550,285 B2 | 6/2009 | Schiffrin et al. |
| 7,579,030 B2 | 8/2009 | Domingues et al. |
| 7,604,809 B2 | 10/2009 | Postaire et al. |
| 7,622,293 B2 | 11/2009 | Sulakvelidze et al. |
| 7,625,556 B2 | 12/2009 | Sulakvelidze et al. |
| 7,625,739 B2 | 12/2009 | Pasternack et al. |
| 7,625,740 B2 | 12/2009 | Pasternack et al. |
| 7,625,741 B2 | 12/2009 | Pasternack et al. |
| 7,635,584 B2 | 12/2009 | Sulakvelidze et al. |
| 7,645,471 B2 | 1/2010 | Harris |
| 7,647,098 B2 | 1/2010 | Prichep |
| 7,651,708 B2 | 1/2010 | Schlebusch et al. |
| 7,666,459 B2 | 2/2010 | Hayek et al. |
| 7,674,467 B2 | 3/2010 | Sulakvelidze et al. |
| 7,674,808 B2 | 3/2010 | Bueno Calderon et al. |
| 7,678,404 B2 | 3/2010 | Shiraishi et al. |
| 7,678,406 B2 | 3/2010 | Heydtmann et al. |
| 7,687,077 B2 | 3/2010 | Khoo |
| 7,687,085 B2 | 3/2010 | Hayashi et al. |
| 7,700,315 B2 | 4/2010 | Arigoni et al. |
| 7,703,411 B1 | 4/2010 | Bakos et al. |
| 7,722,911 B2 | 5/2010 | Liu et al. |
| 7,745,194 B2 | 6/2010 | Pasternack et al. |
| 7,757,836 B2 | 7/2010 | Karpinsky et al. |
| 7,785,635 B1 | 8/2010 | Boileau et al. |
| 7,795,227 B2 | 9/2010 | Kriegler et al. |
| 7,816,547 B2 | 10/2010 | Msika et al. |
| 7,833,554 B2 | 11/2010 | Piccirilli et al. |
| 7,842,329 B2 | 11/2010 | Saylock et al. |
| 7,867,540 B2 | 1/2011 | Didzbalis et al. |
| 7,879,377 B2 | 2/2011 | Dahl et al. |
| 7,897,579 B2 | 3/2011 | Piccirilli et al. |
| 7,906,112 B2 | 3/2011 | Boileau et al. |
| 7,910,144 B2 | 3/2011 | Ballevre et al. |
| 7,935,334 B2 | 5/2011 | Lin |
| 7,951,575 B2 | 5/2011 | Bruessow et al. |
| 7,960,605 B2 | 6/2011 | Zhao-Wilson |
| 7,977,319 B1 | 7/2011 | Levine |
| 7,989,013 B2 | 8/2011 | Chaintreau et al. |
| 8,003,323 B2 | 8/2011 | Morris et al. |
| 8,021,657 B2 | 9/2011 | Bruessow et al. |
| 8,030,279 B2 | 10/2011 | Joullie |
| 8,057,840 B2 | 11/2011 | Harrison et al. |
| 8,092,608 B2 | 1/2012 | Rochat et al. |
| 8,101,170 B2 | 1/2012 | Plail et al. |
| 8,142,810 B2 | 3/2012 | Sunvold |
| 8,153,174 B2 | 4/2012 | Hansen |
| 8,181,592 B2 | 5/2012 | Karpinsky et al. |
| 8,210,746 B2 | 7/2012 | Kerr et al. |
| 8,277,866 B2 | 10/2012 | Plattner et al. |
| 8,288,391 B2 | 10/2012 | Johnson et al. |
| 8,309,077 B2 | 11/2012 | Murthy et al. |
| 8,313,757 B2 | 11/2012 | Van Lengerich |
| 8,323,683 B2 | 12/2012 | Mody et al. |
| 8,329,190 B2 | 12/2012 | Vidal et al. |
| 8,349,377 B2 | 1/2013 | Piccirilli et al. |
| 8,359,995 B2 | 1/2013 | Bakos et al. |
| 8,394,370 B2 | 3/2013 | Garcia-Rodenas |
| 8,435,732 B2 | 5/2013 | Chattopadhyay et al. |
| 8,460,726 B2 | 6/2013 | Harel et al. |
| 8,486,389 B2 | 7/2013 | Sidhu et al. |
| 8,524,299 B2 | 9/2013 | Brent, Jr. |
| 8,524,304 B2 | 9/2013 | Prakash et al. |
| 8,540,980 B2 | 9/2013 | London et al. |
| 8,557,764 B2 | 10/2013 | Newell et al. |
| 8,563,522 B2 | 10/2013 | Pitha et al. |
| 8,609,166 B2 | 12/2013 | Laborbe et al. |
| 8,637,495 B2 | 1/2014 | Waldron et al. |
| 8,647,690 B2 | 2/2014 | Corrigan |
| 8,663,729 B2 | 3/2014 | Hayek et al. |
| 8,685,696 B2 | 4/2014 | Pasternack et al. |
| 8,685,697 B1 | 4/2014 | Pasternack et al. |
| 8,691,303 B2 | 4/2014 | Sunvold et al. |
| 8,691,792 B2 | 4/2014 | Xu et al. |
| 8,697,174 B2 | 4/2014 | Teconchuk et al. |
| 8,722,112 B2 | 5/2014 | Zicker et al. |
| 8,728,559 B2 | 5/2014 | Hayek et al. |
| 8,802,179 B2 | 8/2014 | Miller |
| 8,808,770 B2 | 8/2014 | Henderson et al. |
| 8,865,197 B2 | 10/2014 | Tandler et al. |
| 8,887,659 B2 | 11/2014 | Fiesser |
| 8,900,569 B2 | 12/2014 | Boileau et al. |
| 8,916,145 B2 | 12/2014 | Mercenier et al. |
| 8,956,628 B2 | 2/2015 | Mathers et al. |
| 8,962,007 B2 | 2/2015 | Perez-Camargo et al. |
| 9,005,680 B2 | 4/2015 | Fetissova et al. |
| 9,023,810 B2 | 5/2015 | Piccirilli et al. |
| 9,089,576 B2 | 7/2015 | Piccirilli et al. |
| 9,111,461 B2 | 8/2015 | Campbell |
| 9,119,843 B2 | 9/2015 | Chen et al. |
| 9,173,423 B2 | 11/2015 | Horgan |
| 9,210,945 B2 | 12/2015 | Horgan |
| 9,441,257 B2 | 9/2016 | Choi et al. |
| 2002/0022019 A1 | 2/2002 | Laulund |
| 2002/0035071 A1 | 3/2002 | Pitha et al. |
| 2002/0049240 A1 | 4/2002 | Hindley et al. |
| 2002/0119237 A1 | 8/2002 | Hevey |
| 2002/0127211 A1 | 9/2002 | Brassart et al. |
| 2003/0044492 A1* | 3/2003 | Knigge ............... B65D 31/02 426/124 |
| 2003/0060503 A1 | 3/2003 | Hamilton |
| 2003/0077356 A1 | 4/2003 | Campbell et al. |
| 2003/0082247 A1 | 5/2003 | Takebe |
| 2003/0104090 A1 | 6/2003 | Levy et al. |
| 2003/0113306 A1 | 6/2003 | Collins et al. |
| 2003/0143293 A1 | 7/2003 | Shushunov |
| 2003/0157166 A1 | 8/2003 | Chen et al. |
| 2003/0170217 A1 | 9/2003 | Collins et al. |
| 2003/0170355 A1 | 9/2003 | Glazier et al. |
| 2003/0175387 A1* | 9/2003 | English .................. 426/94 |
| 2003/0190309 A1 | 10/2003 | Zink et al. |
| 2003/0190314 A1 | 10/2003 | Campbell et al. |
| 2003/0194423 A1 | 10/2003 | Torney et al. |
| 2003/0215547 A1 | 11/2003 | Leyh |
| 2004/0001817 A1 | 1/2004 | Giampapa et al. |
| 2004/0033293 A1 | 2/2004 | Albert |
| 2004/0047896 A1 | 3/2004 | Malnoc et al. |
| 2004/0062833 A1 | 4/2004 | McGenity et al. |
| 2004/0115246 A1 | 6/2004 | Locatelli |
| 2004/0115308 A1 | 6/2004 | Bengtsson Riveros et al. |
| 2004/0161422 A1 | 8/2004 | Ranganathan |
| 2004/0166206 A1 | 8/2004 | Archibald et al. |
| 2004/0167229 A1 | 8/2004 | Bakker-Arkema et al. |
| 2004/0175389 A1 | 9/2004 | Porubcan |
| 2004/0191224 A1 | 9/2004 | Sulakvelidze et al. |
| 2004/0208853 A1 | 10/2004 | Sulakvelidze et al. |
| 2004/0213888 A1 | 10/2004 | Hoshi et al. |
| 2004/0234579 A1 | 11/2004 | Finke |
| 2004/0253357 A1 | 12/2004 | De Zarate |
| 2004/0265279 A1 | 12/2004 | Dinan et al. |
| 2005/0008735 A1 | 1/2005 | Pearce |
| 2005/0013849 A1 | 1/2005 | Lemaure et al. |
| 2005/0060707 A1 | 3/2005 | Tunney |
| 2005/0064073 A1 | 3/2005 | Paluch et al. |
| 2005/0153018 A1 | 3/2005 | Urbink et al. |
| 2005/0074519 A1 | 4/2005 | Bartnick et al. |
| 2005/0079244 A1* | 4/2005 | Giffard et al. ............. 426/42 |
| 2005/0084479 A1 | 4/2005 | Corthesy-Theulay et al. |
| 2005/0092116 A1 | 5/2005 | Pachov |
| 2005/0100559 A1 | 5/2005 | Myatt et al. |
| 2005/0100617 A1 | 5/2005 | Malnoe et al. |
| 2005/0106131 A1 | 5/2005 | Breton et al. |
| 2005/0106132 A1 | 5/2005 | Porubcan |
| 2005/0106133 A1 | 5/2005 | Zink et al. |

(56) References Cited

U.S. PATENT DOCUMENTS

| | | |
|---|---|---|
| 2005/0112259 A1 | 5/2005 | Qvyjt |
| 2005/0139167 A1 | 6/2005 | Leo |
| 2005/0147649 A1 | 7/2005 | Perez et al. |
| 2005/0147651 A1 | 7/2005 | Schert et al. |
| 2005/0152884 A1 | 7/2005 | Boileau et al. |
| 2005/0158291 A1 | 7/2005 | Breton |
| 2005/0158293 A1 | 7/2005 | Boileau et al. |
| 2005/0158294 A1 | 7/2005 | Boileau et al. |
| 2005/0164978 A1 | 7/2005 | Chapnick et al. |
| 2005/0170067 A1 | 8/2005 | Shao |
| 2005/0175598 A1 | 8/2005 | Boileau et al. |
| 2005/0180961 A1 | 8/2005 | Pequet et al. |
| 2005/0181097 A1 | 8/2005 | Townsend et al. |
| 2005/0186305 A1 | 8/2005 | Rosenberg et al. |
| 2005/0208163 A1 | 9/2005 | Brovelli et al. |
| 2005/0214420 A1 | 9/2005 | Schmidt et al. |
| 2005/0233038 A1 | 10/2005 | Weinberg |
| 2005/0249837 A1 | 11/2005 | Massimino et al. |
| 2005/0266069 A1 | 12/2005 | Simmons et al. |
| 2005/0266438 A1 | 12/2005 | Spindler |
| 2005/0271709 A1 | 12/2005 | Dazliel et al. |
| 2005/0281910 A1 | 12/2005 | Schiffrin et al. |
| 2006/0002909 A1 | 1/2006 | Takeda |
| 2006/0008511 A1 | 1/2006 | Lin et al. |
| 2006/0099321 A1 | 1/2006 | Carlson et al. |
| 2006/0062875 A1 | 3/2006 | Gopal |
| 2006/0062892 A1 | 3/2006 | Merrick |
| 2006/0070895 A1 | 4/2006 | Khawaja |
| 2006/0099196 A1 | 5/2006 | Breton et al. |
| 2006/0100162 A1 | 5/2006 | Pitha et al. |
| 2006/0105098 A1 | 5/2006 | Merrick |
| 2006/0116330 A1 | 6/2006 | Pitha et al. |
| 2006/0121015 A1 | 6/2006 | Collins et al. |
| 2006/0124675 A1* | 6/2006 | Calicott ............... 224/222 |
| 2006/0134132 A1 | 6/2006 | Watkins et al. |
| 2006/0134183 A1 | 6/2006 | Huetter et al. |
| 2006/0147585 A1 | 7/2006 | Wincklemann et al. |
| 2006/0147962 A1 | 7/2006 | Jones et al. |
| 2006/0165670 A1 | 7/2006 | Berr et al. |
| 2006/0204623 A1 | 9/2006 | Levin |
| 2006/0228448 A1* | 10/2006 | Boileau et al. ............. 426/61 |
| 2006/0228459 A1 | 10/2006 | Tribelhorn et al. |
| 2006/0260537 A1 | 11/2006 | Brent, Jr. |
| 2006/0263416 A1 | 11/2006 | Brent |
| 2006/0269534 A1 | 11/2006 | Boileau et al. |
| 2006/0270020 A1 | 11/2006 | Boileau et al. |
| 2006/0286246 A1 | 12/2006 | McPherson et al. |
| 2007/0009577 A1 | 1/2007 | Mankovitz |
| 2007/0009647 A1 | 1/2007 | Huetter et al. |
| 2007/0027417 A1 | 2/2007 | Chudik |
| 2007/0031441 A1 | 2/2007 | Collins et al. |
| 2007/0031542 A1 | 2/2007 | Che et al. |
| 2007/0054357 A1 | 3/2007 | Pasternack et al. |
| 2007/0059297 A1 | 3/2007 | Waldron et al. |
| 2007/0082107 A1 | 4/2007 | Almutis et al. |
| 2007/0098744 A1 | 5/2007 | Knorr et al. |
| 2007/0116853 A1 | 5/2007 | Krohn et al. |
| 2007/0122531 A1 | 5/2007 | Considini |
| 2007/0123460 A1 | 5/2007 | Chang et al. |
| 2007/0129428 A1 | 6/2007 | Richelle et al. |
| 2007/0148282 A1 | 6/2007 | Zubair et al. |
| 2007/0149466 A1 | 6/2007 | Milburn et al. |
| 2007/0160589 A1 | 7/2007 | Mattson |
| 2007/0166295 A1 | 7/2007 | Schildgen et al. |
| 2007/0178078 A1 | 8/2007 | Khoo |
| 2007/0178079 A1 | 8/2007 | Zink et al. |
| 2007/0190171 A1 | 8/2007 | Yamka et al. |
| 2007/0202087 A1 | 8/2007 | Baillon et al. |
| 2007/0218164 A1 | 9/2007 | Stojanovic |
| 2007/0231371 A1 | 10/2007 | Pan et al. |
| 2007/0231414 A1 | 10/2007 | Aoki et al. |
| 2007/0243297 A1 | 10/2007 | Keller et al. |
| 2007/0251465 A1 | 11/2007 | Shafer et al. |
| 2007/0269515 A1 | 11/2007 | Henriksen et al. |
| 2007/0269553 A1 | 11/2007 | Le et al. |
| 2007/0269562 A1 | 11/2007 | Chukwu |
| 2007/0269572 A1 | 11/2007 | Turner |
| 2007/0280964 A1 | 12/2007 | Knorr et al. |
| 2007/0286935 A1 | 12/2007 | Grigorov et al. |
| 2008/0026063 A1 | 1/2008 | Ueda et al. |
| 2008/0044481 A1 | 2/2008 | Harel |
| 2008/0050354 A1 | 2/2008 | Garault et al. |
| 2008/0050355 A1 | 2/2008 | Vaslin |
| 2008/0050479 A1 | 2/2008 | Hodge et al. |
| 2008/0053490 A1 | 3/2008 | Clark et al. |
| 2008/0057169 A1 | 3/2008 | Archibald et al. |
| 2008/0085350 A1 | 4/2008 | Shi et al. |
| 2008/0095752 A1 | 4/2008 | Chiang et al. |
| 2008/0107699 A1 | 5/2008 | Spigelman et al. |
| 2008/0138464 A1 | 6/2008 | Townsend et al. |
| 2008/0145341 A1 | 6/2008 | Myatt et al. |
| 2008/0171106 A1 | 7/2008 | Zink et al. |
| 2008/0206405 A1 | 8/2008 | Axelrod et al. |
| 2008/0213431 A1 | 9/2008 | Connolly et al. |
| 2008/0214479 A1 | 9/2008 | Pitha et al. |
| 2008/0220126 A1 | 9/2008 | Boileau et al. |
| 2008/0233244 A1 | 9/2008 | Swenson |
| 2008/0241226 A1 | 10/2008 | Abeln et al. |
| 2008/0248156 A1 | 10/2008 | Boileau et al. |
| 2008/0254177 A1 | 10/2008 | Lin et al. |
| 2008/0260696 A1 | 10/2008 | Massimino et al. |
| 2008/0260866 A1 | 10/2008 | Massimino et al. |
| 2008/0260893 A1 | 10/2008 | Giffard et al. |
| 2008/0268112 A1 | 10/2008 | Rolan et al. |
| 2008/0279786 A1 | 11/2008 | Cash |
| 2008/0280274 A1 | 11/2008 | Friesen et al. |
| 2008/0299260 A1 | 12/2008 | Strahm et al. |
| 2008/0302678 A1 | 12/2008 | Hunwisk et al. |
| 2008/0305094 A1 | 12/2008 | Pridmore-Merten |
| 2008/0305210 A1 | 12/2008 | Petersen |
| 2008/0311226 A1 | 12/2008 | Yamka et al. |
| 2008/0317905 A1 | 12/2008 | Yamka et al. |
| 2009/0017130 A1 | 1/2009 | Yamka et al. |
| 2009/0017163 A1 | 1/2009 | Garbolino et al. |
| 2009/0087831 A1 | 4/2009 | Sulakvelidze et al. |
| 2009/0104315 A1 | 4/2009 | Friesen et al. |
| 2009/0110778 A1* | 4/2009 | Muscroft et al. ............... 426/89 |
| 2009/0110802 A1 | 4/2009 | Pibarot et al. |
| 2009/0136163 A1 | 5/2009 | Kerr et al. |
| 2009/0186121 A1 | 7/2009 | Hutchinson et al. |
| 2009/0208612 A1 | 8/2009 | Reiser et al. |
| 2009/0246336 A1 | 10/2009 | Burnett et al. |
| 2009/0252834 A1 | 10/2009 | Hayek et al. |
| 2009/0274800 A1 | 11/2009 | Assenmacher et al. |
| 2010/0003369 A1 | 1/2010 | Ter Haar et al. |
| 2010/0003393 A1 | 1/2010 | Torney et al. |
| 2010/0047397 A1 | 2/2010 | Levin |
| 2010/0068337 A1 | 3/2010 | Reber et al. |
| 2010/0112003 A1 | 5/2010 | Collins et al. |
| 2010/0136162 A1 | 6/2010 | Cupp et al. |
| 2010/0136201 A1 | 6/2010 | Bigeard et al. |
| 2010/0166709 A1 | 7/2010 | Kang et al. |
| 2010/0203225 A1 | 8/2010 | Kerr et al. |
| 2010/0209572 A1 | 8/2010 | Guidetti |
| 2010/0233320 A1 | 9/2010 | Sunvold et al. |
| 2010/0233347 A1 | 9/2010 | Uhrhan et al. |
| 2010/0233756 A1 | 9/2010 | Sunvold et al. |
| 2010/0260888 A1 | 10/2010 | Shibata et al. |
| 2010/0303951 A1 | 12/2010 | Sunvold et al. |
| 2010/0303966 A1 | 12/2010 | Sunvold et al. |
| 2010/0303967 A1 | 12/2010 | Sunvold et al. |
| 2010/0303968 A1 | 12/2010 | Sunvold et al. |
| 2010/0303976 A1 | 12/2010 | Corrigan et al. |
| 2010/0303978 A1 | 12/2010 | Sunvold et al. |
| 2010/0310750 A1 | 12/2010 | She et al. |
| 2011/0027417 A1 | 2/2011 | Corrigan et al. |
| 2011/0027419 A1 | 2/2011 | Sunvold et al. |
| 2011/0027420 A1 | 2/2011 | Mehansho |
| 2011/0076363 A1 | 3/2011 | Niehues |
| 2011/0104327 A1 | 5/2011 | Kirejevas |
| 2011/0117068 A1 | 5/2011 | Lang et al. |
| 2011/0139087 A1 | 6/2011 | Lang et al. |
| 2011/0159149 A1 | 6/2011 | Josephson et al. |
| 2011/0257399 A1 | 10/2011 | Akwasi et al. |

(56) References Cited

U.S. PATENT DOCUMENTS

| | | |
|---|---|---|
| 2011/0274676 A1 | 11/2011 | Farmer et al. |
| 2012/0003182 A1 | 1/2012 | Abderrahim et al. |
| 2012/0003340 A1 | 1/2012 | Malnoe et al. |
| 2012/0021094 A1 | 1/2012 | Sunvold et al. |
| 2012/0115798 A1 | 5/2012 | Massimino et al. |
| 2012/0213889 A1 | 8/2012 | Chiang |
| 2012/0282373 A1 | 11/2012 | Luhadiya et al. |
| 2012/0283197 A1 | 11/2012 | Luhadiya et al. |
| 2012/0288608 A1 | 11/2012 | Zicker et al. |
| 2013/0122154 A1 | 5/2013 | Villagran et al. |
| 2013/0183255 A1 | 7/2013 | Saunois et al. |
| 2013/0309357 A1 | 11/2013 | Mercenier et al. |
| 2013/0309384 A1 | 11/2013 | Villagran et al. |
| 2014/0030382 A1 | 1/2014 | Ter Haar |
| 2014/0274920 A1 | 9/2014 | Davenport |
| 2014/0348975 A1 | 11/2014 | Davenport et al. |
| 2014/0348986 A1 | 11/2014 | Beyer et al. |
| 2014/0349002 A1 | 11/2014 | Beyer |
| 2015/0132420 A1 | 5/2015 | Villagran et al. |
| 2015/0173397 A1 | 6/2015 | Villagran et al. |
| 2015/0208679 A1 | 7/2015 | Mir et al. |
| 2015/0313258 A1 | 11/2015 | Corrigan et al. |
| 2016/0058813 A1 | 3/2016 | Ozga et al. |
| 2016/0198741 A1 | 7/2016 | Villagran |
| 2016/0198742 A1 | 7/2016 | Maria |
| 2016/0249646 A1 | 9/2016 | Sunvold et al. |

FOREIGN PATENT DOCUMENTS

| | | |
|---|---|---|
| CA | 1103978 | 6/1981 |
| CA | 1131063 | 9/1982 |
| CA | 1300538 | 5/1992 |
| CA | 2093287 | 10/1993 |
| CA | 2256256 | 6/2000 |
| CA | 2569249 | 11/2005 |
| CN | 1927019 | 3/2007 |
| CN | 101095470 | 1/2008 |
| CN | 101214011 | 7/2008 |
| CN | 101411407 | 4/2009 |
| CN | 101411408 | 4/2009 |
| CN | 101669585 | 3/2010 |
| CN | 101822324 | 9/2010 |
| CN | 101822325 | 9/2010 |
| CN | 101822326 | 9/2010 |
| CN | 101822327 | 9/2010 |
| CN | 101933560 | 1/2011 |
| CN | 101999537 | 4/2011 |
| CN | 102008025 | 4/2011 |
| CN | 102008026 | 4/2011 |
| CN | 102048047 | 5/2011 |
| CN | 102048055 | 5/2011 |
| CN | 102106479 | 6/2011 |
| DE | 3715070 | 11/1988 |
| DE | 4018392 | 12/1991 |
| DE | 10217970 | 11/2003 |
| DE | 102004008085 | 9/2005 |
| EP | 0168112 | 1/1986 |
| EP | 0181170 | 5/1986 |
| EP | 0212746 | 3/1987 |
| EP | 0212747 | 3/1987 |
| EP | 0258687 | 3/1988 |
| EP | 0298605 | 1/1989 |
| EP | 0391416 | 10/1990 |
| EP | 0399819 | 11/1990 |
| EP | 0563934 | 10/1993 |
| EP | 0627173 | 12/1994 |
| EP | 0850569 | 7/1998 |
| EP | 0594258 | 1/1999 |
| EP | 01036512 A1 | 9/2000 |
| EP | 1547466 | 6/2005 |
| EP | 1637041 | 3/2006 |
| EP | 1806056 | 7/2007 |
| EP | 1806057 | 7/2007 |
| EP | 1932432 A1 | 6/2008 |
| EP | 2060190 A1 * | 5/2009 |
| EP | 2255676 | 12/2010 |
| EP | 1533369 | 3/2011 |
| FR | 2615203 | 11/1988 |
| FR | 2663198 | 12/1991 |
| GB | 799676 | 8/1958 |
| GB | 1190387 | 5/1970 |
| GB | 1312910 | 4/1973 |
| GB | 1465267 | 5/1973 |
| GB | 1433976 | 4/1976 |
| GB | 1503094 | 3/1978 |
| GB | 1572761 | 8/1980 |
| GB | 1595054 | 8/1981 |
| GB | 2205476 A | 12/1988 |
| GB | 2241421 | 9/1990 |
| GB | 2252228 | 8/1992 |
| GB | 2357967 | 7/2001 |
| GB | 2359746 | 9/2001 |
| JP | S48-018062 | 6/1973 |
| JP | S57-026551 | 2/1982 |
| JP | 57206338 A2 | 12/1982 |
| JP | S59213368 | 12/1984 |
| JP | S6024153 | 2/1985 |
| JP | S61212267 | 9/1986 |
| JP | S62201823 | 9/1987 |
| JP | S62296847 | 12/1987 |
| JP | 03076561 | 4/1991 |
| JP | 06040464 | 2/1994 |
| JP | 6040464 A2 | 2/1994 |
| JP | 06040472 | 2/1994 |
| JP | 6040472 A2 | 2/1994 |
| JP | H0670697 | 3/1994 |
| JP | H06256170 | 9/1994 |
| JP | H07799 | 1/1995 |
| JP | H08242763 | 9/1996 |
| JP | H10271959 | 10/1998 |
| JP | 2000191519 | 7/2000 |
| JP | 2001278781 | 10/2001 |
| JP | 2001309753 | 11/2001 |
| JP | 2002-523027 | 7/2002 |
| JP | 1995378530 | 8/2003 |
| JP | 2004173675 | 6/2004 |
| JP | 2004329019 | 11/2004 |
| JP | 2005304475 | 11/2005 |
| JP | 2006055145 | 3/2006 |
| JP | 2006158265 | 6/2006 |
| JP | 2006180815 | 7/2006 |
| JP | 2007117083 | 5/2007 |
| JP | 2008161135 | 7/2008 |
| JP | 2010088391 | 4/2010 |
| KR | 20020050048 | 6/2002 |
| KR | 20040024774 | 3/2004 |
| KR | 20090100817 | 9/2009 |
| KR | 20100023588 | 3/2010 |
| KR | 20100023594 | 3/2010 |
| RU | 2086248 | 8/1997 |
| RU | 2123343 | 12/1998 |
| RU | 2251364 | 5/2005 |
| RU | 2388320 | 5/2010 |
| RU | 2407401 | 12/2010 |
| TW | 201010628 | 3/2010 |
| WO | 8808452 | 11/1988 |
| WO | WO 89/05849 A1 | 6/1989 |
| WO | 9001335 | 2/1990 |
| WO | 9117672 | 11/1991 |
| WO | 9217072 | 10/1992 |
| WO | 9302558 | 2/1993 |
| WO | 9404180 | 3/1994 |
| WO | 9421284 | 9/1994 |
| WO | 9503809 | 2/1995 |
| WO | WO 95/07090 A1 | 3/1995 |
| WO | WO 95/17103 A1 | 6/1995 |
| WO | WO 95/34214 A1 | 12/1995 |
| WO | 9709448 | 3/1997 |
| WO | 9716198 | 5/1997 |
| WO | WO 97/16077 A1 | 5/1997 |
| WO | 9720577 | 6/1997 |
| WO | 9742838 | 11/1997 |
| WO | 9819668 | 5/1998 |
| WO | 9827967 | 7/1998 |

(56) References Cited

FOREIGN PATENT DOCUMENTS

| WO | 9843682 | 10/1998 | |
|---|---|---|---|
| WO | 9854982 | 12/1998 | |
| WO | WO 99/09839 A1 | 3/1999 | |
| WO | 9930576 | 6/1999 | |
| WO | 9952511 | 10/1999 | |
| WO | 0006127 | 2/2000 | |
| WO | 0010405 | 3/2000 | |
| WO | WO 2000/041576 A1 | 7/2000 | |
| WO | WO 2000/047062 A2 | 8/2000 | |
| WO | 0112164 | 2/2001 | |
| WO | WO 2001/017365 A1 | 3/2001 | |
| WO | 01/90311 | 11/2001 | |
| WO | 03009710 | 2/2003 | |
| WO | WO 2003/018778 A2 | 3/2003 | |
| WO | 03045356 | 6/2003 | |
| WO | 03/075676 | 9/2003 | |
| WO | 2004071324 | 8/2004 | |
| WO | WO 2004/074496 A1 | 9/2004 | |
| WO | 2004100670 | 11/2004 | |
| WO | WO 05/047255 A1 | 5/2005 | |
| WO | WO 2005/070232 A1 | 8/2005 | |
| WO | WO 2005/092116 A1 | 10/2005 | |
| WO | WO 2006/058373 A1 | 6/2006 | |
| WO | WO 2006/058373 A2 | 6/2006 | |
| WO | WO 2006/064959 A1 | 6/2006 | |
| WO | WO 2006058373 A1 * | 6/2006 | |
| WO | WO 2006/122196 A2 | 11/2006 | |
| WO | WO 2006/124675 A2 | 11/2006 | |
| WO | WO 2006124675 A2 * | 11/2006 | |
| WO | WO 2007/048104 A1 | 4/2007 | |
| WO | WO 2007/051816 A1 | 5/2007 | |
| WO | WO 2007/060539 A2 | 5/2007 | |
| WO | WO 2007060539 A2 * | 5/2007 | ............. A23K 40/20 |
| WO | WO 2007/044968 A3 | 6/2007 | |
| WO | WO 2007/077401 A1 | 7/2007 | |
| WO | WO 2007/079147 A2 | 7/2007 | |
| WO | 2007100251 | 9/2007 | |
| WO | 2007/126990 | 11/2007 | |
| WO | 2007126990 | 11/2007 | |
| WO | WO 2007/126990 A2 | 11/2007 | |
| WO | 2007137808 | 12/2007 | |
| WO | WO 2008/035332 A1 | 3/2008 | |
| WO | WO 2008/046625 A2 | 4/2008 | |
| WO | WO 2007/126990 A3 | 6/2008 | |
| WO | WO 2008/076975 A1 | 6/2008 | |
| WO | WO 2008/090270 A1 | 7/2008 | |
| WO | WO 2008/092228 A1 | 8/2008 | |
| WO | WO 2008/101508 A1 | 8/2008 | |
| WO | WO 2008/112296 A1 | 9/2008 | |
| WO | WO 2008/131906 A2 | 11/2008 | |
| WO | WO 2009/061221 A2 | 5/2009 | |
| WO | WO 2009/061222 A2 | 5/2009 | |
| WO | 2009138577 | 11/2009 | |
| WO | 2010077356 | 7/2010 | |

OTHER PUBLICATIONS

"All Bran Yogurt Bites Cereal" Product Package picture downloaded from www.amazon.com Mar. 11, 2014.*
Article: "The Use of Probiotics in the Diet of Dogs"—American Society for Nutritional Sciences. Journal of Nutrition 128: 2730S-2732S, 1998.
Website: "Kibble 'n Bits"—http://www.kibblesnbits.com/varieties/brushingbites.aspx.
The PCT International Search Report dated Nov. 24, 2010—5 pgs.
U.S. Appl. No. 12/533,030, filed Jul. 31, 2009, Patrick Joseph Corrigan et al.
U.S. Appl. No. 12/533,032, filed Jul. 31, 2009, Patrick Joseph Corrigan et al.
U.S. Appl. No. 12/533,039, filed Jul. 31, 2009, Patrick Joseph Corrigan et al.
U.S. Appl. No. 12/533,042, filed Jul. 31, 2009, Patrick Joseph Corrigan et al.
All Office Actions, U.S. Appl. No. 12/473,378.
All Office Actions, U.S. Appl. No. 12/473,386.
All Office Actions, U.S. Appl. No. 12/473,417.
All Office Actions, U.S. Appl. No. 12/473,431.
All Office Actions, U.S. Appl. No. 12/473,486.
All Office Actions, U.S. Appl. No. 13/349,816.
PCT International Search Report for International Application No. PCT/US2010/035248, dated Jul. 21, 2010, 4 pages.
PCT International Search Report for International Application No. PCT/US2010/03551, dated Aug. 27, 2010, 4 pages.
PCT International Search Report for International Application No. PCT/US2012/021212, dated May 9, 2012, 5 pgs.
PCT International Search Report for International Patent Application No. PCT/US2013/050829, dated Sep. 30, 2013, 4 pages.
Evidentiary Reference downloaded from www.palatant.com on Apr. 1, 2016, 1.
Burdick, et al., "Heating by Microwave, Hot Air, and Flowing Stream to Eliminate Inoculated *Salmonella*", Poultry Feed Magazine, published Jan. 6, 1983.
Burdock, "Encyclopedia of food and color additives pages.", Encyclopedia of food and color additives, 1996 p. 967-968.
Burdock, et al., "Safety assessment of 2-ethyl-3,(5 or 6) dimethylpyrazine as a food ingredient", Regulatory Toxicology and Pharmacology 50 (2008) p. 303-312.
Darpro Solutions, "Chicken Fat", Retrieved Mar. 30, 2015.
Foster, et al., "Dog Food Standards by the AAFCO", Dog Food Standards by the AAFCO, Veterinary & Aquatic Services Department, Drs. Foster & Smith, published 2008.
Francis, "Extrusion Cooking", Encyclopedia of Food Science and Technology, 2nd Ed. 1999, vol. 2, pp. 702-703.
Meunier, et al., "Use of Rotary Fluidized-bed Technology for Development of Sustained-Release Plant Extracts Pellets: Potential Application for Feed Additive Delivery, J. Anim. Sci. 2006".
Reynolds, "Steam Cooker Enables Even, Safe Processing", Aug. 9, 2007, p. 1, FoodProductionDaily.com.
Saravacos, et al., "Handbook of Food Processing Equipment", Springer International Publishing, Switzerland 2016, p. 151, Food Engineering Series, DOI 10.1007/978-3-319-25020-5_4.
PCT International Search Report for International Application No. PCT/US2010/042107, dated Nov. 24, 2010—4 pages.
PCT International Search Report for International Application No. PCT/US2010/043694, dated Nov. 16, 2010—4 pages.
PCT International Search Report for International Application No. PCT/US2010/042038, dated Nov. 24, 2010—4 pages.
PCT International Search Report for International Application No. PCT/US2010/042718, dated Nov. 10, 2010—4 pages.
Ubbink, et al., "Physical Approaches for the Delivery of Active Ingredients in Foods", Trends in Food Science & Technology, 17 (2006), pp. 244-254.
"Italian Seasoning Recipe", Accessed at http://allrecipes.com/recipe/34450/italian-seasoning-I/, Oct. 5, 2003, 2 pgs.
"Low Fat Bread Crumb", Accessed at http://www.food.com/recipe/low-fat-bread-crumb-chicken-329993, Oct. 10, 2008, 4 pgs.
Sinha, et al., "Handbook of Fruits and Fruit Processing", Chapter 12 Novel Food Additives, Jun. 2012 (2 pgs.).
Perlmann, et al., "Inhibition of Cytotoxicity of Lymphocytes by Concanavalin A in vitro", Science, 1970, 168:1112-1115.
Phillips-Donaldson, "Making petfood more palatable", http://www.petfoodindustry.com/articles/579makingpetfoodmorepalatable; Accessed on Oct. 29, 2015, 12 pp.
Poehlman, et al., "Caloric Restriction Mimetics: Physical Activity and Body Composition Changes", Journal of Gerontology, Series A 2001, vol. 56A (Special Issue I):45-54.
Powrie, et al., "Inhibition of Th1 Responses Prevents Inflammatory Bowel Disease in Scid Mice Reconstituted with CD45Rbhi CD4+ T Cells", Immunity, vol. 1, pp. 553-562, Oct. 1994.
Purina, "Advancing Life Through Diet Restriction", The Purina Pet Institute Symposium, 2002, 78 pp.
Ramsey, et al., "Dietary Restriction and Aging in Rehesus Monkeys: The University of Wisconsin Study", Experimental Gerontology, 35 (Jun. 2000) 1131-1149.

(56) References Cited

OTHER PUBLICATIONS

Raonimalala, et al., "Action of Soluble Carbohydrates from Avocado Fruit on Utilization of Calcium in the Rat", Ann. Nutr Aliment, 34(4), 734-744, 1980.

Rastall, "Baceria in the Gut: Friends and Foes and How to Alter the Balance", The Journal of Nutrition, Waltham Intl Science Symposium: Nature, Nurture, and the Case for Nutrition (2004), pp. 2022S-2026S.

Reid, et al., "Prevention of Urinary Tract Infection in Rats with an Indigenous Lactobacillus Casei Strain", Infection and Immunity, 1985, 49(2), pp. 320-324.

Rezek, et al., "Glucose Antimetabolites and Hunger", J. Nutr., 106:143-157 (1976).

Rezek, et al., "Insulin Dependence of Paradoxical Overeating: Effect of Mannoheptulose, Somatostatin, and Cycloheximide", The American Physiological Society, 1979, E205-E211.

Ridker, et al., "C-Reactive Protein, the Metabolic Syndrome and Risk of Incident Cardiovascular Events: An 8-Year Follow-up of 14,719 Initially Healthy American Women", Circulation, vol. 107, No. 3, pp. 391-397, Jan. 28, 2003.

Riquelme, et al., "Regulation of Carbohydrate Metabolism by 2,5-Anhydro-D-Mannitol", PNAS, 80, pp. 4301-4305 (1983).

Robey, et al., "Akt, Hexokinase, mTOR: Targeting Cellular Energy Metabloism for Cancer Therapy", Drug Discovery Today: Disease Mechanisms, vol. 2, No. 2, 2005, pp. 239-246.

Rodtong, et al., NCBI Genbank Accession No. AF080100, NCBI Genbank (1998), 1 p.

Roe, et al., "Further Studies of the Physiological Availability of Heptoses", J. Biol. Chem., 121:37-43, 1937.

Roe, et al., "The Utilization of D-Mannoheptulose by Adult Rabbits", J. of Biological Chemistry, 112, 443-449, Jan. 1, 1936.

Rogler, et al., "Cytokines in Inflammatory Bowel Disease", World Journal of Surgery, vol. 22, 1998, pp. 382-389 XP002296948.

Roth, et al., "Caloric Restriction in Primates and Relevance to Humans", Ann. NY Acad. Aci., 928: 305-315, 2001.

Rowland, et al., "Physiological and Behavioral Responses to Glucoprivation in the Golden Hamster", Physiology and Behavior, vol. 30, No. 5, May 1, 1983, pp. 747-747.

Ruscetti, et al., "Release of Colony-Stimulating Activity from Thymus-Derived Lymphocytes", J Clin Invest. 1975;55 (3):520-527.

Sakata, et al., "Feeding Modulation by Pentose and Hexose Analogues", Am. J. Clin. Nutr., 1992, 55:272-277S.

Sayegh, et al., "Impact of Hormone Replacement Therapy on the Body Mass and Fat Compositions of Menopausal Women: A Cross-Sectional Study", Menopause, 6:312-315, 1999.

Scarbrough, et al., "2-Deoxy-D-Glucose and 17-(allylaminio)-17-demethoxygeldanamycin Enhances Toxicity as wella s Increases Parameters Indicative of Oxidative Stress", Free Radical Biology and Medicine, vol. 43, suppl. 1, Nov. 14, 2007, p. S59.

Scardovi, et al., "Deoxyribonucleic Acid Homology Relationships Among Species of the Genus *Bifidobacterium*", Int. J. Syst. Bacteriol., vol. 21, pp. 276-294, 1971.

Scardovi, "Irregular Nonsporing Gram-Positive Rods", Genus *Bifidobacterium* Orla Jensen, 1924, 472, 1418-1434.

Schmitt, et al., "The Immunostimulatory Function of IL-12 in T-Helper Cell Development and its Regulation by TGF-B, IFN-y and IL-4", Chem. Immunet Basel Karger, 1997, vol. 68, pp. 70-85.

Schrek, et al., "Characterizatoin of the B Lymphocyte Response to Pokeweed Mitogen", Annals of Clinical and Laboratory Science, 1982, vol. 12, Issue 6, pp. 455-462.

Scrimshaw, et al., "Interactions of Nutrition and Infection", Am. J. Med. Sci., 1959, 237: 367-403.

Scruel, et al., "Interference of D-Mannoheptuloase with D-Glucose phosphorylation, Metabolism, and Functional Effects: Comparison between Liver, Parotid Cells and Pancreatic Islets", Molecular and Cellular Biochemistry, 187, pp. 113-120, 1998.

Sener, et al., "D-Mannoheptulose Uptake and Its Metabolic and Secretory Effects in Human Pancreatic Islets", International Journal of Molecular Medicine, 6:617-620, 2000.

Sener, et al., "Environmental Modulation of D-Fructose Insulinotropic Action", Acta Diabetol, 1998, 35, pp. 74-76.

Shanahan, et al., "Genes, Bacteria and T Cells: Ingredients for Inflammatory Bowel Disease", Selected Summaries, Gastroenterology, 1998, 115, pp. 1595-1600.

Shanahan, "The Intestinal Immune System", Physiology of the Gastrointestinal Tract, 3rd. ed., 1994, 643-683.

Shaw, et al., "High Performance Liquid Chromatographic Analysis of d-manno-heptulose, perseitol, glucose and Fructose in Avocado Cultivars", J. Agric. Food Chem., 1980, 28, 279-382.

Shimada, "Significance of 1,5-Anhydro-D-Glucitol in Diabetes Mellitus Management", Sangyo Igaku, 1994, 36(3), pp. 448-449.

Silva De Ruiz, et al., "Effect of Lactobacilli and Antibiotics on *E. coli* Urinary Infections in Mice", Biol. Pharm. Bull., 1996, 19(1): 88-93.

Simon, et al., "Insulin and Proinsulin Secretion and Action", Israel J. Med. Sci., vol. 8, No. 6, Jun. 1972, 743-752.

Simon, et al., "Metabolism of Mannoheptulose in the Rat. I. Diabetogenic Action", Arch. Biochem. Biophys., 69, pp. 592-601 (1957).

Simons, et al., "2-deoxy-D-glucose (2DG) Enhances Cispalatin Cytotoxicity in Human Head and Neck Cancer Cells Via Metabolic Oxidative Stress", Free Radical Biology and Medicine, vol. 41, No. 1, Nov. 15, 2006, pp. S112-S113.

Simpson, et al., "Genomic Diversity and Relatedness of Bifidobacteria isolated from a Porcine Cecum", Journal of Bacteriology, Apr. 2003, vol. 185, pp. 2571-2581.

Singh, et al., "Morphological, Thermal and Rheological Properties of Starches from Different Botanical Sources", Food Chemistry, vol. 81, pp. 219-231, Jun. 2003.

Snow Brand Milk Products, "Enteric Capsules—comprising Core Contaiing Drug etc. AndCoating of Hardened Oil of M. Pt. Higher than Body Temp and Disintegrated by Lipase in Intestine", SNOW, Mar. 31, 1986, 1 p.

Sols, et al., "Substrate Specificity of Brain Hexokinase", Biol. Chem. 210, pp. 581-595 (1954).

Soudeyns, et al., "The Moving Target: Mechanisms of HIV Persistance During Primary Infection", Immunology Today, Oct. 1999, 1 p.

Srichuwong, et al., "Starches from Different Botanical Sources: Contribution of Amylopectin Fine Structure to Thermal Properties and Enzyme Digestibility", Carbohydrate Polymers 60 (Apr. 2005) pp. 529-538.

SS Pharmaceutical KK, "Tablets Containing Double-Coated Granules—Obtained by Coating with Insol. Polymer, Enteric Polymer and/or Waces, Then Further Coating with Water or Acid-Soluble Polymer", SSSE, Aug. 18, 1988, 1 p.

Stagg, et al., "The Dendritic Cell: Its Role in Intestinal Inflammation and Relationship with Gut Bacteria", Gut, 2003: 52: 1522-1529.

Stallmach, et al., "Induction and Modulation of Gastrointestinal Inflammation", Trends Immunology Today, Oct. 1998, vol. 19, No. 10, pp. 438-441.

Stevenson, et al., "Structures and Functional Properties of Starch from Seeds of Three Soybean (*Glycine mas* (l.) Merr.) Varieties", Starch/Starke 58, Oct. 2006, p. 509-519.

Burger, et al., "Cardiomyopathy in Ostriches (*Struthio camelus*) Due to Avocado (*Persea americana* Var. *guatemalensis*) Intoxication", Journal of the South African Veterinary Association, vol. Jaargang 65, No. 2, Jun. 1994, 113-118.

Campieri, et al., "Reduction of Oxaluria after an Oral Course of Lactic Acid bacteria at High Concentration", Kidney International (2001) vol. 60, pp. 1097-1105.

Carciofi, et al., "Effects of Six Carbohydrate Sources on Dog Diet Digestibility and Post-Prandial Glucose and Insulin Responses", Journal of Animal Physiology and Animal Nutrition, vol. 92, pp. 326-336, Mar. 13, 2008.

Carranza, et al., "Lower Quantities of Avocado as Daily Source of Monounsaturated Fats: Effect on Serum and Membrane Lipids, Endothelial Function, Platelet Aggregation and C-Reactive Protein in Patients with Metabolic Syndrome", Database Embase, Elsevier Science Publishers, Amsterdam NL, Nov. 2004, XP002485347, 2 pp.

(56) References Cited

OTHER PUBLICATIONS

Chadwick, et al., "Activation of the Mucosal Immune System in Irritable Bowel Syndrome", Gastroenterology, 2002, 122, pp. 1778-1783.
Chan, et al., "Ultra Structural and Secretory Heterogeneity of fa/fa (Zucker) Rat Islets", Molecular and Cellular Endocrinology, 136, 1998, pp. 119-129.
Charteris, et al., "Antibiotic Susceptibility of Potentially Probiotic Bifidobacterium Isolates from the Human Gastrointestinal Tract", Letters in Applied Microbiology, 1998, vol. 26, pp. 333-337.
Charteris, et al., "Development and Application of an In Vitro Methodology to Determine the Transit Tolerance of Potentially Probiotic Lactobacillus and Bifidobacterium Species in the Upper Human Gastrointestinal Tract", Journal of Applied Microbiology, 1998, vol. 84, pp. 759-768.
Charteris, et al., "Effect of Conjugated Bile Salts on Antibiotic Susceptibility of Bile Salt-Tolerant Lactobacillus and Bifidobacterium Isolates", Journal of Food Protection, vol. 63, No. 10, 2000, pp. 1369-1376.
Charteris, et al., "Selective Detection, Enumeration and Identification of Potentially Probiotic Lactobacillus and Bifidobacterium Species in Mixed Bacterial Populations", International Journal of Food Microbiology, 35, 1997, pp. 1-27.
Chauviere, et al., "Adhesion of Human Lactobacillus Acidophilus Strain LB to Human Enterocyte-like Caco-2 Cells", Journal of General Microbiology, 1992, vol. 138, pp. 1689-1696.
Chen, et al., "Action of 5-Thio-D-Glucose and Its 1-Phosphate with Hexokinase and Phosphoglucomutase", Arch. Biochem. Biophys. 169, pp. 392-396 (1975).
Chevalier, et al., "Detection of Bifidobacterium Species by Enzymatic Methods", Journal of Applied Bacteriology, 1990, vol. 68, pp. 619-624.
Chiricolo, et al., "Cell Adhesion Molecules CD11a and CD18 in Blood Monocytes in Old Age and the Consequences for Immunological Dysfunction", Gerontology, 1995, 41(4), pp. 227-234.
Cicco, et al., "Inducible Production of Interleukin-6 by Human Polymorphonuclear Neutrophils: Role of Granulocyte-Macrophage Colony-Stimulating Factor and Tumor Necrosis Factor-Alpha", The American Society of Hematology, Blood, vol. 75, No. 10, May 15, 1990, pp. 2049-2052.
Collins, et al., "A Randomised Controlled Trial of a Probiotic Lactobacillus Strain in Healthy Adults: Assessment of its Delivery, Transit and Influence on Microbial Flora and Enteric Immunity", Microbial Ecology in Health and Disease, vol. 14, No. 2, Jun. 2002, pp. 81-89.
Collins, "Probiotics and Man—The Host Microbe Interface", Abstracts, Gastroenterology, vol. 116, No. 4, Apr. 1999., 3 pp.
Collins, et al., "Selection of Probiotic Strains for Human Applications", Dairy Journal, 8, 1998, 487-490.
Conde, et al., "OeMST2 Encodes a Monosaccharide Transporter Expressed throughout Olive Fruit Maturation", Plant Cell Physiol., 48(9), pp. 1299-1308, 2007.
Cooke, et al., "Role of Estrogens in Adipocyte Development and Function", Exp. Biol. Med., 229:1127-35, 2004.
Crane, et al., "The Non-Competitive Inhibition of Brain Hexokinase by Glucose-6-Phosphate and Related Compounds", Biol. Chem., 210, pp. 597-696 (1954).
Cruzen, et al., "Effects of Caloric Restriction on Cardiovascular Aging in Non-Human Primates and Humans", Clin. Geriatr. Med., vol. 25(4), pp. 733-743, Nov. 2009.
Cullen, et al., "Inhibition of Glucose Metabolism in Pancreatic Cancer Induces Cytotoxicity via Metabolic Oxidative Stress", Gastroenterology, vol. 128, No. 4, sup. 2, Apr. 2005, pp. A483, XP002495963.
De Pergola, "The Adipose Tissue Metabolism: Role of Testosterone and Dehydroepiandrosterone", Int. J. Obesity, 24: S59-S63, 2000.
Dent, et al., "Lactobacillus animalis JCM5670", Database JCM Catalogue, Japan Collection of Microorganisms, 1986, XP002447035, 1 p.
De-Oliveria, et al., "Effects of Six Carbohydrate Sources on Diet Digestibility and Postprandial Glucose and Insulin Responses in Cats", J. Anim. Sci., vol. 86, pp. 2237-2246, May 2, 2008.
Donnelly, et al., "Differential Regulation of Il-1 Production in Human Monocytes by IFN-y and IL-4", The Journal of Immunology, vol. 145, pp. 569-575, No. 2, Jul. 15, 1990.
Dreau, et al., "Effects of 2-deoxy-D-glucose Adminstration on Immune Parameters in Mice", Immunopharmacology, vol. 39, Jun. 1, 1998, 1998, 201-213.
Dunne, et al., "Probiotics: From Myth to Reality, Demonstration of Functionality in Animal Models of Disease and in Human Clinical Trials", Antonie Van Leeuwenhoek. Jul.-Nov. 1999;76(1-4):279-92.
Eisai, "Sustained-Release Solid Preparation of Zero Order Drug Releasing Profile Comprises Granules Obtainable by Coating Inner Core Containing Xanthine Deriv. Etc, with Film of Hardened Oil", EISA, Dec. 22, 1989, 1 p.
Ekor, et al., "Protective Effect of the Methanolic Leaf Extract of *Persea americana* (avocado) Against Paracetamol-induced acute Hepatoxicity in Rats", International Journal of Pharmacology, vol. 2, No. 4, Jan. 1, 2006, pp. 416-420 XP001538905.
Ernst, "Avocado-Soybean Unsaponifiables (ASU) for Osteoarthritis—A systemic Review", Clin. Rheumatol., 2003, 22, pp. 285-288.
Facchini, et al., "Insulin Resistance as a Predictor of Age-Related Diseases", The Journal of Clinical Endocrinology & Metabolism, Aug. 2001, 86(8): 3574-3578.
Fajans, et al., "Stimulation of Insulin Release in the Dog by a Nonmetabolizable Amino Acid. Comparison with Leucine and Arginine", J. of Clinical Endocrinology and Metabolism, 33(1) 35-41, Jul. 1971.
Favier et al. "Fecal B-D-Galactosidase Production and Bifidobacteria are Decreased in Crohn's Disease", Digestive Diseases and Sciences, vol. 42, No. 4, Apr. 1997, pp. 817-822.
Fennema, Food Chemistry, Third Edition, Marcel Deccker, Inc., New York, New York, No month, 1996, p. 954.
Fishbein, et al., "Biological Effects of Dietary Restriction", Springer-Verlag, 1991, 6 pp.
Fontana, et al., "Long-term Calorie Restriction is Highly Effective in Reducing the Risk for Artherosclerosis in Humans", PNAS, vol. 101(17), pp. 6659-6663 (2004).
Foster-Powell, et al., "International Table of Glycemic Index and Glycemic Load Values", Am. J. Clin. Nutr., vol. 75 pp. 5-56, Jul. 2002.
Francesconi, et al., "5-Thio-D-Glucose: Hypothermic Responses in Mice", Am. J. Physiology, 239(3), Sep. 1, 1980, R214-R218.
Frech, et al., "The Utility of Nutraceuticals in the Treatment of Osteoarthritis", Current Rheumatology Reports, 2007, 9, pp. 25-30.
Freund, "Capsule Containing Useful Enteric Bacteria-includes Hydrophobic Layer Non-fluid at Room Temp Isolating Bacteria from Membrane, to prevent Moisture Penetration", Derwent Publ. Ltd. FREN, Aug. 5, 1986, 1 p.
Fujisawa, "Long-Acting Oral Prepn.—comprises Rapidly Soluble Inner Layer and Sustained Release Outer Layer, Both Layers Containing Principal Agent, which is Coronary or Peripheral Vasodilator", FUJI, Sep. 20, 1991., 1 p.
Gallagher, et al., "The Effects of Traditional Antidiabetic Plants on In Vitro Glucose Diffusion", Nutrition Research, 23 (2003), pp. 413-424.
Gartrell, et al., "The Effects of Chocolate and Chocolate by-product Consumption on Wild and Domestic Animals", Chocolate in Health and Nutrition, Humana Press, 2013, pp. 135-141.
Gasche, et al., "IL-10 Secretion and Sensitivity in Normal Human Intestine and Infalmmatory Bowel Disease", Journal of Clinical Immunology, vol. 20, No. 5, 2000, 362-370.
German, et al., "Glucose Sensing in Pancreatic Islet Beta Cells: The Key Role of Glucokinase and the Glycolytic Intermediates", Proc. Nat. Acad. Sci., 90, 1781-1785 (1993).
Gibson, et al., "Dietary Modulation of the Human Gut Microflora Using Probiotics", Journal of Nutrition, 1998, 80, suppl 2, S209-S212.
Gielkens, et al., "Effects of Hyperglycemia and Hyperinsulinemia on Satiety in Humans", Metabolism, vol. 47, No. 3, pp. 321-324, 1998.

(56) References Cited

OTHER PUBLICATIONS

Goldrosen, et al., "Impaired Lymphocyte Blastogenic Response in Patients with Colon Adenocarcinoma: Effects of Disease and Age", Journal of Surgical Oncology, 9:229-234, 1977.
Archived pages from HTTP://web.archive.org for http://medtechnologies.com dated Feb. 2003 (6 pp.).
Blue Buffalo Life Protection Formula_package.pdf, http//www.bluebuff.com/products/dogs/lp-adult-chick.shtml Information accessed Feb. 3, 2009 (4 pp.).
PCT International Search Report for International Application No. PCT/US2012/064740, dated Mar. 13, 2013—4 pages.
PCT International Search Report for International Application No. PCT/US2013/041991, dated Jun. 24, 2013—3 pages.
PCT International Search Report for PCT/US2013/034903, dated Jul. 24, 2013—4 pgs.
Dorland's Pocket Medical Dictionary (24th ed.), W.B. Saunders Co. p. 15, 1989.
Glycemic Index and Glycemic Load for 100+ Foods—Harvard Health Publications, http://www.health.harvard.edu/newsweekGlycemic_index_and_glycemic_load_for_100_foods, Mar. 22, 2012, 3 pp.
Natures Logic Natural Chicken Dinner Fare FROZEN_package.pdf http://www.natureslogic.com/products/dp_rf_chi.html, Information accessed Feb. 3, 2009 (1 p.).
Natures Logic Natural Chicken Meal_package.pdf http://www.natureslogic.com/products/dp_dry_chi.html, Information accessed Feb. 3, 2009 (4 pp.).
Nonfinal Office Action issued in connection with U.S. Appl. No. 12/716,562, dated Jun. 9, 2011, 25 pp.
Physician's Desk Reference, 1963 Edition, Medical Economics, Inc. Oradell, N.J., 1962, Product Identification Section, Section Four, p. VIII and XI.
Publication downloaded from http://en.wikipedia.org/wiki/Noni on May 4, 2009, 9 pages.
Seikagaku jiten (third edition), Tokyo Kagaku Dojin Publishing Co., Inc., 1998, pp. 657-658.
Amendment in response to Nonfinal Office Action dated Aug. 16, 2011 and issued in connection with U.S. Appl. No. 12/716,540 dated Nov. 15, 2011, 12 pp.
Breeders Choice, AvoDERM product brochures http://www.breeders-choice.com/about/brochures.htm, Information accessed Feb. 3, 2009., 20 pp.
Final Office Action issued in connection with U.S. Appl. No. 12/716,518 dated Jan. 4, 2012, 21 pp.
Final Office Action issued in connection with U.S. Appl. No. 12/716,540 dated Jan. 10, 2012, 23 pp.
Final Office Action issued in connection with U.S. Appl. No. 12/716,562 dated Dec. 29, 2011., 23 pp.
Final Office Action issued in connection with U.S. Appl. No. 12/638,101, dated Dec. 30, 2011., 26 pp.
Nonfinal Office Action issued in connection with U.S. Appl. No. 12/716,518 dated Jun. 7, 2011, 26 pp.
Amendment in response to Nonfinal Office Action dated Jun. 7, 2011 and issued in connection with U.S. Appl. No. 12/716,518 dated Oct. 7, 2011, 29 pp.
European Search Report Received in Connection with EP 04 81 5186, dated Jan. 7, 2013, 3 p.
International Search Report for PCT/US2012/036035, dated Jul. 11, 2012, 3 pp.
International Search Report Received in Connection with PCT/US2004/043068, dated Sep. 25, 2007, 3 pp.
Supplemental Amendment in response to Nonfinal Office Action dated Jun. 10, 2011, and issued in connection with U.S. Appl. No. 12/638,101, dated Sep. 29, 2011, 3 pp.
Nonfinal Office Action issued in connection with U.S. Appl. No. 12/638,101, dated Jun. 10, 2011, 31 pp.
Amendment in response to Nonfinal office Action dated Jun. 9, 2011 and issued in connection with U.S. Appl. No. 12/716,562, dated Sep. 2, 2011, 32 pp.
Nonfinal Office Action issued in connection with U.S. Appl. No. 12/716,540, dated Aug. 16, 2011, 32 pp.
Amendment in response to Nonfinal Office Action dated Jun. 10, 2011 and issued in connection with U.S. Appl. No. 12/638,101, dated Sep. 2, 2011, 35 pp.
European Search Report Received in Connection with EP 04 81 5182, dated Jun. 13, 2008, 4 pp.
International Search Report for PCT/US2011/058861, dated Feb. 10, 2012, 4 pp.
International Search Report for PCT/US2012/035921, dated Jul. 10, 2012, 4 pp.
International Search Report Received in Connection with PCT/IB2008/050382, dated Oct. 7, 2008, 6 pp.
LabScan XE User's Manual, Manual Version 1.2, A60-1010-862, Jan. 2003, 53 pp.
"A Balanced Diet", Waltham Book of Dog and Cat Nutrition, Ed. ATB, Edney, Chapter by A. Rainbird, pp. 57-74, Pergamon Press, Oxford, 1988.
"AAFCO Dog and Cat Food Nutrient Profiles", Association of American Feed Control Officials Incorporated, Nov. 2014, 24 pages.
"Changing Times", The Kiplinger Magazine, vol. 31, No. 1, Jan. 1977, pp. 39-40.
"Definition soya bean", Dictionary of food: International food and cooking terms from A to Z, London, UK: A&C Black, No Month 2005, retrieved from http://search.credoreference.com/content/entry/acbdictfood/soya_bean/0; accessed on Feb. 15, 2017, 2 pgs.
"Fluorescent Ca2+ Indicators Excited with Visible Light", Life Technologies, Section 193, 28 pages, Feb. 20, 2012.
"Glycerine: an overview", downloaded from archived internet file, http://www.aciscience.org/docs//Glycerine-an overview.pdf, dated Dec. 2008, 27 pages.
"Iams ProActive Health Adult MiniChunks", Retrieved from URLhttps://web.archive.org/web/20111012222233/http://www.iams.com/dog-food/iams-proactive-health-adult-minichunks>, published Oct. 12, 2011, as per Wayback Machine, 4pp.
"International Vegetarian Union—FAQ 2004", http://www.ivu.org/faq/gelatine.html, updated Aug. 14, 2004, 1 page.
"Introduction, Draft Definition and Classification of Commodites", Food and Agriculture Organization of the United Nations, Introduction, available at: www.fao.org/es/faodef/faodefe.htm; Nov. 29, 2009, 5 pgs.
"Kidney Stones in Adults (http://kidney.niddk.nih.gov, pp. 1-14).", retrieved Dec. 12, 2005.
"Lactobacillus animalis genes for 16S-23S intergenic spacer region, 23S ribosomal RNA, strain", Database EMBL: JCM 5670, Jul. 9, 2004, XP002447038, 2 pp.
"Lactobacillus murinus genes for 16S-23S intergenic spacer regions, 23S ribosomal RNA, strain: JCM 1717", Database EMBL, Jul. 9, 2004, XP002447039, 2 pp.
"Mice and Rats", (www.petswarehouse.com, pp. 1-5), retrieved Dec. 12, 2005.
"Probiotic Basics", (www.usprobiotics.org.basics/, pp. 1-12) retrieved Dec. 12, 2005.
"Urinary Tract Infections in Adults", (http://kidney.niddk.nih.gov, pp. 1-11), retrieved on Dec. 12, 2005.
Adeyemi, et al., "Analgesic and Anti-Inflammatory Effects of the Aqueous Extract Leaves of Persea America Mill (*Lauraceae*)", Fitoterapia, IDB Holdings, Milan, IT, vol. 73, No. 5, Aug. 1, 2002, pp. 375-380, XP002318086.
Alves-Filho, Drying Technology, 2002, vol. 20, No. 8, pp. 1541-1557, abstract.
Anand, et al., "Cytokines and Inflammatory Bowel Disease", Tropical Gastroenterology, 1999, 20(3), pp. 97-106.
Anderson, et al., Nutrition Reviews, vol. 61, No. 5, pp. S17-S26, May 2003.
Andus, et al., "Imbalance of the Interleikin 1 System in Colonic Mucosa-Association with Intestinal Inflammation and Interleukin 1 Receptor Agonist Genotype 2", Gut, vol. 31, 1997, pp. 651-657.
Anonymous, "The Best Ever Guacamole—Again, Whole Foods Market", Jan. 18, 2013, Retrieved from the Internet: URL:http://www.wholefoodsmarket.com/blog/best-ever-guacamole-again, p. 3.

(56) References Cited

OTHER PUBLICATIONS

Apgar, et al., "Effect of feeding Various Levels of Bifidobacterium globosum A on the Performance, Gastrointestinal Measurements and Immunity of Weanling Pigs and on the Perfromance and Carcass Measurements of Gorwing-Finishing Pigs", J. Animal Science, 1993, Vo. 71, pp. 2173-2179.
Appelboom, et al., "Symptoms Modifying Effect of Avocoda/Soybean Unsaponfiables (ASU) in Knee Arthritis. A Double Blind, Prospective, Placebo-Controlled Study", Scandinavian Journal of Rheumatology, vol. 30, pp. 242-247 (2001).
Arai, et al., "Cytokines: Coordinates of Immune and Inflammatory Responses", Annu. Rev. Biochem., 1990, 59: 783-836.
Aranda, et al., "Analysis of Intestinal Lymphocytes in Mouse Colitis Medicated by Transfer of CD4+, CD45RB High T Cells in SCID Recipients", 1997, The American Assoc. of Immunologists, 3464-3473.
Arany, et al., "The Effect of Carcinogens and Non-Carcinogens on Some Biochemical Features of the Mouse Lung Tissue", Arch. Toxicol., Suppl. 4, 73 (1980), 1 p.
Asahara, et al., "Antimicrobial Activity of Intraurethrally Adminstered Probiotic Lactobacillus casei in a Murine Model of *Escherichia coli* Urinary Tract Infection", Antimicrobial Agents & Chemotherapy, 2001, 45(6): 1751-1760.
Ashcroft, et al., "Glucose Metabolism in Mouse Pancreatic Islets", Biochem. J. (1970), 118, pp. 143-154.
Au, et al., "Avocado Soybean Unsaponifiables (ASU) suppress TNF-a, IL-1b, cox-2, iNOS Gene Expression, and Prostaglandin E2 and Nitric Oxide Production in Articular Chondrocytes and Monocyte/Macrophages", Osteoarthritis and Cartilage, 2007, 15, 18 pages.
Balkau, et al., "Insulin resistance: an independent risk factor for cardiovascular disease?", Diabetes Obes. Metab., 1 (Suppl. 1), pp. S23-S31, 1999.
Barbara, et al., "A Role for Inflammation in Irritable Bowel Syndrome", Gut, 2002, 51 (Suppl I), pp. i41-i44.
Barge, "Avocados May Help Prevent Oral Cancer, OSU Study Shows", Journal of Dental Hygiene, vol. 82, No. 2, Apr. 2008, 3 pp.
Barrows, et al., "Diet and Nutrition", Walleye Culture Manual, R. C. Summerfelt, editor, NCRAC Culture Series 101, North Central Regional Aquaculture Center Publications Office, Iowa State University, Ames, First Edition, 1996., 9 pp.
Bazerque, et al., "Secretion of Calcium by the Salivary Glands in the Dog", Journal of Dental Research, Mar. 1, 1967, vol. 16, p. 446.
Begbie, et al., "The Isolation of Some Heptoses, Heptuloses, Octuloses and Nonuloses from Pimula Officinalis JACQ", Carbohydrate Research, 1966, vol. 2, pp. 272-288.
Benno, et al., "Individual and Seasonal Variations in the Composition of Fecal Microflora of Beagle Dogs", Bifidobacteria Microflora, vol. 11, No. 2, pp. 69-76, 1992.
Biavati, et al., "Electrophoretic Patterns of Proteins in the Genus *Bifidobacterium* and Proposal of Four New Species", Journal Int. J. Syst. Bacteriol., vol. 32, pp. 358-373, 1982.
Blatherwick, et al., "Metabolism of D-Mannoheptulose. Excretion of the Sugar After Eating Avocado", J. Biol. Chem., vol. 133, pp. 643-650 1940.
Board, et al., "High KM Glucose Phosphorylating (Glucokinase) Activities in a Range of Tumor Cell Lines and Inhibition of Rates of Tumor Growth by the Specific Enzyme Inhibitor Mannoheptulose", Cancer Research, vol. 55, pp. 3278-3285, Aug. 1995.
Bodmeier, "Capsule with Controlled Active Ingredient Release Comprises Active Ingredient Containing Filling, Capsule Shell, Swelling Agent and Water-Insoluble Layer", BODM, May 18, 1999, 1 p.
Botterweck, et al., "Intake of Butylated Hydroxyanisole and Butylated Hydroxytoluene and Stomach Cancer Risk: Results from Analyses in the Netherlands Cohort Study", Food and Chemical Toxicology, 38 (2000, 599-605.
Bouhnik, et al., "Effects of Bifidobacterium SP Fermented Milk Ingested with or without Inulin on Colonic Bifidobacteria and Enzymatic Activities in Healthy Humans", European Journal of Clinical Nutrition, 1996, 50, pp. 269-273.
Brai, et al., "Hypoglycemic and Hypocholesterolemic Potential of Persea Americana Leaf Extracts", J. Med. Food, 2007, pp. 356-360.
Brandtzaeg, et al., "Immunopathology of Human Inflammatory Bowel Disease", Springer Seminars in Immunopathology, 1997, 18, pp. 555-589.
Bredif, et al., "Avocado Sugars are Effective Inducer of Cutaneous Defensive Functions", Journal of the American Academy of Dermatology, St. Loius, Mo, vol. 50, No. 2, Feb. 1, 2007, p. AB84, XP005937005, 1 p.
Bridigidi, et al., "Specific Detection of Bifidobacterium Strains in a Pharmaceutical Probiotic Product and in Human Feces by Polymerase Chain Reaction", System Appl. Microbiol., 23, 2000, 391-399.
Brown, et al., "Glucose Phosphorylation is Essential for the Turnover of Neutral Lipid and the Second Stage Assembly of Triacylglycerol-Rich ApoB-Containing Lipoproteins in Primary Hepatocyte Cultures", American Heart Association, Inc., 1999, pp. 321-329.
Golkar, et al., "Apigenin Inhibits Pancreatic Cancel Cell Proliferation via Down-Regulation of the GLUT-1 Glucose Transporter", Gastroenterology, vol. 130, No. 4, Jul. 22, 2006, 1 p.
Gondwe, "Effects of Persea Americana Mill (*Lauraceae*) Ethanolic Leaf Extract on Blood Glucose and Kidney Function in Streptozotocin-Induced Diabetic Rats and on Kidney Cell Lines of the Proximal (LLC-PK1) and Distal Tubules (MDBK)", Methods Find Exp Clin. Pharmacol., 2008, 30(1), pp. 25-35.
Grajales-Lagunes, et al., "Stability and Sensory Quality of Spray Dried Avocado Paste", Drying Technology, Vo. 17, No. 1&2, 1999, pp. 317-326.
Greetham, et al., "Bacteriology of the labrador dog gut: A cultural and genotype approach", J. Appl. Microbiol., 93:640-646, 2002.
Groux, et al., "Regulatory T Cells and Inflammatory Bowel Disease", Viewpoint Immunology Today, Oct. 1999, 4 pp.
Guo, et al., "In Vivo 2-Deoxyglucose Administration Preserves Glucose and Glutamate Trasport and Mitochondrial Function in Cortical Synaptic Terminals after Exposure to Amyloid Beta-Peptide and Iron: Evidence for a Stress Response", Experimental Neurology, vol. 166., No. 1, Jan. 1, 2000, XP008056810, pp. 173-179.
Hallstrom, et al., "A Novel Wheat Variety with Elevated Content of Amylose Increases Resistant Starch Formation and may Beneficially Influence Glycaemia in Healthy Subjects", Food & Nutrition Research, Aug. 22, 2011 p. 7074.
Hammarstrom, et al., "Mitogenic Leukoagglutinin from Phaseolus vulgaris Binds to a Pentasaccharide Unit in N-acetyllactosamine-type Glycoprotein Glycans", Proc. Natl. Acad. Sci. USA, 79, 1611-1615 (1982).
Hemme, et al., "Lactobacillus murinus JCM1717", Database JCM Catalogue, Japan Collection of Microorganisms, 1982, XP002447036, 1 p.
Henrotin, et al., "Pharmaceutical and Nutraceutical Management of Canine Osteoarthritis: Present and Future Perspectives", The Veterinary Journal, 170 (2005), pp. 113-123.
Hershkovitz, et al., "Ethylene regulation of Avocado Ripening Differs Between Seeded and Seedless Fruit", Postharvest Biology and Technology, vol. 56, No. 2, May 1, 2010, pp. 138-146.
Hildesheim, et al., "Simultaneous Measurement of Several Cytokines Using Small Volumes of Biospecimens", Cancer Epidemiology, Biomarkers & Prevention, vol. IK1, pp. 1477-1484, Nov. 2002, abstract.
Hillsvet, "Hill's Presciption Diet, A New Way to Define Pet Obesity", Internet Article, 2010, http://www.hillsvet.com/conference-documents/Weight_Management/Therapeutic?Weight_Reduction_Program/BFI_Backgrounder.pdf, 2 pp.
Hoffman, et al., "Diabetogenic Action of 5-Thio-D-glucopyranose in Rats", Biochemistry, vol. 7, pp. 4479-4483 (1968).
Hommes, et al., "Anti- and Proinflammatory Cytokines in the Pathogenesis of Tissue Damage in Crohn's Disease", 2000 Lippincott Williams and Wilkins, pp. 1363-1950.
Isolauri, et al., "Probiotics: A Role in the Treatment of Intestinal Infection and Inflammation?", Gut, 2002, 50 (Suppl III), pp. iii54-iii59.

(56) References Cited

OTHER PUBLICATIONS

Issekutz, et al., "Effect of Mannoheptulose on Glucose Kinetics in Normal and Glucocorticoid Treated Dogs", Life Sciences, 15(4), pp. 635-643, 1974.

Iwasaki, et al., "Unique Functions of CD11b+, CD8a+ and Double Negative Peyer's Patch Dendritic Cells", 2001, The American Association of Immunologists, 4884-4890.

Jay, et al., "Metabolic Stability of 3-O-Methyl-D-Glucose in Brain and Other Tissues", J. Neurochem., 55, pp. 989-1000 (1990).

Johnson, et al., "Glucose-Dependent Modulation in Insulin Secretion and Intracellular Calcium Ions by GKA50, a Glucokinase Activator", Diabetes, vol. 56, Jun. 2007, pp. 1694-1702.

Johnston, "Small Intestinal Bacterial Overgrowth", The Veterinary Clinics of North America, Small Animal Practice, Mar. 1999, vol. 29, No. 2, Mar. 1999, pp. 523-550.

Kalani, et al., "Effects of Caloric Restriction and Exercise on Age-Related, Chronic Inflammation Assessed by C-Reactive Protein and Interleukin-6", J. Gerontol. A. Bio. Sci. Med. Sci., vol. 61(3), pp. 211-217 (2006).

Kalant, et al., "Effect of Diet Restriction on Glucose Metabolism and Insulin Responsiveness in Aging Rats", Mechanisms of Aging and Development, 46 (1988) 89-104.

Kappler-Tanudyaya, et al., "Combination of Biotransformation and Chromatography for the Isolation and Purification of Mannoheptulose", Biotechnology J. 2007, 2, 692-699.

Katzmarzyk, "The Metabolic Syndrome: An Introduction", Appl. Physiol. Nutr. Metab., 32, pp. 1-3 (2007).

Kaufman, et al., "Identification and Quantification of Bifidobacterium Species Isolated from Food with Genus-Specific 16S rRNA-Targeted Probes by Colony Hybridization and PCR", Appl. Environ. Microbiol., Apr. 1997, vol. 63, pp. 1268-1273.

Kealy, et al., "Effects of Diet Restriction on Life Span and Age-Related Changes in Dogs", JAVMA, vol. 220, No. 9, May 1, 2002, 1315, 1317-1320.

Kibenge, et al., "Identification of Biochemical Defects in Pancreatic Islets of fa/fa Rats", Obesity Research, 3(2), pp. 171-178, Mar. 1995.

Klain, et al., "Mannoheptulose and Fatty Acid Synthesis in the Rat", The Journal of Nutrition, pp. 473-477, 1974.

Koh, et al., "Effects of Mannoheptulose on Lipid Metabolism of Rats", J. Nutr., vol. 104, pp. 1227-1233, 1974.

Koizumi, et al., "Influences of Dietary Restriction and Age on Liver Enzyme Activities and Lipid Peroxidation in Mice", American Institute of Nutrition, Jul. 1986, 361-367.

Kok, et al., "Specific Detection and Analysis of a Probiotic Bifidobacterium Strain in Intact Feces", Applied and Environmental Microbiology, 1996, vol. 62, pp. 3668-3672.

Kudo, et al., "An Electron Microscopic Study on Bifidobacterium Pseudolongum SS-24 with Extracellular Material and Naked Bifidobacterium Thermophilum SS-19", AJAS, vol. 2, No. 3, pp. 444-445, 1989.

Kurata, et al., "Structural Evaluation of Glucose Analogues on Feeding Elicitation in Rat", Metabolism, vol. 38, No. 1 Jan. 1989: pp. 46-51.

Kyoto, "Sustains-Release Formulation which Floats in Stomach-Comprises Core of Fats and Oils, Coated with Drug Containing Layer of e.g., Agar", KYOT, Jul. 10, 1987, 1 p.

La Forge, "Absorption and Effect of Ingested Mannoheptulose", Nutrition Reviews, 1969, vol. 27, No. 7, pp. 206-208.

La Forge, "D-Mannoketoheptose, A New Sugar from the Avocado", J. Biol. Chem. 28:511-22, 1917.

Lab Prod Ethiques Ethypharm, "Coated Microgranules Containing a Gastric Proton Pump Inhibitor with Two Hydrophobic Materials, Free from Alkali and any Ionic Surfactant", Derwent Publications Ltd., Ethi., May 21, 1999, 1 p.

Lakatos, "Immunology of Inflammatory Bowel Diseases", Acta Physiologica Hungarica, vol. 87 (4), pp. 355-372, 2000.

Lane, et al., "2-Deoxy-D-Glucose Feeding in Rats Mimics Physiologic Effects of Calorie Restriction", Journal of Anti-Aging Medicine, vol. 1, No. 4, pp. 327-337, 1998.

Lane, et al., "Calorie Restriction in Nonhuman Primates: Implications for Age-Related Disease Risk", Journal of Anti-Aging Medicine, vol. 1, No. 4, pp. 315-326, Dec. 1998.

Lane, et al., "Calorie Restriction Lowers Body Temperature in Rhesus Monkeys, Consistent with a Postulated Anti-Aging Mechanisms in Rodents", PNAS, vol. 93, pp. 4159-4164, Apr. 1996.

Langhans, et al., "Changes in Food Intake and Meal Patterns Following Injection of D-Mannoheptulose in Rats", Behavioral and Neural Biology, 38, pp. 269-286 (1983).

Langley, et al., "Secretion of Calcium and Phosphate by the Dog Parotid Gland", Department of Physiology, University of Alabama Medical Center, Apr. 26, 1961, pp. 599-602.

Leblond-Bourget, et al., "16S rRNA and 16S to 23S Internal Transcribed Spacer Sequence Analysis Reveal Inter- and Intraspecific Bifidobacterium Phylogeny", International Journal of Systemic Bacteriology, vol. 46, No. 1, Jan. 1996, pp. 102-111.

LeClercq-Meyer, et al., "Effects of D-mannoheptulose and Its Hexaacetate Ester on Hormonal Secretion From the Perfused Pancreas", International Journal of Molecular Medicine, 2000, vol. 6, pp. 143-152.

Lee, "Medicinal Plant Composition Suitable for Each Blood Type", WPI/THOMSON, vol. 2004, No. 46, Mar. 22, 2004, 1 p.

Li, et al., "Relationships Between Thermal, Rheological Characteristics and Swelling Power for Various Starches", Journal of Food Engineering, vol. 50, pp. 141-158, Dec. 2001.

Libby, "Inflammatory mechanisms: the molecular basis of inflammation and disease", Nutr. Rev., Dec. 2007, 65 (12 Pt. 2): S140-6.

Liu, et al., "Hass Avocado Carbohydrate Fluctuations. I. Growth and Phenology", J. Amer. Soc. Hort. Sci., 124(6): 671-675, 1999.

Liu, et al., "Hass Avocado Carbohydrate Fluctuations. II. Fruit Growth and Ripening", J. Amer. Soc. Hort. Sci., 124(6): 676-681 (1999).

Liu, et al., "Postulated Physiological Roles of the Seven Carbon Sugars, Mannoheptulose, and perseitol in Avocado", J. Amer. Soc. Hort. Sci., 127(1):108-114, 2002.

Maklashina, et al., "Is Defective Electron Transport at the Hub of Aging", Aging Cell, vol. 3, 21-27, 2004.

Mamula, et al., Gastrointestinal Tract Infections—Chapter 11. 2004, pp. 79-89.

Marteau, et al., "Potential of Using Lactic Acid Bacteria for Therapy and Immunomudulation in Man", FEMS Microbiology Reviews, 12, 1993, pp. 207-220.

Masoro, et al., "Dietary Restriction Alters Characteristics of Glucose Fuel Use", Journal of Gerontology, Biological Sciences, 1992, vol. 47, No. 6, B202-B208.

Masoro, "Overview of Caloric Restriction and Aging", Mech. Aging Dev., vol. 126, pp. 913-922 (2005).

Massi, et al., NCBI Genbank Accession No. AB102854, NCBI Genbank (1994), 1 p.

Mattarelli, et al., "Characterization of the plasmid pVS809 from Bifidobacterium globosum", Microbiologica, 1994, vol. 17, pp. 327-331.

Mattson, et al., "Beneficial Effects of Intermittent Fasting and Caloric Restriction on the Cardiovascular and Cerebrovascular Systems", J. Nutr, Biol. 16, 3:129-137, 2005.

McBrearty, et al., "Probiotic Bifidobacteria and Their Identification Using Molecular Genetic Techniques", Teagasc, Dairy Products Research Centre, Moorepark, Fermoy, Co., Cork, Ireland, Department of Microbiology, University College, Cork Ireland, In, J. Buttriss and M. Saltmarsh (ed), 2000, p. 97-107, Royal Society of Chemistry, Cambridge, United Kingdom.

McCarthy, et al., "Double Blind Placebo Controlled Trial of Two Probiotic Strains in Interleukin 10 Knockout Mice and Mechanistic Link with Cytokine Balance", Gut 2003; 52:975-980.

McCay, et al., "The Effect of Retarded Growth upon the Length of Life Span and upon the Ultimate Body Size", J. Nutr., vol. 10, pp. 63-79 (1935).

McCracken, et al., "Probiotics and the Immune System", In G. W. Tannock (ed.), Probiotics, a critical review. Horizon Scientific Press, Norfolk, United Kingdom, 1999, p. 85-112.

McGee, et al., "A Synergistic Relationship Between TNF-alpha, IL-1B, and TGF-B1 on IL-6 Secretion by the IEC-6 Intertinal Epithelial Cell Line", Immunology, 1995, 86, pp. 6-11.

(56) References Cited

OTHER PUBLICATIONS

McKay, et al., "Review Article: In Vitro Models in Inflammatory Bowel Disease", Aliment Pharmacol. Ther., 1997, 11 (suppl. 3), pp. 70-80.
Medaglini, et al., "Mucosal and Systemic Immune Responses to Recombinant Protein Expressed on the Surface of the Oral Commensal Bacterim *Streptococcus gordonil* after Oral Colonization", Proc. Nat. Acad. Sci. USA, vol. 92, pp. 6868-6872, Jul. 1995, Medical Sciences.
Mentula, et al., "Comparison Between Cultured Small-Intestinal and Fecal Microbiotas in Beagle Dogs", Applied and Environmental Microbiology, Aug. 2005, vol. 71, No. 8, p. 4169-4175.
Mermelstein, "Novel Dryer Uses Refractance Window Principle", Food Technology, 51(10), p. 96, 1997.
Meyer, et al., "Long-Term Caloric Restriction Ameliorates the Decline in Diastolic Function in Humans", J. Am. College of Cardiology, vol. 47(2), pp. 398-402 (2006).
Miller, et al., "2-Deoxy-D-Glucose-Induced Metabolic Stress Enhances Resistance to Listeria monocytogenes Infection in Mice", Physiology & Behavior, vol. 65., No. 3, pp. 535-543, 1998, 1998, 535-543.
Miller, et al., "The Metabolic Stressor 2-Deoxy-D-Glucose (2-DG) Enhances LPS-Stimulated Cytokine Production in Mice", Brain, Behavior, and Immunity, 1993, vol. 7, pp. 317-325, 1993, 317-325.
Mitsuoka, et al., "Ecology of the Bifidobacteria.", The American Journal of Clinical Nutrition, Nov. 1977, vol. 30, pp. 1799-1810.
Mohamed, et al., "Effect of Long-Term Ovariectomy and Estrogen Replacement on the Expression of Estrogen Receptor Gene in Female Rats", Eur. J. Endocrinol. 15, 142:307-14, 2000.
Monteleone, et al., "Manipulation of Cytokines in the Management of Patients with Inflammatory Bowel Disease", Ann. Med, Nov. 2000, 32(8), pp. 552-560.
Morishita Jintan KK, "Capsule Preparation for Enteral Adminstration of Unsaturated Fatty Acids", Derwent Publications Ltd, MORI, Oct. 30, 1997., 1 p.
Morishita Jintan KK, "Yogurt for Supply Physiologically Important Intestinal Bacteria—Contains Bacteria Contained in Capsule Having Inner Layer Made of Digestible Substance and Outer Layer Dissolving in Intestine", MORI, Mar. 10, 1995, 1 p.
Morr, et al., "How Much Calcium is in Your Drinking Water?", A Survey of Calcium Concentrations in Bottled and Tap Water and Their Significance for Medical Treatment and Drug Administration, HSS J., Sep. 2006, vol. 2, No. 2, pp. 130-135, Abstract.
Moustafa, et al., "Effects of aging and antioxidants on glucose transport in rat adipocytes", Gerontology, 1995, 41 (6):301-7.
Murphy, et al., "Evaluation and Characterisation of Probiotic Therapy in the CD45RB Transfer Model of Colitis", AGA Abstracts, Gastroenterology, vol. 116, No. 4, Apr. 1999, 1 p.
Naaz, et al., "THe Soy Isoflavone Genistein Decreases Adipose Deposition in Mice", Endocrinology, 144 (8):3315-3320, 2003.
Naveh, et al., "Defatted Avocado Pulp Reduces Body Weight and Total Hepatic Fat but Increases Plasma Chloesterol in Male Rats fed Diets with Cholesterol", Am. Soc. for Nutritional Sciences, 2002, 2015-2018.
Nordal, et al., "Isolation of Mannoheptulose and Identification of its Phosphate in Avocado Leaves", J. Am. Chem. Soc., 1954, vol. 76, No. 20, pp. 5054-5055.
Nordal, et al., "Isolation of Mannoheptulose and Identification of its Phosphate in Avocado Leaves", Meddelelser fra Norsk Farmaceutisk Selskap, (1955), 17, 207-213.
Novogrodsky, et al., "Lymphocyte Transformation Induced by Concanavalin A and its Reversion by methyl-alpha-D-mannopyranoside", Biochim. Biophys. Acta, 1971, 228, 579-583.
Obaldiston, et al., "Microflora of Alimentary Tract of Cats", American Journal of Veterinary Research, vol. 32, No. 9, Sep. 1971, pp. 1399-1405.
O'Callaghan, et al., "Differential Cytokine Response of Cells Derived from Different Lymphoid Compartments to Commensal and Pathogenic Bacteria", Gastroenterology, Apr. 2003, vol. 124, Issue 4, Supplement 1, p. A339.

O'Callaghan, et al., "Human Cytokine Production by Mesenteric Lymph Node Cells in Response to Probiotic and Pathogenic Bacteria", Gastroenterology, vol. 122, No. 4, Suppl. 1., pp. A-151 DDW Meeting Abstract No. S1043, Apr. 2002, XP09036734.
Ogawa, Journal of Japan Mibyou System Association, 2004, vol. 10, No. 1, (with machine translation), 2004, 140-142.
O'Halloran, et al., "Adhesion of Potential Probiotic Bacteria to Human Epithelial Cell Lines", Departments of Microbiology and Medicine, University College, Mercy Hospital, Cork, Ireland, Dept of Surgery, Mercy Hospital Cork, Ireland, 1998, 1 p.
Ojewole, et al., "Cardiovascular Effects of Persea Americana Mill (*Lauraceae*)(avocado) aqueous Leaf Extract in Experimental Animals", Cardiovasc. J. Afr., 2007, 18, pp. 69-76.
O'Mahony, et al., "Probiotic Bacteria and Pathogenic Bacteria Elicit Differential Cytokine Responses from Dendritic Cells", Gastroenterology, 120(5), 1625, Suppl., Apr. 1, 2001, XP-001097379.
O'Mahony, et al., "Probiotic Bacteria and the Human Immune System", Proceedings of the British Nutrition Foundation/Royal Society of Chemistry (Food Chemistry Group) "Functional Foods '99—Claims and Evidence". BNF (London), 2000, pp. 63-70.
O'Mahony, et al., "Probiotic Human Bifidobacteria: Selection of a New Strain and Evaluation in Vitro and In Vivo", Gastroenterology, vol. 118, No. 4, Apr. 2000, 1 p.
O'Mahony, et al., "Probiotic Impact on Microbial Flora, Inflammation and Tumour Development in IL-10 Knockout mice", Aliment Pharmacol Ther., 2001, 15, pp. 1219-1225.
Panwala, et al., "A Novel Model of Inflammatory Bowel Disease: Mice Deficient for the Multiple Drug Resistance Gene, mdria, Spontaneously Develop Colitis", The American Association of Immunologists, 1998, The Journal of Immunology, 1998, 161, pp. 5733-5744.
Park, et al., "Species Specific Oligonucleotide probes for the detection and identification of Lactobacillus isolated from mouse feces", Journal of Applied Microbiology, 2005, vol. 99, pp. 51-57, XP002447051.
Pawelec, et al., "T Cell Immunosenescence In Vitro and In Vivo", Exp. Gerontol, 1999, 34: 419-429.
Pelicano, et al., "Glycolysis Inhibition for Anticancer Treatment", Oncogene, 2006, 25, pp. 4633-4646.
Strober, et al., "Reciprocal IFN-Gamma and TFG-Beta Responses Regulate the Occurrence of Mucosal Inflammation", Immunol. Today, Feb. 18, 1997, 2, pp. 61-64.
Sung, et al., "The Sphincter of Oddi is a Boundary for Bacterial Colonization in the Feline Biliary Tract", Microbial Ecology in Health and Disease, 1990, vol. 3, pp. 199-207
Sunvold, et al., "Dietary Fiber for Dogs: IV. In Vitro Fermentation of Selected Fiber Sources by Dog Fecal Inoculum and In Vivo Digestion and Metabolism of Fiber-Supplemented Diets", J. Anim. Sci., vol. 73, 1995, 1099-1109.
Sutton, et al., "Considerations for Successful Development and Launch of Personalized Nutrigenomic Foods", Mutation Research, vol. 622, No. 1-2, Aug. 8, 2007, pp. 117-121.
Takayanagi, J. Nippon Med. Sch., 2003, vol. 70, No. 1, p. 71 (with machine translation), 2003.
Takeda Chemical Ind KK, "Dry Coated Tablet—Comprises Core Tablets Containing Enzyme Prepn in Enteric Films Within Outer Shell", TAKE, May 10, 1982, 1 p.
Tesfay, et al., "Anti-Oxidant Levels in Various Tissues During the Maturation of "Hass" Avocado", Journal of Horticultural Science and Biotechnology, (2010) 85(2): 106-112.
Tomomatsu, "Health Effects of Oligosaccharides", 1994, Food Technology, 48, pp. 61-65.
Trovatelli, et al., "Presence of Bifidobacteria in the Rumen of Calves Fed Different Rations", Appl. Environ. Microbiol., 1976, vol. 32(4), pp. 470-473.
Valente, et al., "Immunologic Function in the Elderly After Injury— The Neutrophil and Innate Immunity", The Journal of Trauma Injury, Infection and Critical Care, vol. 67, No. 5, pp. 968-974, Nov. 2009.
Van Damme, et al., "The Proportion of Th 1 Cells, Which Prevail in Gut Mucosa, is Decreased in Inflammatory Bowel Syndrome", 2001, Blackwell Science Ltd. Clinical and Experimental Immunology, 125, pp. 383-390.

(56) References Cited

OTHER PUBLICATIONS

Vandeputte, et al., "From Sucrose to Starch Granule to Starch Physical Behavior: A Focus on Rice Starch", Carbohydrate Polymers, 58 (Jun. 2004) 245-266.
Vasconcelos, et al., "Antagonistic and Protective Effects Against *Salmonella enterica* Serovar Typhimurium by Lactobacillus murinus in the Digestive Tract of Gnotobiotic Mice", Brazilian Journal of Microbiology (2003) 34 (Supple. 1): 21-24.
Vickers, et al., "Comparison of Fermentation of Selected Fructooligosaccharides and Other Fiber Substrates by Canine Colonic Microflora", AJVR, vol. 62, No. 4, Apr. 2001, 609-615.
Viktora, et al., "Effect of Ingested Mannoheptulose in Animals and Man", Metabolism, 18(2), 87-102, 1969.
Voet, et al., Biochemistry, John Wiley & Sons, Inc., pp. 1044-1045 (1995).
Walker-Bone, et al., "Natural Remedies in the Treatment of Osteoarthritis", Drugs and Aging, 2003, 20(7), pp. 517-526.
Wamelink, et al., "Detection of Transaldolase Deficiency by Quantification of Novel Seven-Carbon Chain Carbohydrate Biomarkers in Urine", J. Inherit. Metab. Dis., (2007), 30, pp. 735-742.
Wan, et al., "Dietary Supplementation with 2-deoxy-d-Glucose Improves Cardiovascular and Neuroendocrine Stress Adaptation in Rats", Am. J. Physiol. Hear. Cir. Physiol, 287: H1186-H1193, 2004.
Wein, et al., "Analyzing a Bioterror Attack on the Food Supply: The Case of Botulinum Toxin in Milk", 2005, The National Academy of Sciences of the USA, vol. 102, No. 28, 9984-9989.
Weindruch, et al., "The Retardation of Aging and Disease by Dietary Restriction", Charles S. Thomas (1988), 33 pp.
Weindruch, "The Retardation of Aging by Caloric Restriction", Toxicol. Pathol., 1996, 24:742.
Wetzel, et al., "Instrumental Methods in Food and Beverage Analysis", Elsevier, May 1998, p. 62-63.
Willott, et al., "Aging and Presbycusis: Effects on 2-Deoxy-D-Glucose Uptake in the Mouse Auditory Brain Stem in Quiet", Exp. Neurol., vol. 99(3), pp. 615-621 (1988).
Winnock, et al., "Correlation Between GABA Release from Rat Islet beta-cells and their Metabolic State", Am. J. Physiol Endocrinol. Metab., 282: E937-E942, 2002.
Wood, et al., "Evidence for Insulin Involvement in Arginine- and Glucose-Induced Hypercalciuria in Rat", J. Nutr., 113, pp. 1561-1567, 1983.
Yaeshima, et al., "Bifidobacterium globosum, Subjective Synonym of Bifidobacterium pseudolongum, and Descrption of *Bifidobacterium pseudolongum* subsp. *pseudolongum* com. nov. and *Bifidobacterium psuedolongum* subsp. *globosum* comb. nov.", Systematic and Applied Microbiology, 1992, vol. 15(3), pp. 380-385.
Yamamoto, et al., "Changes in Behavior and Gene Expression Induced by Caloric Restriction in C57BL/6 Mice", Physiological Genomics, vol. 39, No. 3, Sep. 8, 2009, pp. 227-235.
Yang et al., "The Role of Voltage-Gated Calcium Channels in Pancreatic [beta]-Cell Physiology and Pathophysiology", Endocrine Reviews, vol. 27, No. 6, Oct. 1, 2006, 621-676.
Yu, "Aging and Oxidative Stress: Modulation by Dietary Restriction", Free Radical Biology and Medicine, vol. 21, No. 6, pp. 651-668, 1996.
Yu, et al., "Modulation of Aging Processes by Dietary Restriction", CRC Press, Boca Raton (1994), 45 pp.
Zhang, et al., "Dissimilar Effects of D-Mannoheptulose on the phosphorylation of alpha vs beta-D-glucose by either Hexokinase or Glucokinase", International Journal of Molecular Medicine, 14, pp. 107-112, 2004.
Zobel, "Molecules to Granules: A Comprehensive Starch Review", starch/starke 40 (1988) Nr. 2, S. pp. 44-50 (Manuscript: Jun. 19, 1987).
All Office Actions, U.S. Appl. No. 12/533,030.
All Office Actions, U.S. Appl. No. 12/533,032.
All Office Actions, U.S. Appl. No. 12/533,039.
All Office Actions, U.S. Appl. No. 12/533,042.

\* cited by examiner

ANIMAL FOOD AND ITS APPEARANCE

FIELD

The present invention generally relates to animal food and its appearance and more particularly relates to a pet food comprising a distinctive kibble.

BACKGROUND

Kibble-type animal feeds, such as dog and cat foods, are dried, ready-to-eat pet food products. The kibbles can be formed by an extrusion process where the kibble raw materials are extruded under heat and pressure to form the pelletized kibble form. Extrusion technology provides a cheap and efficient method for formulating animal feed kibbles, such as those having a starch matrix. During the extrusion process, the starch matrix typically becomes gelatinized under the extrusion conditions.

The defense mechanisms to protect the mammalian gastrointestinal (GI) tract from colonization by pathogenic bacteria are highly complex. The GI tracts of most mammals are colonized by native microflora and invasive pathogenic micro-organisms. In a healthy individual, these competing microflora are in a state of equilibrium. Modification of the intestinal microflora equilibrium can lead to or prevent many GI disorders, both in humans and other mammalian species, such as companion animals, including, for example, cats, dogs, and rabbits. The well being of companion animals is closely related to their feeding and GI health, and maintenance of the intestinal microflora equilibrium in these animals can result in healthier pets.

The number and composition of the intestinal microflora tend to be stable, although age and diet can modify it. Gastric activity, bile, intestinal peristalsis, and local immunity are factors thought to be important in the regulation of bacterial flora in the small intestine of human beings and various other mammals. Often, pet GI disorders, including those found in canines and felines, are linked to bacterial overgrowth and the production of enterotoxins by pathogenic bacteria. These factors disrupt the intestinal microflora equilibrium and can promote inflammation and aberrant immune response.

Research has begun to highlight some valuable strains of bacteria and their potential uses as Probiotic agents. Probiotics are typically considered to be preparations of live bacteria. Probiotic related substances include constituents of Probiotics, such as proteins or carbohydrates, or purified fractions of bacterial ferments. Probiotics and/or their constituents may promote mammalian health by preserving and/or promoting the natural microflora in the GI tract and reinforcing the normal controls on aberrant immune responses.

Thus, a desired goal of improving the health of companion animals exists. However, many of these ingredients can be costly, sensitive to effects of extrusion or other production methods, and/or sensitive to product stability, such as exposure to oxygen or moisture. Identifying new product designs where these challenges can be overcome can enable products to be made that satisfy the goal of consumers to provide improved health benefits to their companion animals. Thus, a need exists for Probiotic kibbles and kibble animal feeds for companion animals. Further, consumer cues, identification, recognition, and connection with Probiotic-containing kibbles can also be desirable.

SUMMARY

In one embodiment, a pet food kibble is provided. The pet food can comprise a core having a water content less than 12% and a coating or dusting on the core. The coating or dusting can comprise an active component. The pet food can intuitively communicate by a psychologically matched color a health benefit of the kibble. The active component can comprise a Probiotic.

In one embodiment, an animal feed is provided that can comprise a first kibble comprising an extruded core having a water content less than 12% and a second kibble comprising a dusting comprising a Probiotic component. The dusting can be substantially free of a binder. The second kibble can be distinctive from the first kibble.

In one embodiment, an animal feed is provided that can comprise a first kibble comprising an extruded core having a water content less than 12%, a second kibble comprising a Probiotic component, and a third kibble comprising an extruded core having a water content less than 12%. The third kibble can be distinctive.

In one embodiment, a kit can include a package of the animal feed of kibbles as described herein. The package can comprise an opaque portion and a transparent portion, wherein the transparent portion can comprise a viewing aperture wherein the kibbles are viewable through the viewing aperture when the package is in a customary position on a retail store shelf.

DETAILED DESCRIPTION

Definitions

Figure 1:
FIG. 1 depicts an embodiment of an animal feed with kibbles.

As used herein, the articles including "the", "a", and "an", when used in a claim or in the specification, are understood to mean one or more of what is claimed or described.

As used herein, the terms "include", "includes" and "including" are meant to be non-limiting.

As used herein, the term "plurality" means more than one.

As used herein, the term "consumer" means a purchaser of animal feed.

As used herein, the term "kibble" includes a particulate pellet like component of animal feeds, such as dog and cat feeds, typically having a moisture, or water, content of less than 12% by weight. Kibbles may range in texture from hard to soft. Kibbles may range in internal structure from expanded to dense. Kibbles may be formed by an extrusion process. In non-limiting examples, a kibble can be formed from a core and a coating to form a kibble that is coated, also called a coated kibble. It should be understood that when the term "kibble" is used, it can be referred to as an uncoated kibble or a coated kibble.

As used herein, the terms "Probiotic", "Probiotic component", "Probiotic ingredient", or "Probiotic microorganism" mean bacteria or other microorganisms, typically preparations of live bacteria, including those in the dormant state, that are capable of promoting mammalian health by preserving and/or promoting the natural microflora in the GI tract and reinforcing the normal controls on aberrant immune responses. Probiotics can include constituents of Probiotics, such as proteins or carbohydrates, or purified fractions of bacterial ferments.

As used herein, the terms "animal" or "pet" mean a domestic animal including, but not limited to, domestic dogs, cats, horses, cows, ferrets, rabbits, pigs, and the like. Domestic dogs and cats are particular examples of pets.

As used herein, the terms "animal feed", "animal feed compositions", "animal feed kibble", "pet food", or "pet food composition" mean a composition intended for ingestion by a pet. Pet foods can include, without limitation, nutritionally balanced compositions suitable for daily feed, such as kibbles, as well as supplements and/or treats, which can or can not be nutritionally balanced.

As used herein, the term "core", or "core matrix", means the particulate pellet of a kibble and is typically formed from a core matrix of ingredients and has a moisture, or water, content of less than 12% by weight. The particulate pellet may be dusted to form a dusting on a core, which can be a dusted kibble. The core may be without a dusting, may be with a dusting completely surrounding the core, or may be with a dusting partially surrounding the core. In an embodiment without a dusting, the particulate pellet may comprise the entire kibble. Cores can comprise farinaceous material, proteinaceous material, and mixtures and combinations thereof. In one embodiment, the core can comprise a core matrix of protein, carbohydrate, and fat.

As used herein, the term "coating" means a partial or complete covering, typically on a core, that covers at least a portion of a surface, for example a surface of a core. In one example, a core may be partially covered with a coating such that only part of the core is covered, and part of the core is not covered and is thus exposed. In another example, the core may be completely covered with a coating such that the entire core is covered and thus not exposed. Therefore, a coating may cover from a negligible amount up to the entire surface. A coating can also be coated onto other coatings such that a layering of coatings can be present. For example, a core can be completed coated with coating A, and coating A can be completely coated with coating B, such that coating A and coating B each form a layer. When used herein, unless specifically stated, a coating means a coating that comprises a Probiotic or other active. Thus, for example, an amount of fat that is normally enrobed or applied to a kibble would not be considered a coating within the present definition unless specifically provided for as a coating.

As used herein, the term "nutritionally balanced" means that the composition, such as pet food, has known required nutrients to sustain life in proper amounts and proportion based on recommendations of recognized authorities, including governmental agencies, such as, but not limited to, United States Food and Drug Administration's Center for Veterinary Medicine, the American Feed Control Officials Incorporated, in the field of pet nutrition, except for the additional need for water.

As used herein, the term "extrude" means an animal feed that has been processed by, such as by being sent through, an extruder. In one embodiment of extrusion, kibbles are formed by an extrusion processes wherein raw materials, including starch, can be extruded under heat and pressure to gelatinize the starch and to form the pelletized kibble form, which can be a core. Any type of extruder can be used, non-limiting examples of which include single screw extruders and twin-screw extruders.

As used herein, the term "higher melting point temperature component" means the component has a melting point temperature higher than 30° C.

As used herein, the term "water activity" is defined as the vapor pressure of water above a sample, such as a pet food, divided by that of pure water at the same temperature and generally refers to the amount of free water available to participate in chemical reactions. Water activity is often times represented by the mathematical equation $a_w = p/p_0$, where p is the vapor pressure of water in the sample, and $p_0$ is the vapor pressure of pure water at the same temperature.

Unless otherwise noted, all component or composition levels are in reference to the active portion of that component or composition, and are exclusive of impurities, for example, residual solvents or by-products, which can be present in commercially available sources of such components or compositions.

All percentages and ratios are calculated by weight unless otherwise indicated. All percentages and ratios are calculated based on the total composition unless otherwise indicated.

It should be understood that every maximum numerical limitation given throughout this specification includes every lower numerical limitation, as if such lower numerical limitations were expressly written herein. Every minimum numerical limitation given throughout this specification will include every higher numerical limitation, as if such higher numerical limitations were expressly written herein. Every numerical range given throughout this specification will include every narrower numerical range that falls within such broader numerical range, as if such narrower numerical ranges were all expressly written herein.

All lists of items, such as, for example, lists of ingredients, are intended to and should be interpreted as Markush groups. Thus, all lists can be read and interpreted as items "selected from the group consisting of" . . . list of items . . . "and combinations and mixtures thereof."

Referenced herein can be trade names for components including various ingredients utilized in the present disclosure. The inventors herein do not intend to be limited by materials under any particular trade name. Equivalent materials (e.g., those obtained from a different source under a different name or reference number) to those referenced by trade name can be substituted and utilized in the descriptions herein.

In the description of the various embodiments of the present disclosure, various embodiments or individual features are disclosed. As will be apparent to the ordinarily skilled practitioner, all combinations of such embodiments and features are possible and can result in preferred executions of the present disclosure. While various embodiments and individual features of the present invention have been illustrated and described, various other changes and modifications can be made without departing from the spirit and scope of the invention. As will also be apparent, all combinations of the embodiments and features taught in the foregoing disclosure are possible and can result in preferred executions of the invention.

Kibbles

Various non-limiting embodiments of the present invention include an animal feed kibble comprising a core and at least one coating on the core. Various embodiments describing the specific ingredients that can comprise the core and coating are described hereinafter, and it should be understood that embodiments of the present invention are not limited to the specific ingredients that are used for the core and the coating, as any variety of ingredients can be used. For example, a protein-based core matrix can be used in one embodiment. Additional non-limiting examples of cores can include starch-based cores, such as a matrix of gelatinized starch, and cores comprising protein, fat, and carbohydrate. Additional non-limiting embodiments of the core can be vegetable based cores and are provided hereinafter.

According to one embodiment, an animal feed comprising a kibble comprising a core and a coating, wherein the coating comprises an active, such as a Probiotic component, is disclosed. As described hereinafter, the animal feed can comprise a plurality of kibbles. The coating of one kibble can comprise a distinctly different color than the core and/or the coating of another kibble of the animal feed comprising the plurality of kibbles. The phrase "distinctly different" means easily distinguishably to an ordinary consumer's eye and not the same. For example, red and blue are distinctly different colors, as are brown and white. However, white and off-white cannot be considered distinctly different colors, from each other, if they are not easily distinguishable to an ordinary consumer's eye.

In one embodiment, the coating can be the outermost portion of the kibble and thus can be visible to an ordinary consumer in its final product form, as in a food package. The coating can comprise a single color or even many, or a plurality of, colors. "Color" as used herein means a visual effect resulting from a human eye's ability to distinguish the different wavelengths or frequencies of light. The apparent color of an object depends on the wavelength of the light that it reflects. All colors are envisioned as being within the scope of embodiments of the present invention. Non-limiting examples of colors include white, red, green, blue, yellow, purple, tan, brown, beige, black, gray, orange, pink, lavender, lights, darks, and "offs" of the colors listed herein (such as, for example "lights" such as light blue, "darks" such as dark green, and off-white) and combinations and mixtures thereof.

In another embodiment, kibbles can be dusted with an active. Thus, wherever within this disclosure the term coating is used, it should be understood that dusting can also be used. For example, a kibble can have a core and a coating, wherein the coating contains a fat and an active. In another non-limiting example, a kibble can be dusted with an active ingredient, such as a Probiotic, wherein the kibble is a dusted kibble. The dusted kibble can be colored or made distinctive in similar ways as coated kibbles.

When color is used for distinction of the kibble, such as when a kibble is colored such that it is visible to a consumer, as mentioned above, it can be utilized to indicate that a health benefit is being provided by the animal feed. A color can be associated with, or connote, a certain health benefit provided by the animal feed, or kibble. For example, white can be used to indicate that a gastrointestinal benefit can be provided by the animal feed, such as through a Probiotic component contained in a kibble, a non-limiting example of which can be the Probiotic contained in the coating of the kibble. Red can be used to indicate that an anti-stress benefit can be provided by the animal feed, such as through a Probiotic component contained in a kibble, a non-limiting example of which can be the Probiotic contained in the coating of the kibble. Or, in another embodiment, red can be used to indicate that a cardiac health benefit can be provided by the kibble. Any color can be used, and any color can be matched with a specific health benefit. Other non-limiting examples can include blue kibbles that connote a mobility health benefit.

As disclosed herein, in one embodiment of the present invention, the kibbles can be colored. The kibbles can be colored any color, as disclosed herein. In one non-limiting example, the kibbles can be colored white. The kibbles can be colored white using any known colorants or coatings as known in the art. In non-limiting examples, coatings such as KLX (available from Loders Croklaan, Channahon, Ill.) or white kreemy chocolate (available from Blommer, Chicago, Ill.) can be used. These coatings can be applied in any desirable amounts to impart the particular color that is desired. In one embodiment, the coating is applied at from about 1% to 70% by weight of the kibble. In another embodiment, the coating is applied at from about 5% to about 70% by weight of the kibble. In another embodiment, the coating is applied at from about 10% to about 70% by weight of the kibble. In another embodiment, the coating is applied at from about 20% to about 60% by weight of the kibble. In another embodiment, the coating is applied at from about 20% to about 50% by weight of the kibble. All integer value ranges there between are also included as embodiments of coatings that can be applied. Other non-limiting examples of components used for color can include titanium dioxide, which can be used for a white color, stearine, which can be used for a white color, caramel, which can be used for brown, all natural colorants, and specific examples such as CSL 37542 Brown Dispersion OB, available from Sensient Colors of St. Louis, Mo. However, it should further be understood than any fat soluble colorant can be used, including natural or non-natural colorants. As non-limiting examples, the compositions herein may comprise about 0.1%, about 0.2%, about 0.3%, about 0.4%, or about 0% to about 1% colorant, all by weight of the composition.

Other coatings that can impart color can be used. For example, coating materials for use in the active coatings, such as a Probiotic-enriched coating, described herein may demonstrate characteristics and features, such as, providing stability (as described in detail herein) to the active ingredients) in the coating. Further, as described herein, when the coating is a Probiotic-enriched coating, the coating may also be formulated to ensure sufficient amount of the Probiotic microorganisms are released in the digestive system of the animal (i.e., the Probiotics become bioactive). Suitable coating compositions include, but are not limited to, cocoa butter, palm kernel oil, palm oil, cottonseed oil, soybean oil, canola oil, rapeseed oil, peanut oil, butter oil, hydrogenated and partially hydrogenated derivatives of oils and fats (including those listed herein), wax, paraffin, paraffin wax, paraffin oil, liquid paraffin, solid paraffin, candelilla wax, carnauba wax, microcrystalline wax, beeswax, long chain fatty acids and esters thereof, capric acid, myristic acid, palmitic acid, stearic acid, oleic acid, lauric acid, behenic acid, adipic acid, acetyl acyl glycerols, acetylated monoglyceride, shellac, dewaxed gumlac, triolein, chocolate, chocolate liquor, sweet milk chocolate, cocoa solids, methylcellulose, carboxymethylcellulose, hydroxypropylmethylcellulose, glycerol monostearate, polyethylene glycol, pectin, wheat gluten, soy lecithin, sodium caseinate, whey protein isolate, whey protein concentrate, stearyl alcohol, cetyl alcohol, behenyl alcohol, olestra, tristearin, animal fat, poultry fat, and mixtures of any thereof. In other embodiments, the at least one additional coating may comprise one or more partially hydrogenated plant oils or plant oils high in saturated fats (i.e., plant oil that is substantially solid at room temperature). In another embodiment an additional coating can comprise a coating comprising partially hydrogenated plant oil on at least a portion of a surface of the active coating or a coating on at least a portion of a surface of one or more intermediate coatings on the surface of the active coating. A coating comprising partially hydrogenated plant oil may assist in the stability of the kibble and the Probiotic, thereby increasing shelf life of the animal feed.

For example, partially hydrogenated plant oil, such as soybean oil, corn oil, cottonseed oil, cocoa butter, palm kernel oil, palm oil, canola oil, rapeseed oil, peanut oil, butter oil, and the like (including oil mixtures), may prevent transmission of water, oxidation or other degradation processes. Suitable examples of higher melting point temperature components, such as fats, which can be used as a coating agent include, but are not limited to, waxes such as, but not limited to, candelilla wax, carnauba wax, microcrystalline wax, and bees wax; fatty acids and esters thereof such as, but not limited to, capric acid, lauric acid, myristic acid, palmitic acid, stearic acid, oleic acid, and behenic acid; hydrogenated oils and fats, such as, but not limited to, hydrogenated soybean oil, hydrogenated cottonseed oil, hydrogenated palm oil, hydrogenated peanut oil, hydrogenated rapeseed oil, hydrogenated corn oil, hydrogenated poultry fat, hydrogenated tallow, hydrogenated lard, and hydrogenated fish oil; partial glycerides of hydrogenated fats and oils, such as, but not limited to all those listed herein; fatty alcohols, such as, but not limited to, cetyl alcohol, stearyl alcohol, and behenyl alcohol; and combinations of any thereof. In certain embodiments, the partially hydrogenated plant oil or other coating composition disclosed herein can have a melting point ranging from 25° C. to 70° C., or in certain embodiments ranging from 45° C. to 70° C. In certain embodiments, the kibble can comprise from 0.01% to 20% by weight of the coating comprising partially hydrogenated plant oil or one of the other coating compositions disclosed herein.

Various other embodiments of the animal feed kibbles described herein may further comprise at least one additional coating. For example, the at least one additional coatings may include one or more coatings containing additional active ingredients (including those described herein) or one or more Probiotic-enriched coatings. In other embodiments, the one or more additional coatings may comprise only the coating material, wherein the one or more additional coating may increase the stability of the food composition.

The colors as disclosed herein can be represented by the Hunter Lab color space. As is well known in the art, the Hunter values are a measure of reflected light and use three parameters: L, a, and b. Generally, "L" denotes the level of white/black, or lightness, and the "a" and "b" values are termed the opponent color axes. The "a" opponent color axis represents, approximately, the redness or greenness (positive or negative) while the "b" opponent color axis represents the yellowness or blueness (positive or negative). The color white can be represented by an "L" value of 100 while the color black is represented by an "L" value of 0. The color gray can be represented by "L" values between 0 and 100 at a and b values of zero. The color red can be represented by a positive "a" value while the color green can be represented by a negative "a" value. The color yellow can be represented by a positive "b" value while the color blue can be represented by a negative "b" value. All values included and therebetween for each of the colors associated with the Hunter values are within the scope of the embodiments of this invention and can be represented as red, green, blue, yellow, purple, tan, brown, beige, black, white, gray, orange, pink, lavender, pink and combinations and mixtures thereof based on their particular Hunter Lab values as understood in the art.

The present compositions, including the Probiotic compositions, as mentioned, can be used to deliver a health benefit or health benefits following oral consumption in animals, such as a pet. This benefit generally maintains and improves the overall health of the animal. Non-limiting elements of animal health and physiology that benefit, either in therapeutically relieving the symptoms of, or disease prevention by prophylaxis, or improvement of overall health, include treatment of the immune system, treatment of the gastrointestinal system, treatment of skin or coat, treatment of stress, treatment or improved physical abilities, and mixtures and combinations thereof. Non-limiting examples include inflammatory disorders, immunodeficiency, inflammatory bowel disease, irritable bowel syndrome, cancer (particularly those of the gastrointestinal and immune systems), otitis externa, diarrheal disease, antibiotic associated diarrhea, appendicitis, autoimmune disorders, multiple sclerosis, Alzheimer's disease, amyloidosis, rheumatoid arthritis, arthritis, joint mobility, hip dysplasia, diabetes mellitus, insulin resistance, bacterial infections, viral infections, fungal infections, periodontal disease, urogenital disease, idiopathic cystitis, interstitial cystitis, surgical associated trauma, surgical-induced metastatic disease, sepsis, weight loss, weight gain, excessive adipose tissue accumulation, anorexia, fever control, cachexia, wound healing, ulcers, gut barrier infection, allergy, asthma, respiratory disorders, circulatory disorders, coronary heart disease, anemia, disorders of the blood coagulation system, renal disease, disorders of the central nervous system, hepatic disease, ischemia, nutritional disorders, treatment or prevention of disorders involving the hypothalamus-pituitary-adrenal (HPA) axis, osteoporosis, endocrine disorders, and epidermal disorders. Preferred are treatment of the gastrointestinal tract, including treatment or prevention of diarrhea; immune system regulation, preferably the treatment or prevention of autoimmune disease and inflammation, maintaining or improving the health of the skin and/or coat system, preferably treating or preventing atopic disease of the skin (e.g., dermatitis or eczema), treatment or prevention of disorders involving the hypothalamus-pituitary-adrenal (HPA) axis, ameliorating or reducing the effects of aging, including mental awareness and activity levels, and preventing weight loss during and following infection. Treatment of the various disorders described herein, and additional disclosed disorders thereof, can be measured using techniques known to those of ordinary skill in the art, for example, those methods of measurement disclosed in U.S. Published Application No. US 2006/0228448A1.

The coating can comprise a singular color or even mixtures of colors and can be used over the entire coating or coatings in the case of multiple coatings, or portions thereof. Thus, in one embodiment the coating can be entirely white. In another embodiment the coating can be half red and half white. Any combination and/or mixture of colors is envisioned for the coating, and the coating can comprise these combinations and mixtures in any arrangement, such as half and half in the case of two colors. The color can be used in the form of other indicia as well. For example, the color can be a stripe, or multiple stripes, going across any portion of the kibble, or coating thereon. The color can be in the form of other shapes, stripes, and combinations of colors. These specific indicia can be used to indicate other health benefits provided by the animal feed.

Thus, as mentioned, the appearance of a kibble in the form of a colored coating can be associated with, connote, or communicate, to a consumer, a health benefit that is provided by the kibble. Such communication can be intuitive. For example, after usage of a particular animal feed, such as a kibble or a supplement, a consumer can relate a particularly colored kibble with a particular health benefit. Any other indicia described above can be related by a consumer with a particular health benefit. Thus, at a point, the animal feed and/or the package can intuitively communicate with a consumer such that the consumer readily identifies the animal feed and/or the package with a certain health benefit, and such identification by the consumer can be based on the indicia related to the animal feed and/or the package. "Communicate" as used herein means conveying information to a consumer about a product through indicia, including the color of animal feed. In one example, the information about the product can be conveyed to a consumer by color, such as a colored coating of a kibble, and wherein a cue or other information can be used to inform the consumer about the color. "Intuitively communicate" as used herein means conveying information using the indicia that a consumer interprets, including the color of animal feed. In one example, "intuitively communicate" can mean a consumer interpreting and thus associating a colored coating of a kibble with a health benefit that can be provided by the kibble. In another example, "intuitively communicate" can mean a consumer interpreting a colored coating of a kibble with a particular ingredient included in the colored coating, such as a white colored coated kibble that contains a Probiotic ingredient. In turn, that particular ingredient, for example the Probiotic, can then connote a health benefit that is provided by the kibble. Thus, in both examples, the colored coating of the kibble connotes something additional and beyond just a coated kibble. The consumer intuitively makes the connection between either the white coating and the health benefit with the use of other cues such as written language or between the white coating and the Probiotic ingredient and then to the health benefit. In both cases, the animal feed can be communicating to the consumer, through the use of a colored coating, that a health benefit is being provided.

Such communication can result in the consumer matching a certain color to a certain health benefit. For example, certain colors inherently are recognized as, or connote, a particular health benefit to a consumer. Thus, the consumer already has psychologically matched a particular color with a particular health benefit. "Psychologically matched" as used herein means that indicia itself connotes (i.e., serves as a symbol for; signifies; represents something) a property of the animal feed. For example, the color white can connote a gastrointestinal health benefit property of the kibble. Therefore, a consumer of the animal food can identify and/or select a package animal feed that provides a health benefit of their choosing. The psychologically matched indicia can aid the consumer in selecting which health benefit that they want to provide to their animal. The consumer is able to interpret the intuitive communication from the indicia to be consistent with the health benefit provided by the animal feed.

Psychologically matching a particular color to a particular health benefit can be performed by consumers so that they choose a particular animal feed based on the benefit that they desire for their pet. Such testing of the intuitive communication and psychologically matching, as described above, is described in further detail hereinafter.

Moreover, other sensory attributes of the animal feed beyond that of color can also intuitively communicate. For example, a white coated kibble with a particular luster can connote a health benefit related to the gastrointestinal tract of a dog. Consumers can psychologically match a white coated kibble with a healthy gastrointestinal tract, or improved digestive health, because they connote these kibble properties with yogurt, which is well known to the general public to provide digestive health benefits to humans. The present inventors have determined that consumers have extended that learning associated with yogurt, or psychologically matching, into the animal food arena. Thus, visual properties of animal feed can intuitively communicate to consumers, resulting in them psychologically matching colors to health benefits. Moreover, in at least one embodiment of the present invention, a kibble can look, appear, resemble, or give the impression that it is yogurt covered, such as like a yogurt covered raisin. Thus, one embodiment includes a yogurt-looking kibble. As used herein, "yogurt-looking" means resembling the appearance or giving the impression that the thing, such as a kibble, is covered with yogurt, such as a yogurt covered raisin.

It is well known by most consumers that Probiotics can be an important ingredient in animal feed as it can provide health benefits. It has been found that while using Probiotics in animal feed, and marketing the animal feed as such, is becoming a familiar consumer idea, it can still be important to clearly explain and define Probiotics. However, some embodiments of animal feed that include a Probiotic component can intuitively communicate with consumers, as explained above. Thus, animal feed that comprises a kibble with a white coating that resembles yogurt can intuitively communicate with a consumer.

Thus, in at least one embodiment, the appearance of the kibble, in particular the white coated kibble, can connote a digestive health benefit to consumers. Remarkably, the white coated kibble can communicate to a consumer by psychologically matching the appearance of the kibble, namely the kibble having a colored white coating, to a health benefit, namely a digestive health benefit, as described above. Thus, the consumer, when observing the appearance of the animal feed as a white colored kibble, can perceive a health benefit that can be provided by the kibble based on their knowledge of other food products, such as yogurt. In sum, the appearance of the kibbled dog food can connote to the consumer a health benefit that is perceived or recognized based on their experience with human food.

In addition to the appearance of the kibble, in one embodiment the kibble can be sold in a package that includes text on the package that highlights the benefits of the kibble, including the active kibble. This text can increase or enhance the connotation, psychological matching, and intuitive communication described herein. Thus in one embodiment, the following text can be included on packages or marketing materials to increase or enhance the connotation, psychological matching, and intuitive communication described herein. Non-limiting examples include:

For Digestive Health:
Protects and enhances digestive health.
Quickly relieves pets' diarrhea while establishing a balance of natural gut flora.
Soothes gastrointestinal tract (GI) discomfort in pets caused by change of diets, excess gas and irregularity.
Prevents stress-induced digestive disorders in pet.
Soothes inflammation in the bowels caused by GI disorders and restores proper digestive balance.
Helps lessen reliance on antibiotic therapy during GI upset while promoting and maintaining digestive health.
Continued use will improve pets' overall GI health and lessen future instances of diarrhea, flatulence, constipation and other digestive complications.
Introducing a new Probiotic product that naturally heals and protects your dog's (cat's) digestive system.
Continued use of a daily regime will maintain the proper balance of natural gut flora for healthy digestion.
Fortified with active canine/feline probiotic cultures to increase natural flora in the lower intestinal tract.

Fortified with active canine/feline probiotic cultures to provide a natural, safe, gentle way to promote healthy digestion.

Fortified with active canine/feline cultures for better nutrient absorption and to enhance intestinal health.

Gentle enough for puppies and kittens because it works to restore and maintain a natural balance within the digestive system.

Prevents pathoegenic bacteria from adhering to the intestinal and colonic walls in order to reduce inflammation of the bowels and improve stool consistency It's inevitable—pets will eat things they shouldn't from time to time and experience GI distress such as gas pains, bloating, constipation and diarrhea.

It's hard on my clients when their pets are constantly sick or prone to re-occurring illness. I want to provide a natural therapy which will strengthen their pets' immunity and improve their quality of life.

Seventy-percent of a pet's immune system is in the digestive tract. This means that the digestive tract is the pet's first line of defense in keeping healthy.

Introducing a new Probiotic product that restores digestive health and family balance faster.

Introducing a new Probiotic product that can nutritionally manage your dog's digestive tract.

Introducing a new Probiotic product that manages stress diarrhea in your pet, restoring GI and family balance For Immunity, which can be Related to Digestive Health:

Not only manages GI problems, it helps to build the pet's immune system.

Introducing a new Probiotic product that actually activates every part of your dog's (cat's) immune system.

Introducing a new Probiotic product that increases your dog's (cat's) resistance to sickness and infection.

For Joints/Mobility:

Introducing a new Probiotic product that reduces stress on your dog's joints.

Introducing a new Probiotic product that promotes your dog's mobility and flexibility.

For Skin/Coat:

Introducing a new Probiotic product that protects your dog's skin and coat from the environment.

Introducing a new Probiotic product that decreases skin inflammation in your pet.

Introducing a new Probiotic product that strengthens your pet's first line of defense.

Introducing a new Probiotic product that improves the barrier function of your pet's skin.

As can be observed from the prototypes as represented by the figures herein, in one embodiment the animal feed can be colored in varying amounts and using varying colors. Thus, in non-limiting examples, one embodiment of an animal feed can comprise traditional kibbles and white colored kibbles, as a first kibble and a second kibble, respectively. These first kibbles and second kibbles are described in more detail herein. However, it is particularly noted that in one embodiment, the white colored kibble can comprise up to 1%, or up to 5%, or up to 10%, or up to 20%, or up to 30%, or up to 40%, or up to 50%, or up to 60% or up to 70%, or up to 80%, or even up to 90% of the animal feed, including all ranges therebetween. Thus, in one embodiment, an animal feed can comprise 100 kibbles, of which 90 of the kibbles can be kibbles not white coated while 10 of the kibbles can include a white coating. Of course, as described herein, any color can be used. Alternatively, the white colored kibble can be included in a specific ratio with the other kibbles of the animal feed, such as, for example, in a ratio of 1:20 to 20:1, and all ratios therebetween. Even more specifically, the animal feed, when sold in retailer stores in one embodiment, can be in traditional packaging, such as dog food bags, which are well known in the art. When packaged in the dog food bags, the white colored kibbles can be present in the amounts or ratios as disclosed hereinabove. Thus, in one embodiment, the white colored kibbles can be present as 10% of the mixture of kibbles in the dog food bag, such as 100 white colored coated kibbles and 900 not white colored kibbles, or uncoated kibbles with respect to the white coating. However, it should be understood that the white colored kibbles can be present in any amount or ratio as disclosed herein. Thus, in this specific embodiment, when the animal feed is purchased by a consumer and fed to the pet, about 10% of each portion fed to the pet can be the white colored kibble. Therefore, if the consumer uses a pet food bowl, the pet food bowl can have in it an animal feed with about 10% white colored kibbles when dispersed by the consumer. Of course, these amounts will not be exact as variations in the distribution and mixing of the white colored kibbles in the bag will undoubtedly take place and result in a random amount of white colored kibbles being dispersed by the consumer into a food bowl. However, the manufacturer of the kibbles can set specific target levels of the number of white coated kibbles to be packaged in a food package, such as 10% of the kibbles in this embodiment.

Active Kibble

In addition, in one embodiment, an animal feed can comprise traditional, non-active kibbles and kibbles containing an active, such as a Probiotic, as described in any of the embodiments herein. Non-active kibbles can be those kibbles that do not include an enriched amount of an active. Thus, a non-active kibble can be a first kibble, and a Probiotic-enriched kibble can be a second kibble. These first kibbles and second kibbles are described in more detail herein. However, it is particularly noted that in one embodiment, the active kibble can comprise up to 1%, or up to 5%, or up to 10%, or up to 20%, or up to 30%, or up to 40%, or up to 50%, or up to 60% or up to 70%, or up to 80%, or even up to 90% of the animal feed, including all ranges therebetween. Thus, in one embodiment, an animal feed can comprise 100 kibbles, of which 90 of the kibbles can be traditional non-active kibbles while 10 of the kibbles can comprise active kibbles, such as Probiotic containing kibbles. Of course, as described herein, any active can be used, and any ratio of active to non-active kibbles can be used. In one embodiment, the active kibble can be included in a specific ratio with the other kibbles of the animal feed, such as, for example, in a ratio of 1:20 to 20:1, and all ratios therebetween, such as 1:9 in the case of a 10% active and 90% non-active kibble blend. Even more specifically, the animal feed, when sold in retailer stores in one embodiment, can be in traditional packaging, such as dog food bags, which are well known in the art. When packaged in the dog food bags, the active can be present in the amounts or ratios as disclosed hereinabove. Thus, in one embodiment, the active kibbles can be present as 10% of the mixture of kibbles in the dog food bag, such as 100 active kibbles and 900 non-active kibbles. However, it should be understood that the active kibbles can be present in any amount or ratio as disclosed herein. Thus, in one specific embodiment, when the animal feed is purchased by a consumer and fed to the pet, about 10% of each portion fed to the pet can be the active kibble. Therefore, one embodiment, if the consumer uses a pet food bowl, the pet food bowl can have in it an animal feed with about 10% active kibbles when dispersed by the consumer. Of course, these amounts will not be exact as variations in the distribution and mixing of the active kibbles in the bag will undoubtedly take place and result in a random amount of active kibbles being dispersed by the consumer into a food bowl. However, the manufacturer of the kibbles can set specific target levels of the number of active kibbles to be packaged in a food package, such as 10% of the kibbles in one non-limiting example.

In one embodiment, kibbles can be distinctive. In one embodiment, active kibbles can be distinctive from the non-active kibbles. In one embodiment, non-active kibbles can be distinctive from other non-active kibbles. In one non-limiting example, the active kibbles can be colored, such as colored white or any other color that is different than the non-active kibble, as described herein. Thus, in one embodiment, an animal feed can comprise active kibbles and non-active kibbles, wherein the non-active kibbles can be any color, such as brown, and wherein the active kibbles can be generally a white color, or any other color that is distinctive from the color of the non-active kibble. As used herein, the term "distinctive" means capable of being distinguished by the human eye, such as being perceived to being different. Thus, in one embodiment wherein the non-active kibbles are brown and the active-kibbles are white, the white colored kibbles can be considered distinctive from the brown kibbles. Any colors, such as those disclosed herein, can be used for the non-active kibbles and for the active kibbles. Other points of distinction to form a distinctive kibble, in addition or alternative to color, can be the size of the kibble, the shape of the kibble, particular markings on the kibble, difference in texture of the kibbles, embossing or debossings on the kibble, sprinkling of components on the kibble, among others that could make active kibbles distinctive from non-active kibbles. Distinctive kibbles, in one embodiment, result in diversity of the appearance of the pet food kibbles, for example in a dog food bowl. In a non-limiting sprinkling embodiment, the kibbles can be sprinkled with a component, such as any of the components, ingredients, and/or actives herein. Such a sprinkling can be with or without an adhesive for adhering to the kibble. The sprinkling can result in a kibble with sprinkles of components, ingredients, and/or actives that make the kibble distinctive compared to non-sprinkled kibbles. In a non-limiting example, carrots could be chopped and sprinkled onto the kibbles, such that they adhere to the kibble, with or without an adhesive. Thus, in one embodiment, the active kibbles can be distinctive from the non-active kibbles. This distinctive characteristic can be indicative of the kibble containing an active component, as described herein. The distinctive characteristic, such as being colored white, can be indicative that the kibble contains an active component, and thus can indicate, or be a visual cue, to a consumer which kibbles are active and thus contain an active ingredient.

In another embodiment, an animal feed can comprise three types of kibbles: 1) non-active, non-distinctive kibbles, 2) non-active, distinctive kibbles, and 3) active, non-distinctive kibbles. Thus, in one embodiment, an animal feed can comprise: a first kibble, which can be a non-active, non-distinctive kibble; a second kibble, which can be a non-active, distinctive kibble, and a third kibble, which can be an active, non-distinctive kibble. Any combination or mixture of active and non-active and distinctive and non-distinctive kibbles can be used. Thus, in one embodiment, the animal feed can comprise three different types of kibbles. It is envisioned that certain processing limitations may limit or restrict the ability to make distinctive the active kibbles, such as, for example, if the active component of the active kibble is not able to be made distinctive, such as by coloring. Thus, in at least one embodiment, another kibble that is not the active can be made distinctive. This distinctive kibble therefore is the visual cue to a consumer that the animal feed as a whole contains active ingredients, such as an animal feed in packaging on a store shelf. Therefore, in one embodiment, an animal feed contains a mixture of a first kibble, a second kibble, and a third kibble, as described herein. These first kibbles, second kibbles, and third kibbles can be present in any particular ratios or blends. Thus, in one embodiment, the active, non-distinctive kibble can comprise up to 1%, or up to 5%, or up to 10%, or up to 20%, or up to 30%, or up to 40%, or up to 50%, or up to 60% or up to 70%, or up to 80%, or even up to 90% of the animal feed, including all ranges therebetween; the non-active, non-distinctive kibble can comprise up to 1%, or up to 5%, or up to 10%, or up to 20%, or up to 30%, or up to 40%, or up to 50%, or up to 60% or up to 70%, or up to 80%, or even up to 90% of the animal feed, including all ranges therebetween; the non-active, distinctive kibble can comprise up to 1%, or up to 5%, or up to 10%, or up to 20%, or up to 30%, or up to 40%, or up to 50%, or up to 60% or up to 70%, or up to 80%, or even up to 90% of the animal feed, including all ranges therebetween. In another embodiment, the amount of distinctive kibbles can be about the same as the amount of active kibbles. Thus, in one embodiment, an animal feed can comprise 100 kibbles, of which 80 of the kibbles can be traditional non-active, non-distinctive kibbles while 10 of the kibbles can comprise active, non-distinctive kibbles, such as Probiotic containing kibbles, and 10 of the kibbles can be non-active, distinctive kibbles, such as while colored kibbles. Of course, as described herein, any active can be used, and any ratio of active to non-active to distinctive kibbles can be used. In one embodiment, the active kibble can be included in a specific ratio with the other kibbles of the animal feed, such as, for example, in a ratio of 1:20 to 20:1, and all ratios therebetween, such as 1:8:1 in the case of a blend of: 10% active, non-distinctive; 80% non-active, non-distinctive; and 10% non-active, distinctive kibble blend. In another embodiment the first kibble, second kibble, and third kibble can be present in a ratio from between about 20:1:1 to about 1:20:20.

Properties of the Kibble

In some embodiments, more than one color can be used to indicate more than one health benefit being provided. Furthermore, other certain indicia can be used, particularly consumer conscious indicia. Consumer conscious indicia can include, for example, a picture, or outline, of a companion animal, such as a dog. As non-limiting examples, the outline of a dog can include target areas. Target areas can be areas or body parts of the dog that are highlighted, pointed to, or emphasized in any way and can signal the area of the dog, or other companion animal, that the type of health benefit that is being provided by the kibble. For example, a target area can generally be located in or around the gastrointestinal tract of the dog. The location can then signify to a consumer that the kibble contained within the package can be a kibble that is associated with or for treating the gastrointestinal health of the dog. Other non-limiting areas of the dog that can be used, for example, would include skin and coat, eye health, diarrheal, and all other areas or body parts of the dog or companion animal that can be represented by health benefits for which an animal feed can provide health benefits. Moreover, the actual target can be exemplified by any indicia. Non-limiting examples include trademarks, logos, stars, targets, highlighting, colors, etc. For example, a trademark can be used at the point of treatment, such as a paw print on the gastrointestinal tract. Of course, any animal can be used, and any combination of these indicia can be used for a specific health benefit and can be used in combination.

A color sleeve or meter can also be included, such as on the package. For example, any package containing a kibble sold by a specific company can include a color meter. Such a color meter can include an identification of all of the health benefits and their associated color indicia used on the packaging. In a non-limiting example, a color meter can be rectangular, or any other shape, and can have color strips. Color strips can be an actual color. Color strips can be labeled in any fashion with a health benefit that is associated with that color. Such a color strip can be included on all packages such that a consumer can be informed, or communicated with, of the animal feed offerings for particular health benefits of a particular company and can then best locate the particular animal feed and health benefit easily by using the color associated with that health benefit.

Packaging

The animal feed of the embodiments described herein can be packaged in any suitable package or container. At least one embodiment of a package or container can comprise a bag. The bag can include an opaque portion and a transparent portion, wherein the transparent portion comprises a viewing aperture. The viewing aperture can be such that a kibble of the animal feed can be viewable by a consumer through the viewing aperture when the package is in a customary position on a retail store shelf. A viewing aperture can comprise a transparent film or window allowing a customer to see the contents inside the package. A customary position can be the normal position and location of a package when it is on a retail store shelf, such as on a shelf in an aisle of a Wal-Mart store. Such a viewing aperture can allow a consumer to notice the color and form of the animal feed inside the package. Thus, the consumer can recognize that a kibbled feed is provided that is colored, such as having a colored coating. Therefore, in one embodiment, a bag can provide a pet food in the form of kibbles, the kibbles can include kibbles that are distinctive and kibbles that can contain an active, such as kibbles that are white and kibbles that are active. The white kibbles can be the same as the active kibbles. In one embodiment, such kibbles can be provided in a 90:10 ratio of non-active kibbles to active kibbles. As above, the consumer then can associate the color with a health benefit. This additional ability of the consumer to view the animal feed through the transparent viewing aperture can result in increased awareness of the particular animal feed being provided by a particular pet food product on a store shelf. Further, consumer identification, recognition, and connection with kibbles, especially Probiotic kibbles, can occur.

According to one embodiment, a kit is provided. The kit can comprise a package as disclosed herein and an animal feed inside the package, wherein the animal feed can comprise kibbles as disclosed herein. The kibbles can comprise a first kibble, a second kibble, and even a third kibble, all as disclosed herein The kibbles can include an active kibble that can be a distinctive kibble, such as a white coated kibble. Any of the packages as disclosed herein can be a package that can comprise an opaque portion and a transparent portion, wherein the transparent portion comprises a viewing aperture that allows a consumer to view the animal feed, or kibbles, inside the package.

Kibbles

Kibble-type animal feeds, such as dog and cat foods, can be dried, ready-to-eat pet food products. The kibbles can be formed by an extrusion process where the kibble raw materials are extruded under heat and pressure to form the pelletized kibble form or core. Extrusion technology can provide an inexpensive and efficient method for formulating animal feed kibbles, such as those having a starch matrix. During the extrusion process, the kibble raw materials, which can comprise the starch matrix, typically results in the starch matrix becoming gelatinized under the extrusion conditions, forming a gelatinized starch matrix.

A process of manufacture of the pet food product can generally include mixing components to form a core material mixture, extruding the core material mixture to form a core pellet, drying the core pellet, and optionally applying a dusting component to the dried core pellet to form a food pellet, and packaging the food pellets. In one embodiment, the food pellet can be the final desired food product. In one embodiment, the food pellet can undergo dusting steps to form the food product as desired.

The components used to form a core material or core matrix can be any individual starting components, including, but not limited to, farinaceous material, proteinaceous material, and combination thereof. In one embodiment, the core material can include, but is not limited to, protein materials, starch materials, fiber materials, fat materials, mineral materials, vitamin materials, and mixtures and combinations thereof. Protein materials can include, but are not limited to, chicken meal, chicken, chicken by-product meal, lamb, lamb meal, turkey, turkey meal, beef, beef by-product, viscera, fish meal, entrails, and mixtures and combinations thereof. Starch materials can include, but are not limited to, cereals, grains, corn, wheat, rice, oats, corn grits, sorghum, grain sorghum, wheat bran, oat bran, amaranth, durum wheat, and mixtures and combinations thereof. Fiber materials can include, but are not limited to, fructooligiosaccharides, beet pulp, mannanoligosaccharides, oat fiber, citrus pulp, carboxymethylcellulose, gums such as gum Arabic guar gum and carrageen, apple and tomato pomaces, citrus fiber, fiber extracts, fiber derivatives, dried beet fiber, distillers dried grain solids, and mixtures and combinations thereof. Fat materials include, but are not limited to, poultry fat, chicken fat, turkey fat, pork fat, lard, tallow, beef fat, vegetable oils, corn oil, soy oil, cotton pellet oil, rape pellet oil, fish oil, menhaden oil, anchovy oil, palm oil, palm kernel oil, coconut oil, and mixtures and combinations thereof, and partially or fully hydrogenated versions of any of the aforementioned oils. Mineral materials can include, but are not limited to, sodium selenite, monosodium phosphate, calcium carbonate, potassium chloride, ferrous sulfate, zinc oxide, manganese sulfate, copper sulfate, manganese oxide, potassium iodide, cobalt carbonate, and mixtures and combinations thereof. Vitamin materials can include, but are not limited to, choline chloride, vitamin E supplement, ascorbic acid, vitamin A acetate, calcium pantothenate, pantothenic acid, biotin, thiamine mononitrate, vitamin B12 supplement, niacin, riboflavin supplement, inositol, pyridoxine hydrochloride, vitamin D3 supplement, folic acid, vitamin C, and mixtures and combinations thereof. In one embodiment, the core material can comprise additional components including, but not limited to, beef broth, brewers dried yeast, egg, egg product, flax meal, amino acids such as DL methionine, leucine, lysine, tryptophan, arginine, cysteine, aspartic acid, taurine, and mixtures and combinations thereof.

The core can comprise several ingredients that form a core matrix. In one non-limiting example, the core can comprise a carbohydrate source, a protein source, and/or a fat source. In one embodiment, the core can comprise from 20% to 100% of a carbohydrate source. In one embodiment, the core can comprise from 0% to 80% of a protein source. In one embodiment, the core can comprise from 0% to 15% of a fat source. The core can also comprise other ingredients as well. In one embodiment, the core can comprise from 0% to 80% of other ingredients.

The carbohydrate source, or starch ingredient or materials, can, in non-limiting examples, comprise cereals, grains, corn, wheat, rice, oats, corn grits, sorghum, grain sorghum/milo, wheat bran, oat bran, amaranth, Durum, and/or semolina. The protein source, ingredient, or materials, can, in non-limiting examples, comprise chicken meals, chicken, chicken by-product meals, lamb, lamb meals, turkey, turkey meals, beef, beef by-products, viscera, fish meal, enterals, kangaroo, white fish, venison, soybean meal, soy protein isolate, soy protein concentrate, corn gluten meal, corn protein concentrate, distillers dried grains, and/or distillers dried grains solubles. The fat source, ingredient, or materials, can, in non-limiting examples, comprise poultry fat, chicken fat, turkey fat, pork fat, lard, tallow, beef fat, vegetable oils, corn oil, soy oil, cottonseed oil, palm oil, palm kernel oil, linseed oil, canola oil, rapeseed oil, fish oil, menhaden oil, anchovy oil, and/or olestra.

According to another embodiment, the present disclosure provides an animal feed kibble comprising a protein-based core matrix that is greater than 70% by weight of a vegetable protein, wherein the protein-based core is substantially free of a matrix of gelatinized starch; and at least one coating comprising a fat and at least one additive, wherein the coating is on a surface of the protein-based core. In specific embodiments, the protein-based core matrix can comprise greater than 80% by weight of a vegetable protein. In still other embodiments the protein-based core matrix can comprise greater than 85%, 90%, or even 95% by weight of a vegetable protein. Specific examples of vegetable proteins include any vegetable derived protein that is substantially free or can be modified or manufactured to be substantially free of gelatinized starch. Examples of vegetable proteins suitable for use in the various embodiments of the present disclosure include, but are not limited to, distiller's dried grains ("DDG"), distiller's dried grain solubles ("DDGS"), corn protein concentrate ("CPC"), corn gluten meal ("CGM"), soy protein isolate ("SPI"), soy protein concentrate ("SPC"), wheat gluten ("WG"), rice protein isolate ("RPI"), rice protein concentrate ("RPC"), sorghum protein concentrate ("SorgPC"), oat protein concentrate ("OPC"), barley protein concentrate ("BPC"), and combinations of any thereof.

In specific embodiments, the kibble comprises from 25% to 99.99% by weight of the core matrix. In other embodiments, the kibble comprises from 50% to 99% by weight of the core matrix. Specific embodiments of the kibbles according to the present disclosure can include a core matrix that can further comprise one or more other ingredients, such as ingredients that can improve processing, stability, and/or palatability, or provide specific nutritional requirements. For example, the core matrix can further comprise at least one of corn syrup solids, minerals, vitamins, prebiotics (e.g., fructo-oligosaccharides, oligofructosaccharides, inulin, chicory, xylo-oligosaccharides, mannan-oligosaccharides, lactosucrose, galacto-oligosaccharides, or resistant starch), vegetable oils, animal fats, fish oils, mineral oils, amino acids, fibers, animal proteins, fish proteins, emulsifiers, processing aids, humectants, and dextrins.

In many applications, starch can be added to the protein component of the kibble feed to improve stability, such as by holding the components in the kibble form. In certain applications, it can be desirable to provide a kibble that is substantially free of starch. However, formulation of a kibble, such as a protein based kibble without starch is not straight forward since the kibble stability without starch is reduced. The inventors of the various embodiments of the present disclosure have developed methodologies to produce an extruded protein-based core matrix kibble that is substantially free of a matrix of gelatinized starch and where the kibble is greater than 70% by weight of a vegetable protein. Thus, one embodiment of the present disclosure provides a protein-based core matrix, wherein the protein-based core is substantially free of a gelatinized starch matrix. Specific embodiments can comprise a protein-based core that has less than 5%, 2%, 1%, or even 0.5% by weight of gelatinized starch. Still other embodiments, the protein-based core matrix can be essentially free of gelatinized starch. As used herein, the term "essentially free" when used in reference to concentration of a specific component in a composition means less than a measurable amount using methods of concentration measurements common in the art.

Various embodiments of the present disclosure can provide for an animal feed kibble comprising at least one coating or dusting comprising at least one additive. As described herein, when a coating or dusting is said to be on a surface of the core matrix, the coating can be either directly in contact with the core matrix or in contact with one or more other intermediate coatings on the core matrix (i.e., as a specific layer in a series of coating layers on the surface of the core matrix). In specific embodiments, the coating can comprise a fat in addition to the at least one additive. In other embodiments, a powder can be dusted onto the core, as disclosed herein.

In certain embodiments, the at least one coating or dusting can comprise at least one active coating or dusting on the surface of the core matrix. Examples of active components that can be incorporated or added into the active coatings or powder for dusting include, but are not limited to, sources of fiber ingredients, mineral ingredients, vitamin ingredients, polyphenols ingredients, amino acid ingredients, carotenoid ingredients, antioxidant ingredients, fatty acid ingredients, glucose mimetic ingredients, Probiotic ingredients, prebiotic ingredients, and still other ingredients, any of which can be considered a first component, a second component, a third component, etc. (out to any number of components). Suitable other actives can include biologics, for example, but not limited to, biologics selected from the group consisting of enzymes, antibodies, immunoglobulins, cytokines, epigenetic agents, vitamins, and Probiotic microorganisms, and mixtures and combinations of these. Sources of fiber ingredients can, in non-limiting examples, include fructooligosaccharides (FOS), beet pulp, mannanoligosaccharides (MOS), oat fiber, citrus pulp, carboxymethylcellulose (CMC), guar gum, gum arabic, apple pomace, citrus fiber, fiber extracts, fiber derivatives, dried beet fiber (sugar removed), cellulose, α-cellulose, galactooligosaccharides, xylooligosaccharides, and oligo derivatives from starch, inulin, chicory, psyllium, pectins, citrus pectin, guar gum, xanthan gum, alginates, gum arabic, gum talha, beta-glucans, chitins, lignin, celluloses, non-starch polysaccharides, carrageenan, reduced starch, soy oligosaccharides, trehalose, raffinose, stachyose, lactulose, polydextrose, oligodextran, gentioligosaccharide, pectic oligosaccharide, and/or hemicellulose. Sources of mineral ingredients can, in non-limiting examples, include sodium selenite, monosodium phosphate, calcium carbonate, potassium chloride, ferrous sulfate, zinc oxide, manganese sulfate, copper sulfate, manganous oxide, potassium iodide, and/or cobalt carbonate. Sources of vitamin ingredients can, in non-limiting examples, include choline chloride, vitamin E supplement, ascorbic acid, vitamin A acetate, calcium pantothenate, pantothenic acid, biotin, thiamine mononitrate (source of vitamin B1), vitamin B12 supplement, niacin, riboflavin supplement (source of vitamin B2), inositol, pyridoxine hydrochloride (source of vitamin B6), vitamin D3 supplement, folic acid, vitamin C, and/or ascorbic acid. Sources of polyphenols ingredients can, in non-limiting examples, include tea extract, rosemary extract, rosemarinic acid, coffee extract, caffeic acid, turmeric extract, blueberry extract, grape extract, grapeseed extract, and/or soy extract. Sources of amino acid ingredients can include 1-Tryptophan, Taurine, Histidine, Carnosine, Alanine, Cysteine, Arginine, Methionine, Tryptophan, Lysine, Asparagine, Aspartic acid, Phenylalanine, Valine, Threonine, Isoleucine, Histidine, Leucine, Glycine, Glutamine, Taurine, Tyrosine, Homocysteine, Ornithine, Citruline, Glutamic acid, Proline, peptides, and/or Serine. Sources of carotenoid ingredients can include lutein, astaxanthin, zeaxanthin, bixin, lycopene, and/or beta-carotene. Sources of antioxidant ingredients can, in non-limiting examples, include tocopherols (vitamin E), vitamin C, vitamin A, plant-derived materials, carotenoids (described above), selenium, and/or CoQ10 (Co-enzyme Q10). Sources of fatty acid ingredients can include arachidonic acid, alpha-linoleic acid, gamma linolenic acid, linoleic acid, eicosapentanoic acid (EPA), docosahexanoic acid (DHA), and/or fish oils as a source of EPA and/or DHA. Sources of glucose mimetic ingredients can include glucose anti-metabolites including 2-deoxy-D-glucose, 5-thio-D-glucose, 3-O-methylglucose, anhydro sugars including 1,5-anhydro-D-glucitol, 2,5-anhydro-D-glucitol, and 2,5-anhydro-D-mannitol, mannoheptulose, and/or avocado extract comprising mannoheptulose. Still other ingredients can, in non-limiting examples, include beef broth, brewers dried yeast, egg, egg product, flax meal, DL methionine, amino acids, leucine, lysine, arginine, cysteine, cystine, aspartic acid, polyphosphates such as sodium hexametaphosphate (SHMP), sodium pyrophosphate, sodium tripolyphosphate; zinc chloride, copper gluconate, stannous chloride, stannous fluoride, sodium fluoride, triclosan, glucosamine hydrochloride, chondroitin sulfate, green lipped mussel, blue lipped mussel, methyl sulfonyl methane (MSM), boron, boric acid, phytoestrogens, phytoandrogens, genistein, diadzein, L-carnitine, chromium picolinate, chromium tripicolinate, chromium nicotinate, acid/base modifiers, potassium citrate, potassium chloride, calcium carbonate, calcium chloride, sodium bisulfate; eucalyptus, lavender, peppermint, plasticizers, colorants, flavorants, sweeteners, buffering agents, slip aids, carriers, pH adjusting agents, natural ingredients, stabilizers, biological additives such as enzymes (including proteases and lipases), chemical additives, coolants, chelants, denaturants, drug astringents, emulsifiers, external analgesics, fragrance compounds, humectants, opacifying agents (such as zinc oxide and titanium dioxide), anti-foaming agents (such as silicone), preservatives (such as butylated hydroxytoluene (BHT) and butylated hydroxyanisole (BHA), propyl gallate, benzalkonium chloride, EDTA, benzyl alcohol, potassium sorbate, parabens and mixtures thereof), reducing agents, solvents, hydrotropes, solublizing agents, suspending agents (non-surfactant), solvents, viscosity increasing agents (aqueous and non-aqueous), sequestrants, and/or keratolytics.

In one embodiment, the active can comprise a Probiotic. According to specific embodiments, the active can comprise one or more bacterial Probiotic microorganism suitable for pet consumption and effective for improving the microbial balance in the pet gastrointestinal tract or for other benefits, such as disease or condition relief or prophylaxis, to the pet. Various Probiotic microorganisms known in the art are suitable for use in the present invention. See, for example, WO 03/075676, and U.S. Published Application No. US 2006/0228448A1. In specific embodiments, the Probiotic component can be selected from bacteria, yeast or microorganism of the genera *Bacillus, Bacteroides, Bifidobacterium, Enterococcus* (e.g., *Enterococcus faecium* DSM 10663 and *Enterococcus faecium* SF68), *Lactobacillus, Leuconostroc, Saccharomyces, Candida, Streptococcus*, and mixtures of any thereof. In other embodiments, the Probiotic can be selected from the genera *Bifidobacterium, Lactobacillus*, and combinations thereof. Those of the genera *Bacillus* can form spores. In other embodiments, the Probiotic does not form a spore. In another embodiment, the Probiotic can be freeze-dried or lyophilized. Non-limiting examples of lactic acid bacteria suitable for use herein include strains of *Streptococcus lactis, Streptococcus cremoris, Streptococcus diacetylactis, Streptococcus thermophilus, Lactobacillus bulgaricus, Lactobacillus acidophilus* (e.g., *Lactobacillus acidophilus* strain DSM 13241), *Lactobacillus helveticus, Lactobacillus bifidus, Lactobacillus casei, Lactobacillus lactis, Lactobacillus plantarum, Lactobacillus rhamnosus, Lactobacillus delbrukii, Lactobacillus thermophilus, Lactobacillus fermentii, Lactobacillus salvarius, Lactobacillus reuteri, Bifidobacterium longum, Bifidobacterium infantis, Bifidobacterium bifidum, Bifidobacterium animalis, Bifidobacterium pseudolongum*, and *Pediococcus cerevisiae*, or mixtures of any thereof. In specific embodiments, the Probiotic-enriched coating can comprise the bacterial strain *Bifidobacterium animalis* AHC7 NCIMB 41199. Other embodiments of the Probiotic-enriched coating can include one or more microorganisms identified in U.S. Published Application Nos. US 2005/0152884A1, US 2005/0158294A1, US 2005/0158293A1, US 2005/0175598A1, US 2006/0269534A1 and US 2006/0270020A1 and in PCT International Publication No. WO 2005/060707A2.

In certain embodiments, the active or Probiotic-enriched coating or dusting can have a viable Probiotic microorganism count of at least about $10^4$ colony forming units (CFU) per gram of the kibble, or at least about $10^5$ CFU per gram of kibble, or at least about $10^7$ CFU per gram of kibble. For example, the coating or dusting can have a viable Probiotic microorganism count of up to about $10^{11}$ CFU per gram of kibble, up to about $10^{11}$ CFU per gram of kibble, or up to about $10^9$ CFU per gram of kibble, or up to about $10^8$ CFU per gram of kibble. Enumeration as defined by CFU is determined using methods such as disclosed in U.S. Publication No. US 2006/0228448A1. Advantageously, the Probiotic enriched coatings or dustings provided herein having a shelf life of at least about three months, alternatively at least about six months, alternatively from about three months to about twenty-four months, alternatively from about six months to about eighteen months. In specific embodiments, the Probiotic enriched coatings or dustings can have a shelf life of at least 16 months. As used herein, the term "shelf life" refers to that property of the second component whereby about 1% or more, alternatively about 5% or more, alternatively about 10% or more, alternatively about 25% or more, alternatively about 50% or more, alternatively about 75% or more, of the Probiotic microorganisms of the Probiotic-enriched coating are viable at the referenced time period after exposure to ambient environmental conditions.

In specific embodiments, the active or Probiotic-enriched coating or dusting can comprise a yeast. Any of a variety of yeast can be utilized, and will be well-known in the art, such as those of the *Saccharomyces* genera (including, for example, *Saccharomyces cervisiae* (sometimes referred to as "Baker's yeast"), and *Candida utilis* (which can also be referred to as *Torulopsis utilis*). As used herein, yeast includes but is not limited to those incorporating one or more components incorporated from the environmental media upon which it is cultivated, such as mineral-enriched yeast. Various fermentation processes are well-known in the art.

In other embodiments, the active or Probiotic-enriched coating or dusting can comprise one or more enzymes. Enzymes particularly include those having beneficial biological activity in a pet, such as digestive or other therapeutic enzymes. Non-limiting examples include proteases, collagenases, lipases, amylases, cellulases, lysozymes, candidases, lactases, kinases, invertases, galactosidases, pectinases, ribonucleases (including deoxyribonucleases) and combinations thereof.

In other embodiments, the active or Probiotic-enriched coating or dusting can comprise one or more antibodies. Antibodies to viruses, pathogenic bacteria, parasites, or the like can be used in the coatings herein. Non-limiting examples include antibodies to feline rhinotracheitis, feline panleukopenia, feline calicivirus, feline pneumonitis, feline leukemia, canine distemper, canine parvovirus, coronavirus, *Borrelia burgdorferi* (Lyme Disease), *Toxoplasma gondii*, *E. coli*, campylobacter, *salmonella, clostridia*, bacteriodes, giardia, tapeworm, roundworm, coccidian, cryptosporidium, and combinations thereof.

In certain embodiments, the active or Probiotic-enriched coating or dusting can comprise one or more immunoglobulins. Non-limiting examples include immunoglobulin A (IgA), immunoglobulin M (IgM), immunoglobulin G (IgG), and combinations thereof. In other embodiments, the Probiotic-enriched coating can comprise one or more cytokines. Non-limiting examples include transforming growth factor beta (TGF-beta), tumor necrosis factor alpha (TNF-alpha), interleukin-4, interleukin-10, interleukin-12, and combinations thereof.

The active or Probiotic-enriched coating or dusting can also comprise a prebiotic. "Prebiotic" includes substances or compounds that are fermented by the intestinal flora of the pet and hence promote the growth or development of lactic acid bacteria in the gastro-intestinal tract of the pet at the expense of pathogenic bacteria. The result of this fermentation can include a release of fatty acids, in particular short-chain fatty acids in the colon. This can have the effect of reducing the pH value in the colon. Non-limiting examples of suitable prebiotics include oligosaccharides, such as inulin and its hydrolysis products, oligofructose, fructo-oligosaccharides, galacto-oligosaccharides, xylo-oligosaccharides or oligo derivatives of starch. The prebiotics can be provided in any suitable form. For example, the prebiotic can be provided in the form of plant material which contains the fiber. Suitable plant materials include asparagus, artichokes, onions, wheat or chicory, or residues of these plant materials. Alternatively, the prebiotic fiber can be provided as an inulin extract, for example extracts from chicory are suitable. Suitable inulin extracts can be obtained from Orafti S A of Tirlemont 3300, Belgium under the trade mark RAFTILINE. Alternatively, the fiber can be in the form of a fructo-oligosaccharide such as obtained from Orafti S A of Tirlemont 3300, Belgium under the trade mark RAFTILOSE. Otherwise, the fructo-oligosaccharides can be obtained by hydrolyzing inulin, by enzymatic methods, or by using micro-organisms.

In specific embodiments, the animal feed kibble of the present disclosure can comprise from 0.01% to 75% by weight of the Probiotic-enriched coating. In other embodiments, the kibble can comprise from 0.3% to 50% or from 0.4% to 25% by weight of the Probiotic-enriched coating. The amount of Probiotic-enriched coating used in a particular embodiment of the animal feed kibble can depend on a variety of factors, such as, but not limited to, Probiotic type(s), animal diet, animal nutritional needs, and/or formulation of the animal feed. For example, in certain embodiments, the animal feed or animal diet can comprise primarily the kibbles according to present disclosure. In such a case, the kibble can comprise lower percent (by weight) concentrations of the Probiotic enriched coating. In other embodiments, the animal feed or diet can comprise one or more other ingredients. For example, in one embodiment, an animal feed can comprise two or more kibble-type ingredients, including an active kibble having a vegetable protein-based core matrix that is substantially free of gelatinized starch and at least one Probiotic enriched coating (as described in detail herein), and one or more traditional kibbles. In such a case, the active kibble can comprise a higher percent (by weight) concentration of the Probiotic-enriched coating. The concentration of the Probiotic coating included on the kibble can be readily determined from the amount of Probiotic (or other active ingredient) that is desired to be administered to the animal.

Coating materials for use in the active coatings, such as a Probiotic-enriched coating, are described hereinabove.

Specific embodiments of the present disclosure provide for an animal feed kibble comprising a core matrix; and at least one active coating on at least a portion of a surface of the core matrix. In certain embodiments, the at least one active coating comprises at least one Probiotic-enriched coating, such as a coating enriched in one or more Probiotic microorganisms described herein.

In certain embodiments, the animal feed kibbles of the various embodiments described herein include a kibble comprising from 25% to 99.99% by weight of core matrix and comprising from 0.01% to 75% by weight of at least one active coating. Other embodiments of the animal feed kibbles can comprise from 50% to 99.7% by weight of core matrix and 0.3% to 50% by weight of the at least one active coating. Still further embodiments of the animal feed kibbles can comprise from 75% to 99.6% by weight of core matrix and 0.4% to 25% by weight of the at least one active coating. The animal feed kibbles according to these embodiments can additionally comprise at least one additional coating on at least a portion of a surface of the active coating (or on one or more intermediate coatings on the active coating), as described herein.

Dusting

One embodiment of the present invention provides a pet food in the form of a dusted kibble comprising a core, which can be extruded as described above, a dusting dusted onto the core. In one embodiment, the core can comprise from 50% to 100% of the entire dusted kibble. In one embodiment, the core can have a moisture content less than 12% and can comprise a gelatinized starch matrix, which can be formed by way of the extrusion process described herein. In one embodiment, the core can be nutritionally balanced.

In one embodiment, the dusted kibble comprises a core and a dusting. The core can comprise several ingredients that form a core matrix. In one non-limiting example, the core can comprise a carbohydrate source, a protein source, and/or a fat source. In one embodiment, the core can comprise from 20% to 100% of a carbohydrate source. In one embodiment, the core can comprise from 0% to 80% of a protein source. In one embodiment, the core can comprise from 0% to 15% of a fat source. The core can also comprise other ingredients as well. In one embodiment, the core can comprise from 0% to 80% of other ingredients.

Embodiments of the present disclosure can comprise animal feed kibbles comprising a kibble comprising a core matrix, as described herein, and a dusting. The dusting can comprise at least one active ingredient dusting on the surface of the core matrix and can be referenced as an active dusting, or a dusting comprising actives, or active components. Suitable actives are disclosed herein and include, for example, but not limited to, enzymes, antibodies, immunoglobulins, cytokines, epigenetic agents, vitamins, and Probiotic microorganisms and materials. Additionally, the dusting can comprise any of the active ingredients listed herein.

In specific embodiments, the active dusting can comprise at least one Probiotic enriched dusting. The Probiotic enriched dusting can, in non-limiting examples, comprise a Probiotic selected from the group consisting of a Probiotic component having a Probiotic microorganism activity of at least $10^5$ CFU/gram, yeast, enzymes, antibodies, immunoglobulins, cytokines, epigenetic agents, and mixtures and combinations thereof. In other embodiments, the Probiotic can be measured in reference to the weight of the kibble. As used herein, the terms Probiotic, Probiotic ingredient, Probiotic microorganism, and Probiotic agent are all used synonymously and interchangeably.

As mentioned above, the dusting can comprise a first component, such as an active as described above, which can be, but is not limited to, a Probiotic microorganism. In one embodiment, the first component can comprise the entire dusting such that the dusting is substantially free of other substances. In one embodiment, the dusting can comprise a second component, such as a second active as described above, which can be, but is not limited to, a vitamin. In still another embodiment, the dusting can comprise a third component, such as third active as described above, which can be, but is not limited to, a glucose mimetic. Other embodiments can include any number of components, such as additional actives as described above. Thus, the dusting can comprise any number of components, such as actives.

In one embodiment, the dusting and/or core can be free of or substantially free of a binding agent, binder, and/or carrier/carrier substrate for the dusting to be dusted on the core or other dustings in the case of multiple dustings. In one embodiment, a binder, binding agent, or carrier means a substance or composition that is used primarily for, or assisting in, securing, cohering, affixing, binding, adhering, or sticking a substance or composition to another substance or composition. For example, a fat ingredient, protein, water, flavor coatings can be used as a binder, binding agent, or carrier/carrier substrate for a Probiotic to adhere, or stick to, an animal feed, such as a pet food kibble. Thus, in one embodiment, a dusted kibble can comprise a core and a dusting, wherein substantially no binding agent, binder, or carrier is used. The dusting, as described herein, can in one non-limiting example comprise a Probiotic.

Dusting

In one embodiment, an active can be applied to a core using a dusting process, resulting in a dusted kibble. The active can comprise a Probiotic. While the dusting embodiment will be described in terms of dusting a Probiotic component onto a core, it should be understood that any ingredient conducive to dusting can be used and so the present Applicants are not meant to be limited to only Probiotics. Without being bound by theory, it is thought that Van der Waals forces provide for the appropriate adhesion between the Probiotic particles and the core such that the dusting comprising Probiotic particles can be substantially free of a binder or binding agent. Without being bound by theory, it is thought that the Van der Waals forces provide the attractive force between the dusting and the core. Additionally, and without being bound by theory, it is also thought that hydrogen bonds play a role in the adhesion. A hydrogen bond is the attractive force between a hydrogen atom covalently bonded to an electronegative atom, such as nitrogen, oxygen, and fluorine, and another electronegative atom of a separate molecule. The electronegative atoms have a greater electron pull making the vicinity around these atoms negatively charged. This uneven distribution of electrons makes the hydrogen region carry a positive charge allowing the dipole intermolecular interaction between the two molecules. The bond is stronger than Van der Waals bonds but weaker than covalent, intramolecular bonds. Most proteins and carbohydrates contain several groups which are able to form hydrogen bonds.

Thus, in one embodiment, the dusting can comprise Probiotics and be substantially free of a binder or binding agent. Thus, the dusting process can comprise dusting the dusting onto the core, wherein the dusting comprises Probiotics and is substantially free of a binder or binding agent.

In one embodiment of the present invention, a process for dusting a pet food kibble comprises providing a pet food kibble in the form of a core matrix having a surface, providing a powder comprising a first component, dusting the powder onto the surface of the pet food kibble or core matrix, or kibble, wherein the dusting occurs substantially free of a binding agent or carrier. As used herein, the term "dusting" or "dusted" or "to dust" means to apply with a powder, fine particle, or dust-like material, such as applying a powder comprising Probiotic microorganisms, and/or its constituents, and/or any stability/preservative aids, that are in the form of solid particles. In one embodiment, dusting can be a dry mixing of a powder, such as an active such as a Probiotic, onto an animal food, such as a kibble as disclosed herein. The dry mixing process can also be performed substantially free of a binder, binding agent, and/or carrier substrate, as disclosed herein. Dusting can be performed in one embodiment such that its purpose can ensure substantially homogenous application throughout a group of kibbles being dusted. In one embodiment, most or substantially all of the surface area of a kibble can be exposed to the Probiotic powder. In one embodiment, distribution of the powder can be substantially even over the surface of a kibble. As used herein, dusting can be with the intent to disperse the powder, or dust, over at least the majority of the surface. In one embodiment of dusting, a mechanical mixer can be used, as disclosed herein. Sprinkling, on the other hand, can be scattered or random arrangement of the powder on the kibbles and does not expose substantially all of the surface area of the kibble to the powder. Sprinkling also is a form of topical application over only a portion or a limited surface of a substance. Additionally, sprinkling is usually a manual operation, such as a human sprinkling powder over a mass of animal food. In one embodiment, when comparing sprinkling to dusting, dusting results in a much higher level of adhesion of the powder then does sprinkling. Dusting of the Probiotic microorganisms can occur using a mixture, such as a mixture in a powder form that can be applied with mixing equipment as described herein to ensure near homogenous application throughout a batch of kibbles. Thus, the mixture or powder can comprise a count of Probiotic microorganisms, which can be only Probiotic microorganisms or can be mixed with another ingredient or ingredients, such as a stability aid and/or preservative aid, as described herein. In certain non-limiting examples, including embodiments as disclosed herein, the Probiotic powder can comprise between about 1 gram per 10,000,000 grams of kibble to about 1 gram per 10 grams of kibble, and all whole numbers ranges therebetween. These weights of powder can include the stability aids and preservative aids as described herein, such as maltodextrin and ascorbic acid, for example. In some embodiments, the dusting can be substantially even over the surface of the core. In other embodiments, the dusting is not substantially even over the surface of the core.

Additionally, in one embodiment of the present invention, the dusting can occur substantially free of a binder, binding agent, or carrier. In one embodiment, the binder, binding agent, or carrier does not include the particles or constituents included in the Probiotic powder, such as the stability and/or preservative aids as described herein. In other embodiments, the Probiotic powder can be substantially free of the stability and/or preservative aids. In one embodiment, substantially free of means less than 5 parts per million of the dusting. Non-limiting examples of binders, binding agents, and carriers can include liquefied agents that are applied to the surface of a kibble for the use of adhering dried particulates or substances. Non-limiting examples can include fats and fat matrices such as, but not limited to, soybean oil, cottonseed oil, poultry fat, tallow, partially hardened fats, winterized fats, partial glycerides such as mon-, di-, and trigylcerides and mixtures and combinations thereof; waxes; proteins or proteinaceous materials such as, but not limited to, chicken broth, whey, egg white, hydrolyzed proteins, corn zein, and gelatin; sugars and sugar matrices; starches and/or modified starches, and/or. These binders can typically be applied to a surface using a liquid or solvent that the binder is dissolved or suspended in.

It should be understood that the Probiotic powder that can be dusted can include stability and/or preservative aids. Stability aids can be considered to scavenge free water. Preservative aids can be considered to scavenge free radicals. For example, in the case of Probiotics, the powder can contain stability aids, such as, but not limited to, maltodextrin and/or sugars, and/or preservative aids, such as, but not limited to, ascorbic acid. Thus, in one embodiment, the powder comprises Probiotic microorganisms, a stability aid, and a preservative aid. In one embodiment, the powder can comprise 100% Probiotic microorganism. In another embodiment, the powder can comprise between about 50% and about 99% Probiotics, between about 60% and about 90% Probiotics, between about 65% and about 85% Probiotics, between about 65% and about 75% Probiotics, between about 1% and 50% stability aid, between about 10% and 40% stability aid, between about 15% and 35% stability aid, between about 25% and 35% stability aid, non-limiting example such as maltodextrin, and between about 0% and about 5% preservative aid, between about 0% and about 3% preservative aid, between about 0% and about 2% preservative aid, between about 0.5% and about 1.5% preservative aid, non-limiting example such as ascorbic acid, and all combinations and mixtures thereof, including all ranges therebetween. These stability aids and preservative aids, in one embodiment, are not considered binders, binding agents, or carriers, and no additional carrier or binder is being added to the powder for the purpose of binding, such as binding to the pet food kibble. These stability and/or preservative aids can be added for the stability of the Probiotic microorganism. Thus, in one embodiment, the dusting powder contains greater than 20% Probiotic with a CFU that can be greater than $10^9$ CFU per gram, $10^{11}$ CFU per gram, and greater than $10^{13}$ CFU per gram. In another embodiment, the powder can comprise Probiotic microorganisms, maltodextrin, and ascorbic acid.

The particle size of each Probiotic microorganism, or mixture in powder form, can be any size that results in adherence of at least one Probiotic microorganism, for however long, to the base material, such as the core matrix of a kibble. In one embodiment, a mixture of Probiotic microorganisms can comprise Probiotic microorganisms having a particle size of less than 100 micrometers. In one embodiment, a mixture of Probiotic microorganisms can comprise Probiotic microorganisms having a particle size of less than 75 micrometers. In one embodiment, a mixture of Probiotic microorganisms can comprise Probiotic microorganisms having a particle size of less than 75 micrometers but greater than 10 micrometers. In another embodiment, a mixture of Probiotic microorganisms can comprise Probiotic microorganisms having varying particle sizes, such as a portion less than 100 micrometers and a portion greater than 100. In at least one embodiment, the portion of Probiotic microorganisms having a particle size greater than 500 micrometers may not be conducive to dusting in that adherence to a kibble does not readily or easily occur. In any of these embodiments, the mixture of Probiotic microorganisms can include Probiotic microorganisms having particle sizes outside of the specific range or can include only Probiotic microorganisms having particle sizes only within the specific range. Particle sizes conducive to dusting can include particle sizes such as less than 500 micrometers, less than 400 micrometers, less than 300 micrometers, less than 200 micrometers, less than 100 micrometers, and as low as 10 micrometers, and all ranges therebetween. In one embodiment, the particle size can be from 10 micrometers to 75 micrometers.

With further reference to size, and appreciating that in some embodiments particle sizes can take multiple shapes, irregular shapes, and dimensions, whenever the size of the particles is discussed, it should be understood that the sizes can be determined or measured by way of mesh screens using ASTM E 11-70 (1995). Thus, the less than 75 microns size as described herein can be determined by those particles that pass through a No. 200 mesh. Accordingly, the appropriate mesh size can be used to determine or measure the particle size as needed as described herein.

To assist in understanding particle sizes of the Probiotic microorganisms described herein, the following description is provided. The Probiotic powder can be made, in one embodiment, by fermenting the Probiotic bacteria in a nutrient-rich broth in very large stirred tanks. When the fermentation is complete, the broth is dried off, until only a solid remains. This solid is then ground up to a powder, which can be freeze dried, or lyophilized, and which can be used in embodiments of the present invention disclosed herein for dusting. This powder can be the dried fermentation broth and can have nutrients, bacteria byproducts, and/or dormant Probiotic bacteria/microorganisms. The powder can contain stability aids, such as, but not limited to, maltodextrin and/or sugars, and/or preservative aids, such as, but not limited to, ascorbic acid. Thus, in one embodiment, only a portion of the powder comprises Probiotic microorganisms. Additionally, the powder particles generally can be comprised of irregular shape particles and measured or determined as described herein. It should be understood that the above is only one process of making a Probiotic, and any Probiotic that is conducive to dusting can be used, no matter the process of making it.

In one embodiment, the mixture to be dusted can comprise any of the other and/or active ingredients as described herein. Other ingredients can, in non-limiting examples, comprise actives or active ingredients/components, as described herein, such as sources of fiber ingredients, mineral ingredients, vitamin ingredients, polyphenols ingredients, amino acid ingredients, carotenoid ingredients, antioxidant ingredients, fatty acid ingredients, glucose mimetic ingredients, Probiotic ingredients, prebiotic ingredients, and mixtures or combinations thereof. The mixture to be dusted can comprise particles of the appropriate size that are best suitable for dusting such that they adhere to the kibble.

Thus, various other embodiments of the animal feed kibbles described herein can further comprise at least one additional active that can be dusted. The additional active can also be coated, in one embodiment, using a binder. For example, the at least one additional dusting or coatings can include one or more dustings or coatings containing additional active ingredients (including those described herein) or one or more Probiotic-enriched coatings or dustings. In other embodiments, the one or more additional coatings or dustings can comprise only the coating material, wherein the one or more additional dustings or coatings can increase the stability of the food composition.

It should be understood that although within this disclosure sizes of Probiotics particles are disclosed, those sizes in no way are meant to be limiting in that any size of particles can be used for dusting. Moreover, any mixtures of sizes of particles can be used. Thus, the mixture can include particles of multiple sizes. Mixtures can include particles of substantially the same size or of differing sizes, all or some of which are conducive to dusting. Other mixtures can include particles of the mixture that can be conducive to dusting while other particles of the mixture may not be conducive to dusting. Of course, different types of particles can be used, as described herein.

Thus, embodiments of the present invention can comprise adhering a solid Probiotic microorganism, or any other active, onto a kibble, such as by dusting the Probiotic microorganism onto the surface of the kibble core substantially without the use of a binding agent or carrier to form a dusted kibble. In one embodiment, the dusted kibble comprises a kibble comprising a core matrix, as described hereinabove, a powder comprising Probiotic microorganism particles, wherein the powder comprises a dusting on the core matrix to form a dusted pet food kibble that is substantially free of a binder, binding agent, and/or carrier. In one embodiment, the dusting adheres to the surface of the kibble. However, it should be understood that the surface of a kibble is generally not a uniform, smooth surface. In most circumstances, the surface of a kibble can be generally rough and thus have many nooks, depressions, recesses, indentions, impressions, and the like. Thus, in at least one embodiment, when the powder described herein is dusted onto the kibble, the particles of the powder can adhere to not only the surface of the kibble but also into these nooks, depression, recesses, indentions, impressions, and the like.

As described above, in one embodiment, the kibble can be substantially free of a binder, binding agent, or carrier. Thus, in this embodiment, the dusting can be performed substantially without the use of a binder, binding agent, or carrier for use in binding or in adhering the Probiotic microorganisms to the kibble. Binders or carriers can typically be used for assisting in adhering or protecting the active ingredient, such as Probiotic microorganisms, to the kibble. For example, a fat coating can be applied to the core, which can assist in applying the Probiotic microorganisms in that the core has been made more receptive to receiving and adhering the Probiotic microorganisms since it is more adhesive from the properties of the fat. Alternatives include encapsulation of the Probiotic microorganisms, other coatings, carriers in the Probiotic mixture that adhere to the coating of the core, among others.

Thus, in embodiments wherein the dusting can be substantially free of a binder or carrier agent, many variables exist that can affect the adhesion properties of the powder during the dusting process. Moreover, without being limited to theory, it is thought that many of the variables can be adjusted, either during the dusting process or to the core itself, to result in a commercially feasible pet food kibble having a dusting of powder. Among the variables that can affect adhesion properties of the powder can be the particle size of particles in the powder, the surface area of the core that is available for powder adhesion, temperature of the core when dusting, surface roughness of the core, amount of powder that is used, the method of application of the powder to the core, electrostatic charges, and the relative humidity of the local environment at the time of powder application to the core. Each of these variables is now taken in turn.

As described above, in one embodiment, the particle size of the particles in the powder can affect the adhesion properties of the powder onto the core. In one embodiment, the powder can comprise Probiotic microorganisms having a particle size less than 100 micrometers. In another embodiment, the powder can comprise Probiotic microorganism having a particle size less than 75 micrometers. In one embodiment, the Probiotic microorganism can have a particle size of between about 10 micrometers and about 75 micrometers. In any of these embodiments, the Probiotic powder, which can contain stability aids and/or preservative aids, can also have particles sizes that match the particles sizes for Probiotics, as described herein. As described before, particle size is defined as particle size as measured by laser diffraction analysis under ISO 13320. The present inventors have found that, in at least one embodiment, when using a powder comprising Probiotic microorganisms as described herein, as particle size of the powder decreases, or gets smaller, gravitational forces that predominate on larger particles become less pronounced, and Van der Waals forces predominate. In general, Van der Waals forces predominate for particles sizes less than 100 micrometers, which results in particle sizes less than 100 micrometers being particularly, but not exclusively, advantageous. It should further be understood that the particle sizes as disclosed herein can be for a portion of the particles of a powder. Thus, in one embodiment, a powder can be dusted, wherein a portion of the particles have particles sizes as disclosed herein.

In one embodiment, the surface area of the core that is available for powder adhesion can also affect the adhesion properties of the powder onto the core. In one embodiment, the surface area of the core available is minimally enough so that each particle being applied can contact the surface of the core. In another embodiment, and as those of ordinary skill in the art are aware, extruded dry pet food cores can have irregular textured surfaces, resulting in large surface area and pits, pores, crevices, and the like, as described above, into which many particles can become lodged and thus deposited onto the kibble core. In one embodiment, kibble surface areas of between about 1 $m^2/9$ L of volume and 10 $m^2/9$ L of volume can be used and all whole number ranges therebetween. In another embodiment, a surface area of between about 4 $m^2/9$ L and about 6 $m^2/9$ L can be used.

In one embodiment, and as described in additional detail throughout this disclosure, multiple temperature variables can also affect the adhesion properties of the powder onto the core. For example, the temperature of the core, the temperature of the powder, and the temperature of the dusting process can all, individually and collectively, affect the adhesion properties of the powder onto the core. In one embodiment, the core temperature can be above 0° C., or the freezing point of water. At temperatures below the freezing point of water, ice crystals may form on the surface of the core, resulting in an in increased surface hardness. This increased surface hardness can impede adhesion of the powder. In another embodiment, the core temperature is kept at between 0° C. and 20° C. during any part of the dusting process. In another embodiment, the core temperature is kept at between 0° C. and 80° C., or between at between 0° C. and 60° C., or at between 20° C. and 80° C. during any part of the dusting process. In another embodiment, the core temperature is kept at between 20° C. and 80° C. during any part of the dusting process. Additionally, in another embodiment, the core temperature can be lower than the deactivation point of the Probiotic microorganism or other active material.

In one embodiment, the humidity during dusting can be varied. In one embodiment, the humidity can be less than 20%. In another embodiment, the humidity can be less than 30%. In another embodiment, the humidity can be less than 40%. In another embodiment, the humidity can be less than 50%. In another embodiment, the humidity can be less than 60%. In another embodiment, the humidity can be less than 70%. In another embodiment, the humidity can be less than 80%. In another embodiment, the humidity can vary depending on the temperature of the core during dusting. In one embodiment wherein the temperature of the core is about 40 C, the humidity can be no more than 30%. In another embodiment wherein the temperature of the core is above 40 C, the humidity is no more than 30%.

In another embodiment, the water activity of the kibble can affect dusting. In one embodiment, dusting can occur on a kibble having a water activity of about 0.1 or less. In one embodiment, dusting can occur on a kibble having a water activity of about 0.2 or less. In one embodiment, dusting can occur on a kibble having a water activity of about 0.3 or less. In one embodiment, dusting can occur on a kibble having a water activity of about 0.4 or less. In one embodiment, dusting can occur on a kibble having a water activity of about 0.5 or less. In one embodiment, dusting can occur on a kibble having a water activity of about 0.6 or less. In another embodiment, the core can be at a water content of less than 12% during dusting.

In another embodiment, the dusting of Probiotic powder can occur wherein the loss of activity of the Probiotic can be reduced. In one embodiment, the dusting can result in a log loss of activity of about 0. In another embodiment, the dusting can result in a log loss of activity of less than 0.5. In another embodiment, the dusting can result in a log loss of activity of less than 1.0. In another embodiment, the dusting can result in a log loss of activity of less than 1.5. In another embodiment, the dusting can result in a log loss of activity of less than 2.0. The dusting and associated log loss of activity can occur with any sized Probiotic as disclosed herein.

Thus, embodiments of the present invention can include any combination or mixtures of the above variables.

Process

Processes common to making dry pet foods can include milling, batching, conditioning, extrusion, drying, and dusting. Milling can encompass any process used to reduce whole or partial ingredients into smaller forms. Whole or partial formulations can be created in the process step for batching by mixing dry and/or liquid ingredients. Often these ingredients are not in the most nutritious or digestible form, and thus processes are needed to further convert these ingredients to a digestible form via a cooking process.

During the milling process, the individual starting components of the core material can be mixed and blended together in the desired proportions to form the core material. In one embodiment, the resulting core material can be screened to remove any large agglomerate of material therefrom. Any sort of conventional solids mixer can be used for this step including, but not limited to, plough mixers, paddle mixers, fluidizing mixers, conical mixers, drum mixers, and mixtures and combinations thereof. One skilled in the art of solids mixing would be able to optimize the mixing conditions based on the types of materials, particle sizes, and scale, from any one of a number of widely available textbooks and articles on the subject of solids mixing.

The core material mixture can then be fed into a conditioner. Conditioning can be used to pre-treat the ingredients and can include hydration, addition/mixing of other ingredients, partial cooking, and mixtures and combinations thereof. Cooking can often be accomplished by the addition of heat in the form of steam and can result in discharge temperatures of about 113 to about 212° F. Pressurized conditioning can be used when temperatures need to be elevated above standard atmospheric conditions, such as those greater than about 212° F. Conditioned ingredients can then be transferred to an extruder for further processing.

The core material can then be subjected to an extrusion operation in order to obtain an expanded core pellet. In one embodiment, the core material can be routed to a hopper prior to the extrusion operation. The extruder can be any suitable single or twin screw, cooking extruder. Suitable extruders can be obtained from Wenger Manufacturing Inc., Clextral S A, Buhler A G, and the like. Conditions of the extruder can vary depending on the particular product to be made. For example, the texture, hardness, or bulk density of the extruded product can be varied using changes in the extruder operating parameters. Similar to conditioning, extrusion can be used to incorporate other ingredients (such as carbohydrates, proteins, fats, vitamins, minerals, and preservatives) by having dry and/or liquid ingredient streams added anywhere along the length of the extruder feed port, barrel, or die. Extruders can be, but not limited to, single- or twin-screw in design and designed to operate up to 1700 rpm, or even more. The extrusion process can be often accompanied with high pressure (up to 1500 psig) and high temperature (up to 250° C.). Extrusion can be used to accomplish the making of continuous ropes or sheets but also discrete shapes and sizes of edible food. These forms, shapes, and sizes can be often the result of forcing the materials through a die or set of die openings and cutting or breaking into smaller segments.

Extruded ropes, sheets, shapes, or segments can be transferred to post-extrusion operations. These can include crimping, shredding, stamping, conveying, drying, cooling, and dusting in any combination or multiple of process flow. Crimping can be any process that pinches food together. Shredding is any process that reduces the size of the food upon extrusion, preferably by tearing. Stamping can be any process that embosses a surface or cuts through a food. Conveying can be used to transport food from one operation to another and can change or maintain the state of the food during transport, often being a mechanical or pneumatic process. Drying can be used to reduce process moisture to levels suitable for shelf-life in the finished product. The expanded moist pellets can be typically transported from the extruder outlet to the dryer by a conveying, airveying or augering system. After expansion and transport to the entrance to the dryer, the kibbles have typically cooled to 85-95° C. and have had the moisture reduce by evaporation from about 25-35% to about 20-28%. The temperature of the drying oven can be from about 90° C. to about 150° C. The temperature of the core pellets exiting the drying oven can be from about 90° C. to about 99° C. Dusting processes can then be performed to add carbohydrates, proteins, fats, water, vitamins, minerals, actives, and other nutritional or health benefit ingredients to the food to make an intermediate or finished product, as described in more detail hereinafter. Cooling of the food can be used to reduce the temperature from extrusion and/or drying.

An alternative drying process can be as follows. For typical pet food drying, kibble cores of about 24% moisture content enter a continuous belt dryer for a specific a dwell time to dry to about 6 to about 10% moisture content and a water activity of about 0.3 to about 0.6 when measured at about 25° C. To reduce moisture content and water activity, higher drying temperatures can be used. To further reduce moisture content and water activity, increasing the drying time can be done. Even further drying can be achieved by increasing drying time and temperature. In one embodiment, continuous drying can be achieved in single or multiple air zones and/or single or multiple pass dryers. For example, drying in multiple air zones with multiple passes can further reduce the moisture content and water activity, such as to less than about 6% moisture, or from about 1% to about 6%, and all ranges therebetween. The water activity can be reduced to less than 0.5, even less than 0.1, and can be between 0.05 to about 0.5, and all ranges therebetween. In another embodiment, batch drying can be used. Kibble bed depth, temperature, and drying time can be varied to reach a moisture content and water activity similarly as described with respect to continuous drying. In one non-limiting example, a bed depth of 3.5 inches and a temperature of 310° F. can be used to reach a water activity of 0.1. Additionally, drying belt width and belt speed can be modified.

In one embodiment, the powder can then be dusted onto the core. In one embodiment, the powder may be applied to the cores using a fluidizing paddle mixer. The core pellets can be fed to a fluidizing mixer for the application of the powder in the manufacture of a dusted pet food kibble.

In one embodiment, the fluidizing mixer can be a counter-rotating dual-axis paddle mixer, wherein the axes are oriented horizontally with paddles attached to the counter-rotating axes. A suitable counter-rotating dual-axis paddle mixer can be obtained from Forberg International AS, Larvik, Norway; Eirich Machines, Inc, Gurnee, Ill., USA, and Dynamic Air Inc., St. Paul, Minn., USA. The motion of the paddles in-between the shafts can constitute a converging flow zone, creating substantial fluidization of the particles in the center of the mixer. During operation of the mixer, the tilt of paddles on each shaft can create opposing convective flow fields in the axial directions generating an additional shear field in the converging flow zone. The downward trajectory of the paddles on the outside of the shafts can constitute a downward convective flow. Thus, in one embodiment, the fluidizing mixer has a converging flow zone located in-between the counter-rotating paddle axes.

In one embodiment, the powder can be introduced into the counter-rotating dual-axis paddle mixer such that the powder component is directed upward into the converging zone between the counter-rotating paddle axes. In one aspect, the counter-rotating dual axis paddle mixer can have a converging flow zone between the counter-rotating paddle axes and the swept volumes of the counter-rotating paddles axes do not overlap within the converging flow zone. The powder can be directed into the gap between the swept volumes of the counter-rotating paddle axes. In one aspect, the ingress of the powder into the dual-axis paddle mixer occurs through a distributor pipe located below the converging flow zone of the counter-rotating paddle axes. The distributor pipe can include at least one opening through which the powder passes into the dual-axis paddle mixer.

In one embodiment, the powder can be introduced into the counter-rotating dual-axis paddle mixer such that the powder is directed downward on top of the converging zone between the counter-rotating paddle axes.

In one embodiment, the gap between a paddle tip and fluidizing mixer wall can be greater than the largest dimension of the core pellet being dusted. While not being bound by theory, it is believed that such a gap clearance prevents the core pellets from becoming lodged between the paddle tip and the wall, possibly causing core pellet breakage.

In one embodiment the Froude number of the fluidizing paddle mixer is maintained between 0.1 and 1.5. The Froude number is defined as a dimensionless number $(Fr)=(DN^2/g)$ and relates inertial forces to those of gravity; D is the length of the paddle, N is the rotational frequency of the propeller (rev/sec), and g is the gravitational constant. The Froude number is a dimensionless number comparing inertial forces and gravitational forces. In one embodiment, the inertial forces are the centrifugal forces that are whirling the kibbles and the powder around. At too high a Froude number, the cores and the powder may be over-fluidized resulting in less efficient application of the powder to the cores. At too low a Froude number, the mixing may be too slow to effectively apply the powder to the core.

In one embodiment, the length of application of the powder to the core using a mixer can be between 1 second and 10 minutes, and all ranges of seconds therebetween. In one embodiment, application times of between 10 and 60 seconds have been found to have improved levels of adhesion of powder to the cores, although those application times are not meant to be limiting.

In general, some of the powder may not adhere to the core during the application process as described herein. In one embodiment after the application of the powder to the core, the powder that has not adhered to the core can be removed from the dusted cores by any convenient method, a non-limiting example of which is sieving. This powder can then be used for the next batch of dusting. In one embodiment, the free powder and the dusted cores can both be sent together to the next step in the manufacturing process.

In one embodiment, the electrostatic charges of the powder can be varied to affect the adhesion of the powder to the cores. By electrostatic charges is meant the deliberate addition or subtraction of electric charges to the powder and/or the cores beyond what is present during ambient conditions. Electrostatic charges can be applied to the powder and/or the cores by any convenient method. Numerous types of equipment are commercially available for applying charges to particles for dusting purposes. Non-limiting examples of such equipment are the Nordson® Encore™, or the ITW Ransburg® No. 2 Gun/Deuce Unit™. The type of charge (positive or negative) and the amount of charge can be varied depending on the materials of composition of the core and the powder, and the amount of electrostatic adhesion required.

In one embodiment, the method of application of the powder to the cores can be varied to affect the adhesion of the powder to the core. In one embodiment, the method of dispersing the powder among the kibbles can include, but is not limited to, manual application, non-limiting examples of which include sprinkling, spraying, or metering via a loss in weight feeder, auger or belt, and mixtures and combinations of these. Various types of equipment can be used to improve the dispersal and contact of the powder with the surface of the cores. Any sort of conventional solids mixer can be used for this step including, but not limited to, plough mixers, paddle mixers, fluidizing mixers, conical mixers, drum mixers, and mixtures and combinations of these. One skilled in the art of solids mixing could be able to optimize the mixing conditions based on the types of materials, particle sizes, and scale, from any one of a number of widely available textbooks and articles on the subject of solids mixing.

In one embodiment, the core, after being formed into a core but before being dusted as described herein, is not moistened. Thus, in one embodiment, the core can be at or below 12% moisture content prior to, and/or during the dusting process. In another embodiment, the core is not treated in any other way to aid in adherence of the particles of the powder, except as provided for herein.

During the dusting process, in one embodiment, the core can be dusted with a first component, as described herein, such as an active as disclosed herein. The core can then be dusted, or coated, with a second component, as described herein. Additional components can be dusted, up to as many components as desired. Additionally, in one embodiment, the desired number of components can be dusted simultaneously, or in any order or timing possible. Thus, a first component and a second component can be dusted simultaneously; or a first component can be dusted for a first time period during which a second component and a third component can begin to be dusted. As one of skill in the art can see, any variation of timing and components can be envisioned.

It should additionally be understood after the dusting process occurs with any core kibble, additional layers, dustings, or even coatings can be applied as is known to those of ordinary skill in the art. Coatings of any component, such as a fat, can be provided. Other dustings, as disclosed herein, can be provided. Thus, any amount and number of coatings and dustings of components described herein and of components used in animal feed can be provided.

Grinding/Milling of Active

In one embodiment, the active ingredient, such as a Probiotic microorganism, its constituents, preservative aids, and/or stability aids, can be ground or milled into a powder for use in dusting as described herein. Any grinding machine or mill can be used. Non-limiting examples of grinding processes and/or mills that can be used include compression grinding, jet mills, air classifying mills, universal mills, pin mills, hammer mills, and even mortar and pestal.

In one embodiment, it has been found that controlling temperature during milling can assist in not affecting the active ingredient, such as a Probiotic microorganism, deleteriously. For example, in some embodiments, high temperature can result from friction during grinding or milling, and the high temperature can negatively impact the active ingredient to the point of burning up and destroying the active. For example, some grinding and/or milling processes can have a screen that the active ingredient must pass through. However, if using an active that tends to be sticky or have particular adhesion properties, the screen can become plugged with agglomerated active ingredient, which can result in the build up of friction in the mill, which in turn can produce heat that kills off the active ingredient.

In one embodiment, the milling process can result in the active ingredient reaching a temperature of less than about 65° C. In another embodiment, the active ingredient can reach a temperature of less than about 50° C. In another embodiment, the active ingredient can reach a temperature of less than about 35° C. In another embodiment, the active ingredient can reach a temperature of between about 25° C. and about 65° C. In another embodiment, the active ingredient can reach a temperature of between about 25° C. and about 50° C. In another embodiment, the active ingredient can reach a temperature of between about 25° C. and about 35° C. In another embodiment, the active ingredient can reach a temperature of between about 30° C. and about 35° C. In another embodiment, the grinding/milling is performed at ambient temperature and humidity, such as 20-25° C. and 20-30% relative humidity, respectively.

In another embodiment, the grinder or mill can be used with an air stream that helps to control temperature. In one embodiment, cool air can be blown over the active during the grinding/milling process. The cool air can be effective in preventing deleterious heat build-up of the active ingredient that results in killing off the active ingredient.

As disclosed herein, the water activity of the kibble, in some embodiments can be about 0.6 or less, 0.5 or less, 0.4 or less, 0.3 or less, 0.2 or less, and 0.1 or less. Some of these low water activities result from additional drying that is not normally used in conventional pet food kibbles. However, in some embodiments this additional drying can be utilized to ensure survival of the active ingredient, such as a Probiotic. In some embodiments, it has been found that this additional drying and thus these low water activities do not negatively impact food preference by the animal. Additionally, in some embodiments, it has been found that in fact the food preference by the animal can be increased.

EXAMPLES

Example 1

About 3000 g of core kibbles of an extruded and dried mixture of ground corn, chicken meal, minerals, vitamins, amino acids, fish oil, water, and beet pulp are introduced into the paddle mixer in a hopper located above the paddle mixer. The mixer is a model FZM-0.7 Forberg fluidized zone mixer manufactured by Eirich Machines, Inc., Gurnee, Ill., USA. The higher melting point fat is Paramount B brand partially hydrogenated palm kernel oil manufactured by Loders Croklaan, Inc., Channahon, Ill., USA. Paramount B has a complete melt point of about 36 C and has a solid fat content of about 77 at 20 C. The kibbles are pre-cooled with a chiller to about 0 C prior to adding them to the mixer. Once the kibbles have been added to the mixer, the paddles are rotated to fluidize the kibbles. The paddles are rotated at about 87 RPM and a Froude number of about 1.0. About 2 g of a dehydrated *Bifidobacterium animalis* are mixed thoroughly into about 900 g of fat as identified above using a kitchen mixer (Kitchen Aid, model K45SS stand mixer) to form a mixture. The fat-bifidobacteria mixture is added to the fluidizing mixer over the course of about one minute by pumping the mixture from a beaker through a silicone tubing line to a point about 20 cm above the fluidized zone in the center of the mixers using a Cole-Parmer model 07550-30 peristaltic pump using two parallel Masterflex L/S Easyload II pump heads. The temperature of the fat is about 37 C and is added to the center of the mixer over the fluidized zone.

At the end of the addition of the mixture, the paddle mixing of the kibbles is continued for about 10 seconds, then the door at the bottom of the mixer are opened to dump the coated kibbles into a metal receiver. Visual examination of the kibbles shows that the mixture has been substantially evenly coated over the surface of the kibbles to form a solid fat layer. Slicing several of the kibbles in half confirms that the distribution of the solid fat around the surface of the individual kibbles is substantially even.

Example 2

About 7000 g of core kibbles consisting of an extruded and dried mixture of ground corn, chicken meal, minerals, vitamins, amino acids, fish oil, water, and beet pulp are introduced into the paddle mixer in a hopper located above the paddle mixer. The mixer is a model Bella 32-liter capacity fluidized zone mixer manufactured by Dynamic Air Inc., St Paul, Minn., USA. The kibbles are pre-cooled with a chiller to about 0 C prior to adding them to the mixer. Once the kibbles have been added to the mixer, the paddles are rotated to fluidize the kibbles. The paddles are rotated at about 94 RPM and a Froude number of about 1.1. About 4.5 g of a dehydrated bifidobacteria animalis (NCIMB 41199) are mixed thoroughly into about 2300 g fat (higher melting point Paramount B) using a kitchen mixer to form a mixture. About half of the fat-bifidobacteria mixture is added to the fluidizing mixer over the course of about one minute by pumping the mixture from a beaker through a silicone tubing line to a point about 25 cm above the fluidized zone in the center of the mixers using a Cole-Parmer model 07550-30 peristaltic pump using two parallel Masterflex L/S Easyload II pump heads. The temperature of the fat is about 37 C and is added to the center of the mixer over the fluidized zone. At the end of the addition of the mixture, the paddle mixing of the kibbles is continued for about 10 seconds then the door at the bottom of the mixer are opened to dump the coated kibbles into a metal receiver. The coated kibbles are then returned to the chiller to be cooled to about 0 C. The cooled coated kibbles are returned to the paddle mixer, and the remaining fat-bifidobacteria mixture is added to the mixer in the same manner as the first half of the mixture. At the end of the addition of the mixture, the paddle mixing of the kibbles is continued for about 10 seconds then the door at the bottom of the mixer are opened to dump the coated kibbles into a metal receiver. Visual examination of the kibbles shows that the mixture is evenly coated over the surface of the kibbles to form a solid fat layer. Slicing several of the kibbles in half confirms that the distribution of the solid fat around the surface of the individual kibbles is substantially even. The product is stored for about 3 months under ambient conditions. Subsequent bacteria culture testing performed on the product shows a substantial activity of live bifidobacteria animalis in the cultures.

Example 2A

About 7000 g of core kibbles of an extruded and dried mixture of ground corn, chicken meal, minerals, vitamins, amino acids, fish oil, water, and beet pulp are introduced into a paddle mixer in a hopper located above the paddle mixer. The mixer is a model Bella 32-liter capacity fluidized zone mixer manufactured by Dynamic Air Inc., St Paul, Minn., USA. About 1750 g of 27 Stearine manufactured by Loders Croklaan, Channahon Ill., is melted to about 65° C. The kibbles are cooled to about 25° C. prior to adding them to the mixer. Once the kibbles have been added to the mixer, the paddles are rotated to fluidize the kibbles. The paddles are rotated at about 94 RPM and a Froude number of about 1.1. The melted 27 Stearine is sprayed over the center of the mixer over the fluidized zone over a period of about 30 seconds. At the end of the addition of the 27 Stearine, the doors at the bottom of the mixer are opened to dump the coated kibbles into a metal receiver. Visual examination of the kibbles shows that the mixture is evenly coated over the surface of the kibbles to form a white solid fat layer.

Example 3

A dog feed is made that contains two types of kibbles. The first kibble type is a traditional kibble that is made up of a core of extruded and dried mixture of ground corn, chicken meal, minerals, vitamins, amino acids, fish oil, water, and beet pulp. This first kibble is coated with fat and palatant and no active ingredient is included. The first kibble is generally brown in color. The second type of kibble is a traditional kibble of the first kibble type, but this kibble is coated with a Probiotic-enriched coating. The second kibble is then colored white with KLX (available from Loders Croklaan, Channahon, Ill.) at about 50% by weight. The first kibble and second kibble are blended together in a ratio of 90% first, non-active kibble and 10% second, active kibble and packaged in a traditional bag. The bag thus contains about 90% brown, non-active kibbles and about 10% white, active Probiotic-enriched kibbles.

Example 4

A dog food is made that contains three types of kibbles. The first kibble type is a traditional kibble that is made up of a core of extruded and dried mixture of ground corn, chicken meal, minerals, vitamins, amino acids, fish oil, water, and beet pulp. This first kibble is coated with fat and no active ingredient is included. The first kibble is generally brown in color. The second type of kibble is a traditional kibble of the first kibble type, but this kibble is colored white with white kreemy coating (available from Blommer, Chicago, Ill.). The third type of kibble is a traditional kibble of the first kibble type, this kibble is dusted with Probiotic powder. The third kibble is generally brown in color. The first kibble, second kibble, and third kibble are blended together in a ratio of 80% first, non-active kibble, 10% second, white colored kibble, and 10% third, Probiotic dusted kibble. The kibbles are packaged in a traditional bag. The bag thus contains about 80% brown, non-active kibbles, about 10% white, non-active kibbles, and about 10% brown, active Probiotic-enriched dusted kibbles.

Example 5

In one consumer test, interviews were conducted with 37 (thirty-seven) consumers from three segments of the pet food user population—Segment I, Segment II, and Segment III. The consumers were asked to sort a list of 26 (twenty-six) benefit statements into a top six (6) list based on what they wanted from their dog's pet food. The list of 26 benefit statements includes eight (8) related to digestive health, six (6) related to skin and coat, seven (7) related to mobility, two (2) related to immunity, two (2) related to overall wellness/longevity, and one (1) taste statement. The consumers reduced the list to the top three (3) desired benefits. They were then asked to react to kibble prototypes in the context of Probiotic ingredients. Four kibble prototypes were used, which can be found as FIGS. 1, 2, 3, and 4.

Figure 2:
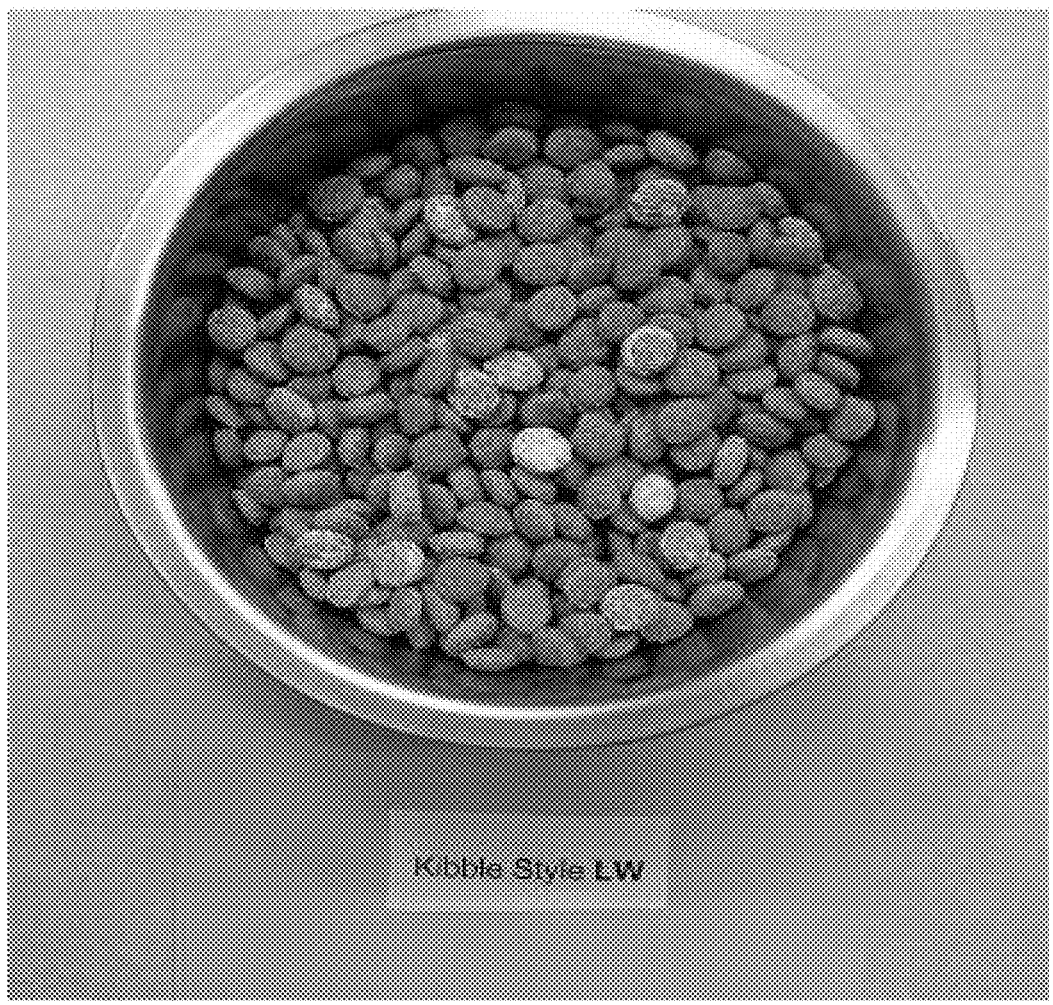
FIG. 2 depicts another embodiment of an animal feed with kibbles.
Figure 3:
FIG. 3 depicts another embodiment of an animal feed with kibbles.
Figure 4:
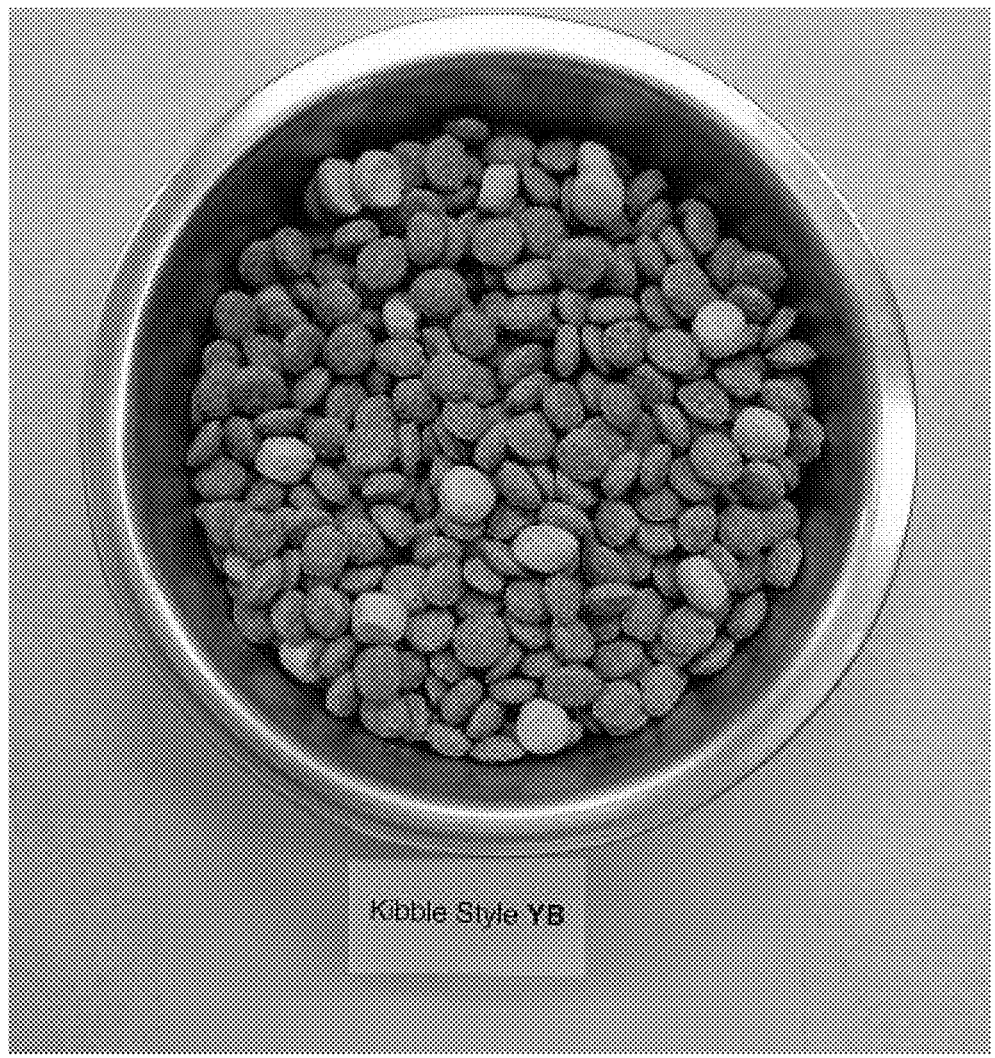
FIG. 4 depicts another embodiment of an animal feed with kibbles.

FIG. 1 depicts a first prototype of animal feed as shown to the three segments of consumers in one consumer test identified above. The first prototype of animal feed resembles a bowl of traditional dog food in the form of kibbles. The cores of these kibbles are standard, traditional kibbles that are coated with an approximately 25% brown coating of Paramount B and 2% Sensient caramel and paprika colorant. FIG. 2 depicts a second prototype of animal feed as shown to the three segments of consumers. It resembles a bowl of traditional kibbled dog food with some of the kibbles coated with a 10% white-colored coating of white kreemy coating (available from Blommer Chocolate Company, Chicago, Ill.). FIG. 3 depicts a third prototype of animal feed as shown to the three segments of consumers. It resembles a bowl of traditional kibbled dog food with some of the kibbles with a 50% white-colored coating of KLX (available from Loders Croklaan, Channahon, Ill.). FIG. 4 depicts a fourth prototype of animal feed as shown to the three segments of consumers. It resembles a bowl of traditional kibbled dog food with some of the kibbles having a corn protein concentrate based core with a 25% KLX coating (available from Loders Croklaan, Channahon, Ill.). In FIGS. 2, 3, and 4, approximately 10% of the total number of kibbles in the bowl had the colored coating.

In the consumer test, it was determined through the results that in the second and third prototypes, represented by FIGS. 2 and 3, respectively, consumers from all three segments consistently commented that the white-colored coating reminded them, or intuitively communicated to them, a yogurt-coated kibble. Specifically, seven of ten consumers from Segment I, six of seven consumers from Segment II, and five of six consumers from Segment III, associated the white coated kibble with a Probiotic containing, yogurt-looking pet food. The consumers also surprisingly stated that this colored kibble conveyed to them a yogurt-type benefit, such as a digestive benefit. Thus, based on these results, one of ordinary skill in the art can conclude that a kibbled dog food that comprises a white-colored coating intuitively communicates to consumers, resulting in them psychologically matching the white-colored coating with that of yogurt and also matching it with a digestive health benefit.

Methods

Activity of Probiotic

The test method of determining the activity level of Probiotics in animal food can be performed as follows.

Sample Preparation: Into a sterile stomach bag (commercially available from Interscience Laboratories Inc., Weymouth, Mass.), the sample for measurement is aseptically weighed, and the weight is recorded. The sample is diluted by adding room temperature Butterfield's Phosphate Buffered Dilution Water (Bacteriological Analytical Manual, 8$^{th}$ Edition) until at a 1:10 dilution (meaning, if sample weighs 3 grams, add buffer until the scale reads 30 grams). The sample is allowed to soften for about 20 to 30 minutes, then it is flattened and broke into small pieces, then place into a MINIMIX stomacher (commercially available from Interscience Laboratories Inc., Weymouth, Mass.) for two minutes at a speed of 9.

Sample Dilution: Upon completion of stomaching, 1 milliliter of the mixed sample is transferred into a 9 milliliter dilution tube containing Butterfield's Phosphate Buffered Dilution Water (making a −2 dilution). Serial dilute the sample by transferring 1 milliliter from the −2 dilution into a different 9 milliliter dilution tube (making a −3 dilution). This step is repeated until the desired dilution for plating has been reached. Each tube is vortexed prior to performing the next dilution.

Sample Plating: The sample is plated in duplicate on Difco Lactobacilli MRS Agar (DeMan, Rogosa and Sharpe Agar) at −6, −7, and −8 dilutions. To plate the dilution of −8, 0.1 milliliters from the −7 dilution tube is transferred onto a room temperature MRS plate. Appropriate dilutions are repeated, vortexing the tube immediately prior to plating. Samples are spread evenly over the entire surface of the plate, using a sterile spreader. Plates are positioned, inverted, in a 7 liter anaerobic jar (Mitsubishi). An anaerobic indicator (Oxoid) is placed inside the jar. Three AnaeroPack (Mitsubishi) sachets are obtained and opened, with one sachet in one side compartment and two sachets in the other side compartment. The lid is placed on top of the jar and a good seal is ensured. The anaerobic jar is placed in an incubator at 37° C.+/−2° C. for a 48 hour incubation period.

Probiotic Microorganism Enumeration: After incubating for 48 hours, the plates are removed from the incubator and typical bacterial colonies are counted manually using a Quebec Colony Counter to magnify the colonies. Plates are enumerated in the range of 25-250 colonies. Once a raw count (number of colonies counted on the plate) is completed, the dilution is accounted for; therefore, the raw count is multiplied by the reciprocal of the dilution to provide CFU/gram of sample.

Water Activity

Water activity may be determined using methods known to those skilled in the art. Water activity can be determined using a NovaSina TH200 Water Activity Meter at 25° C. or other suitable device as is known in the art. Briefly, the meter is calibrated using calibration salts. The sample to be measured is temperature equilibrated in the meter, following which the water activity is determined as the percent relative humidity (% RH) divided by 100 after equilibrium is reached (typically 10 to 20 minutes).

Particle Size

When determining particle size, the particle size can be defined as the particle size as measured by laser diffraction analysis, such as by International Organization for Standardization (ISO) method 13320.

For particles of irregular shape and dimension, particle size can be defined as measured by way of mesh screens using ASTM E 11-70 (1995).

Hunter Lab Method

Many test methods for measuring the Hunter Lab color and its associated values are also well known in the color art. Any of those test methods can be used within embodiments of the present invention. One non-limiting example of a test method is disclosed hereinafter.

Color-containing surfaces are tested in a dry state and at an ambient humidity of approximately 500%.+−.2%. Reflectance color is measured using the Hunter Lab LabScan XE reflectance spectrophotometer obtained from Hunter Associates Laboratory of Reston, Va. The spectrophotometer is set to the CIELab color scale and with a D50 illumination. The Observer is set at 10°. The Mode is set at 45/0°. Area View is set to 0.125". Port Size is set to 0.20" for films. Area View is set to 1.00", and Port Size is set to 1.20" other materials. The spectrophotometer is calibrated prior to sample analysis utilizing the black and white reference tiles supplied from the vendor with the instrument. Calibration is done according to the manufacturer's instructions as set forth in LabScan XE User's Manual, Manual Version 1.1, August 2001, A60-1010-862.

If cleaning is required of the reference tiles or samples, only tissues that do not contain embossing, lotion, or brighteners should be used (e.g., Puffs® tissue). Any sample point on the externally visible surface of the element containing the imparted color to be analyzed should be selected. Sample points are selected so as to be close in perceived color. A sample of the material being tested is placed over the spectrophotometer's sample port. The sample comprising the color to be analyzed must be larger than the sample port to ensure accurate measurements. A white tile, as supplied by the manufacturer, is placed behind the externally visible surface. The L*, a*, and b* values are read and recorded. The externally visible surface is removed and repositioned so that a minimum of six readings are obtained for the externally visible surface. If possible (e.g., the size of the imparted color on the element in question does not limit the ability to have six discretely different, non-overlapping sample points), each of the readings is to be performed at a substantially different region on the externally visible surface so that no two sample points overlap. If the size of the imparted color region requires overlapping of sample points, only six samples should be taken with the sample points selected to minimize overlap between any two sample points. The readings are averaged to yield the reported L*, a*, and b* values for a specified color on an externally visible surface of an element.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. An animal feed consisting essentially of:
    a first kibble that does not include an active and is non-distinctive;
    a second kibble that includes an active and is non-distinctive; and
    a third kibble that does not include an active and is distinctive relative to the first kibble and the second kibble;
    wherein an amount of the second kibble is about the same as an amount of the third kibble.

2. The animal feed of claim 1, wherein the first kibble and the second kibble do not comprise a colorant, and wherein the third kibble includes a colorant.

3. The animal feed of claim 1, wherein the third kibble includes a color that is distinctive from a color of the first kibble and a color of the second kibble.

4. The animal feed of claim 1, wherein the active includes a probiotic.

5. The animal feed of claim 4, wherein the probiotic includes an activity of at least $10^5$ CFU/gram.

6. The animal feed of claim 1, wherein the third kibble includes a coating that comprises the active.

7. The animal feed of claim 1, wherein the third kibble includes a dusting that comprises the active.

8. The animal feed of claim 7, wherein the dusting is substantially free of a binder.

9. An article of manufacture comprising:
    a package including an opaque portion and a transparent portion, the transparent portion including a viewing aperture; and
    an animal feed contained within the package that is viewable through the viewing aperture when the package is in a customary position on a retail store shelf, the animal feed consisting essentially of:
        a first kibble that does not include an active and is non-distinctive,
        a second kibble that includes an active and is non-distinctive, and
        a third kibble that does not include an active and is distinctive relative to the first kibble and the second kibble;
        wherein an amount of the second kibble is about the same as an amount of the third kibble.

10. The article of manufacture of claim 9, wherein the first kibble and the second kibble do not comprise a colorant, and wherein the third kibble includes a colorant.

11. The article of manufacture of claim 9, wherein the active includes a probiotic.

12. The article of manufacture of claim 9, wherein the third kibble includes a coating that comprises the active.

13. The article of manufacture of claim 9, wherein the third kibble includes a dusting that comprises the active.

14. The article of manufacture of claim 13, wherein the dusting is substantially free of a binder.

15. The article of manufacture of claim 9, wherein the active is electrostatically charged.

* * * * *